US012604233B2

(12) United States Patent
Chae et al.

(10) Patent No.: US 12,604,233 B2
(45) Date of Patent: Apr. 14, 2026

(54) QUALITY MANAGEMENT FOR WIRELESS DEVICES

(71) Applicant: Comcast Cable Communications, LLC, Philadelphia, PA (US)

(72) Inventors: Hyukjin Chae, Fairfax, VA (US); Kyungmin Park, Vienna, VA (US); Esmael Hejazi Dinan, McLean, VA (US); SungDuck Chun, Fairfax, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 566 days.

(21) Appl. No.: 18/148,798

(22) Filed: Dec. 30, 2022

(65) Prior Publication Data

US 2023/0217298 A1 Jul. 6, 2023

Related U.S. Application Data

(60) Provisional application No. 63/295,688, filed on Dec. 31, 2021.

(51) Int. Cl.
*H04W 4/00* (2018.01)
*H04W 28/02* (2009.01)
*H04W 76/10* (2018.01)

(52) U.S. Cl.
CPC ....... *H04W 28/0268* (2013.01); *H04W 76/10* (2018.02)

(58) Field of Classification Search
CPC ..................................................... H04W 28/02
See application file for complete search history.

(56) References Cited

U.S. PATENT DOCUMENTS

| | | | |
|---|---|---|---|
| 9,641,347 B2 | 5/2017 | Kim et al. | |
| 10,616,901 B2 | 4/2020 | Cho et al. | |
| 12,035,256 B2 * | 7/2024 | Balevi ................. | H04W 52/242 |
| 2008/0299911 A1 * | 12/2008 | Chen ....................... | H04L 47/70 455/67.13 |

(Continued)

FOREIGN PATENT DOCUMENTS

| | | | | |
|---|---|---|---|---|
| CA | 3062490 A1 * | 11/2019 | ......... | H04L 47/2483 |
| WO | 2021/112602 A1 | 6/2021 | | |

(Continued)

OTHER PUBLICATIONS

Guangxu Zhu, et al., "Over-the-Air Computing for 6G—Turning Air into a Computer," Cornell University, arxiv.corg, Sep. 4, 2020.

(Continued)

*Primary Examiner* — Elisabeth Benoit Magloire
(74) *Attorney, Agent, or Firm* — Banner & Witcoff, Ltd.

(57) ABSTRACT

A group of wireless devices may use shared resources to communicate information to a base station. At least one configuration parameter (e.g., Quality of Service (Qos) parameter(s)) associated with over-the-air computation may be used for group uplink transmissions. Data associated with the group of wireless devices may be determined, based on an aggregation of the group uplink transmissions. The data associated with the group of wireless devices may be provided to a network node using the configuration parameter(s).

20 Claims, 28 Drawing Sheets

(56) References Cited

U.S. PATENT DOCUMENTS

| | | | | |
|---|---|---|---|---|
| 2014/0126363 A1* | 5/2014 | Zeng | H04W 28/12 | 370/230 |
| 2015/0173107 A1* | 6/2015 | Newberg | H04W 76/45 | 455/416 |
| 2015/0326360 A1* | 11/2015 | Malladi | H04L 5/0032 | 370/329 |
| 2016/0050652 A1* | 2/2016 | Wu | H04W 28/24 | 370/329 |
| 2019/0230681 A1* | 7/2019 | Han | H04W 72/542 | |
| 2021/0058826 A1* | 2/2021 | Mao | H04W 28/0933 | |
| 2022/0110155 A1* | 4/2022 | Chou | H04W 74/085 | |
| 2022/0141694 A1* | 5/2022 | Miao | H04B 17/345 | 370/252 |
| 2022/0248255 A1* | 8/2022 | Hande | H04W 28/18 | |
| 2022/0330261 A1* | 10/2022 | Yeo | H04W 72/543 | |
| 2022/0377760 A1* | 11/2022 | Sun | H04W 72/543 | |
| 2022/0417976 A1* | 12/2022 | Park | H04L 5/0053 | |
| 2023/0071543 A1* | 3/2023 | Mildh | H04W 76/22 | |
| 2023/0180152 A1* | 6/2023 | Balevi | G06N 3/084 | 455/518 |
| 2023/0275789 A1* | 8/2023 | Li | H04B 1/0475 | 375/262 |
| 2023/0422308 A1* | 12/2023 | Lee | H04W 74/0833 | |
| 2024/0023091 A1* | 1/2024 | Li | G06N 3/063 | |
| 2025/0071655 A1* | 2/2025 | Lagrange | H04W 28/08 | |

FOREIGN PATENT DOCUMENTS

| | | | |
|---|---|---|---|
| WO | 2021/142627 A1 | 7/2021 | |
| WO | 2022126307 A1 | 6/2022 | |

OTHER PUBLICATIONS

May 4, 2023—European Partial Search Report—EP App. No. 22217385.8.

3GPP TS 23.501 V17.2.0 (Sep. 2021), Technical Specification, 3rd Generation Partnership Project; Technical Specification Group Services and System Aspects; System architecture for the 5G System (5GS); Stage 2 (Release 17).

3GPP TS 23.502 V17.2.1 (Sep. 2021), Technical Specification, 3rd Generation Partnership Project; Technical Specification Group Services and System Aspects; Procedures for the 5G System (5GS); Stage 2 (Release 17).

3GPP TS 36.214 V15.3.0 (Sep. 2018), Technical Specification, 3rd Generation Partnership Project; Technical Specification Group Radio Access Network; Evolved Universal Terrestrial Radio Access (E-UTRA); Physical layer; Measurements (Release 15).

Goldenbaum, Mario, et al. Analyzing the Space of Functions Analog-Computable via Wireless Multiple-Access Channels. 2011 8th International Symposium on Wireless Communication Systems, Aachen. 978-1-61284-402-2/11/$26.00 © 2011 IEEE.

Young-Seok Lee , Ki-Hun Lee and Bang Chul Jung. Beamforming Techniques for Over-the-Air Computation in MIMO IoT Networks. 2020, 20, 6464; doi:10.3390/s20226464.

Fangzhou Wu , Li Chen , Nan Zhao , Senior Member, IEEE, Yunfei Chen , Senior Member, IEEE, F. Richard Yu, Fellow, IEEE, and Guo Wei. Computation Over Wide-Band Multi-Access Channels: Achievable Rates Through Sub-Function Allocation. IEEE Transactions on Wireless Communications, vol. 18, No. 7, Jul. 2019.

Xiaowen Cao, Guangxu Zhu, Jie Xu, and Kaibin Huang. Cooperative Interference Management for Over-the-Air Computation Networks. arXiv:2007.11765v1 [cs.IT] Jul. 23, 2020.

Fabio Molinari, Slawomir Stanczaky, and Jorg Raischz. Exploiting the Superposition Property of Wireless Communication For Average Consensus Problems in Multi-Agent. arXiv:1804.10418v1 [cs.SY] Apr. 27, 2018.

Fabio Molinari, Slawomir Stanczaky, and Jorg Raischz. Exploiting the Superposition Property of Wireless Communication for Max-Consensus Problems in Multi-Agent Systems. IFAC PapersOnLine 51-23 (2018) 176-181.

Thomas L. Marzetta, Fellow, IEEE, and Bertrand M. Hochwald, Member, IEEE. Fast Transfer of Channel State Information in Wireless Systems. IEEE Transactions on Signal Processing, vol. 54, No. 4, Apr. 2006.

Kai Yang, Student Member, IEEE, Tao Jiang, Student Member, IEEE, Yuanming Shi, Member, IEEE, and Zhi Ding, Fellow, IEEE. Federated Learning via Over-the-Air Computation. 1536-1276 (c) 2019 IEEE.

Guangxu Zhux, Li Chen, and Kaibin Huangx, Dept. of EEE, The University of Hong Kong, Hong Kong. MIMO Over-the-Air Computation: Beamforming Optimization on the Grassmann Manifold. 978-1-5386-4727-1/18/$31.00 © 2018 IEEE.

Guangxu Zhu and Kaibin Huang. MIMO Over-the-Air Computation for High-Mobility Multi-Modal Sensing. 2327-4662 (c) 2018 IEEE.

Suhua Tang, Chao Zhang, Sadao Obana. Multi-Slot Over-The-Air Computation in Fading Channels. arXiv:2010.13559v1 [cs.NI] Oct. 23, 2020.

Mario Goldenbaum, Student Member, IEEE, and S?awomir Sta'nczak, Senior Member, IEEE. On the Channel Estimation Effort for Analog Computation over Wireless Multiple-Access Channels. IEEE Wireless Communications Letters, vol. 3, No. 3, Jun. 2014.

Guangxu Zhu, Yuqing Du, Deniz Gunduz, and Kaibin Huang. One-Bit Over-the-Air Aggregation for Communication-Efficient Federated Edge Learning: Design and Convergence Analysis. arXiv:2001.05713v2 [cs.IT] Dec. 2, 2020.

Xiaowen Cao, Guangxu Zhu, Jie Xu, and Kaibin Huang. Cooperative Interference Management for Over-the-Air Computation Networks. arXiv:2007.11765v1 [cs.IT] Jul. 23, 2020. Optimized Power Control for Over-the-Air Computation in Fading Channels. DOI 10.1109/TWC.2020.3012287, IEEE.

Xiaowen Cao, Guangxu Zhu, Jie Xu, and Kaibin Huang. Optimized Power Control for Over-the-Air Computation in Fading Channels. DOI 10.1109/TWC.2020.3012287, IEEE.

Li Chen, Nan Zhao, Senior Member, IEEE, Yunfei Chen, Senior Member, IEEE, F. Richard Yu, Fellow, IEEE, and Guo Wei. Over-the-air Computation for Cooperative Wideband Spectrum Sensing and Performance Analysis.

Li Chen, Nan Zhao, Senior Member, IEEE, Yunfei Chen, Senior Member, IEEE, F. Richard Yu, Fellow, IEEE, and Guo Wei. Over-the-air Computation for IoT Networks: Computing Multiple Functions with Antenna Arrays. DOI 10.1109/JIOT.2018.2843321, IEEE.

Matthias Frey, Igor Bjelakovic and S?awomir Stanczak. Over-The-Air Computation in Correlated Channels. arXiv:2007.02648v2 [cs. IT] Nov. 18, 2020.

Wanchun Liu, Member, IEEE, Xin Zang, Yonghui Li, Fellow, IEEE, Branka Vucetic, Fellow, IEEE. Over-the-Air Computation Systems: Optimization, Analysis and Scaling Laws. DOI 10.1109/TWC.2020. 2993703, IEEE.

Tao Jiang and Yuanming Shi. Over-the-Air Computation via Intelligent Reflecting Surfaces. Downloaded on Mar. 19, 2021 at 08:19:46 UTC from IEEE Xplore.

Guangxu Zhu, Jie Xu, Kaibin Huang, and Shuguang Cui. Over-the-Air Computing for Wireless Data Aggregation in Massive IoT. arXiv:2009.02181v2 [cs.NI] Nov. 14, 2020.

Omid Abari, Hariharan Rahul, Dina Katabi. Over-the-air Function Computation in Sensor Networks. arXiv:1612.02307v1 [cs.NI] Dec. 7, 2016.

Dingzhu Wen, Guangxu Zhu, and Kaibin Huang. Reduced-Dimension Design of MIMO Over-the-Air Computing for Data Aggregation in Clustered IoT Networks. DOI 10.1109/TWC.2019. 2934956, IEEE.

Mario Goldenbaum, and S?awomir Stanczak, Robust Analog Function Computation via Wireless Multiple-Access Channels. IEEE Transactions on Communications, vol. 61, No. 9, Sep. 2013.

Qiao Lan, Hyo Seung Kang, and Kaibin Huang. Simultaneous Signal-and-Interference Alignment for Two-Cell Over-the-Air Computation. arXiv:2001.03309v1 [cs.IT] Jan. 10, 2020.

Ufuk Altun, Graduate Student Member, IEEE, Gunes Kurt, Senior Member, IEEE and Enver Ozdemir, Member, IEEE. The Magic of Superposition: A Survey on the Simultaneous Transmission Based Wireless Systems. arXiv:2102.13144v1 [cs.IT] Feb. 25, 2021.

(56) References Cited

OTHER PUBLICATIONS

Matthias Frey, Igor Bjelakovic and S?awomir Stanczak. Towards Secure Over-The-Air Computation. arXiv:2001.03174v2 [cs.IT] Dec. 7, 2020.
3GPP TS 38.300 V16.8.0 (Dec. 2021), Technical Specification, 3rd Generation Partnership Project; Technical Specification Group Radio Access Network; NR; NR and NG-RAN Overall Description; Stage 2 (Release 16).
Dec. 15, 2025—European Office Action—EP App. 22217385.8.

* cited by examiner

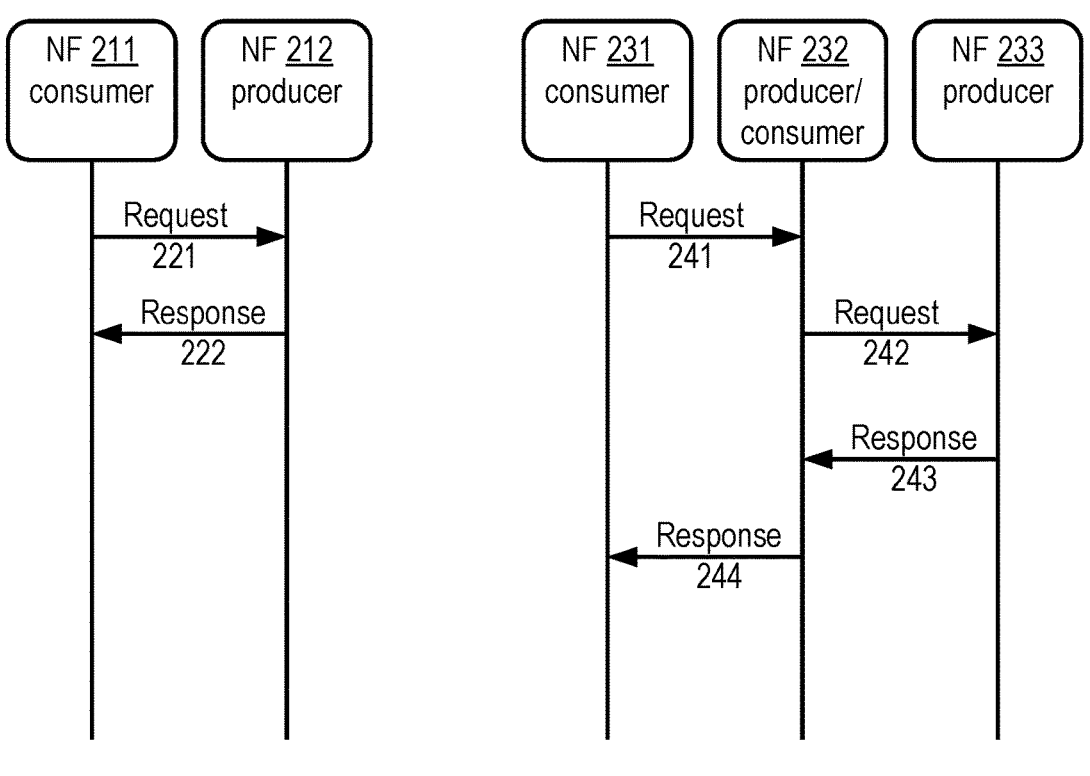
FIG. 2A          FIG. 2B
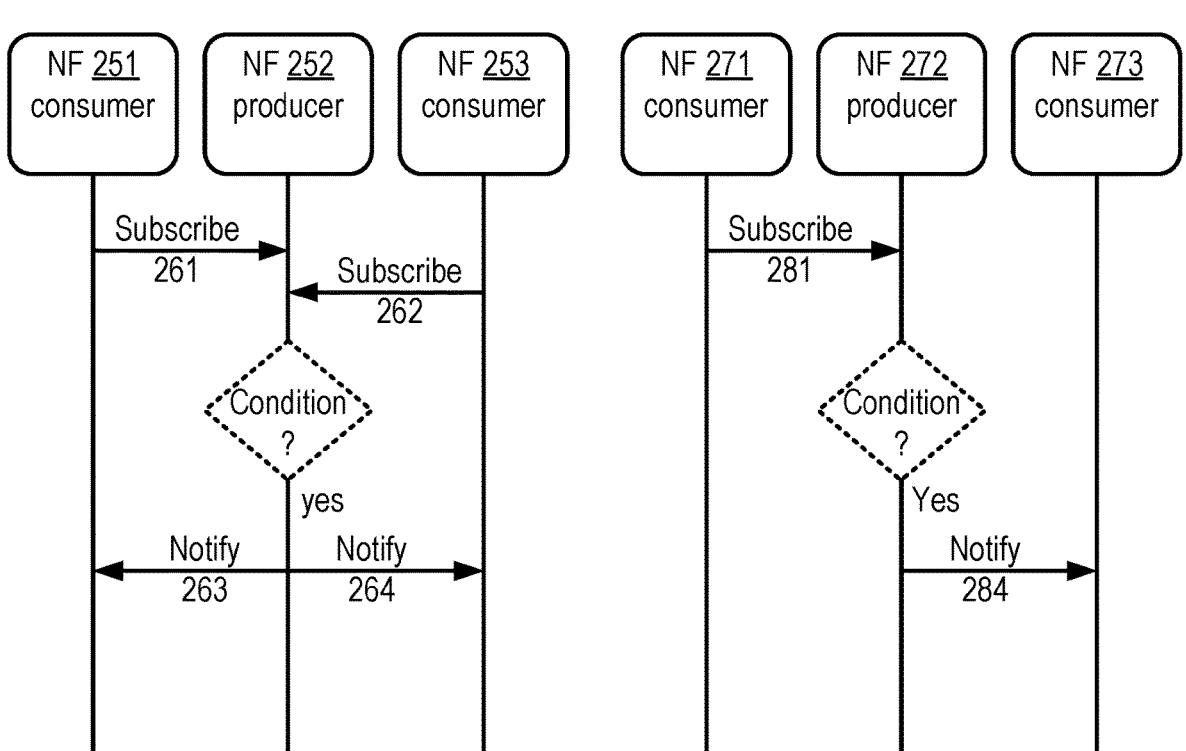
FIG. 2C          FIG. 2D

Figures 14A, 14B, 14C, 14D:
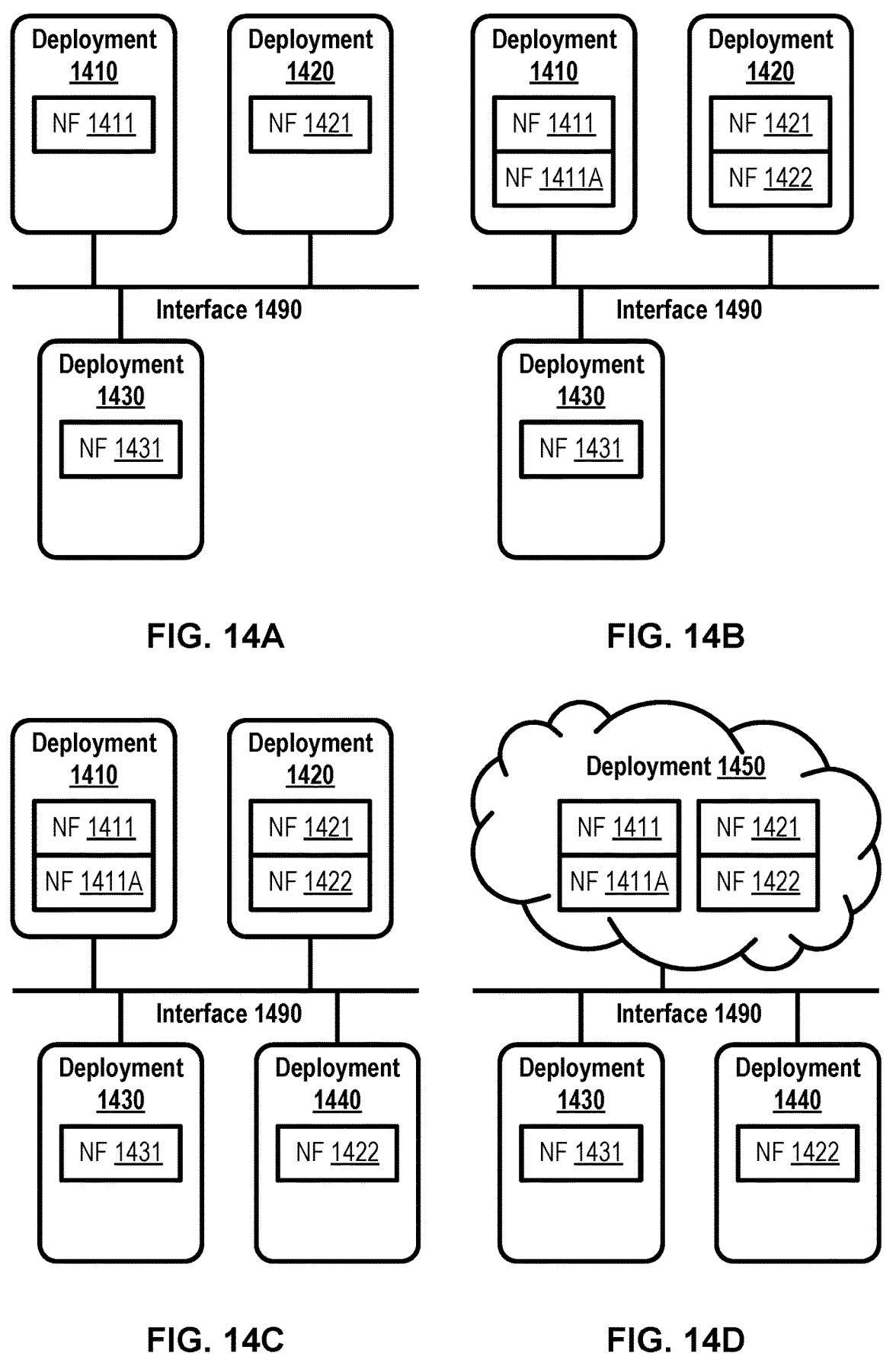

Deployment
1410

NF 1411

Deployment
1420

NF 1421

Interface 1490

Deployment
1430

Deployment
1410

NF 1411

NF 1411A

Deployment
1420

NF 1421

NF 1422

Interface 1490

Deployment
1430

Deployment
1410

NF 1411

NF 1411A

Deployment
1420

NF 1421

NF 1422

Interface 1490

Deployment
1430

NF 1431

Deployment
1440

Deployment 1450

NF 1411

NF 1411A

NF 1421

NF 1422

Interface 1490

Deployment
1430

NF 1431

Deployment
1440

Uplink

Downlink

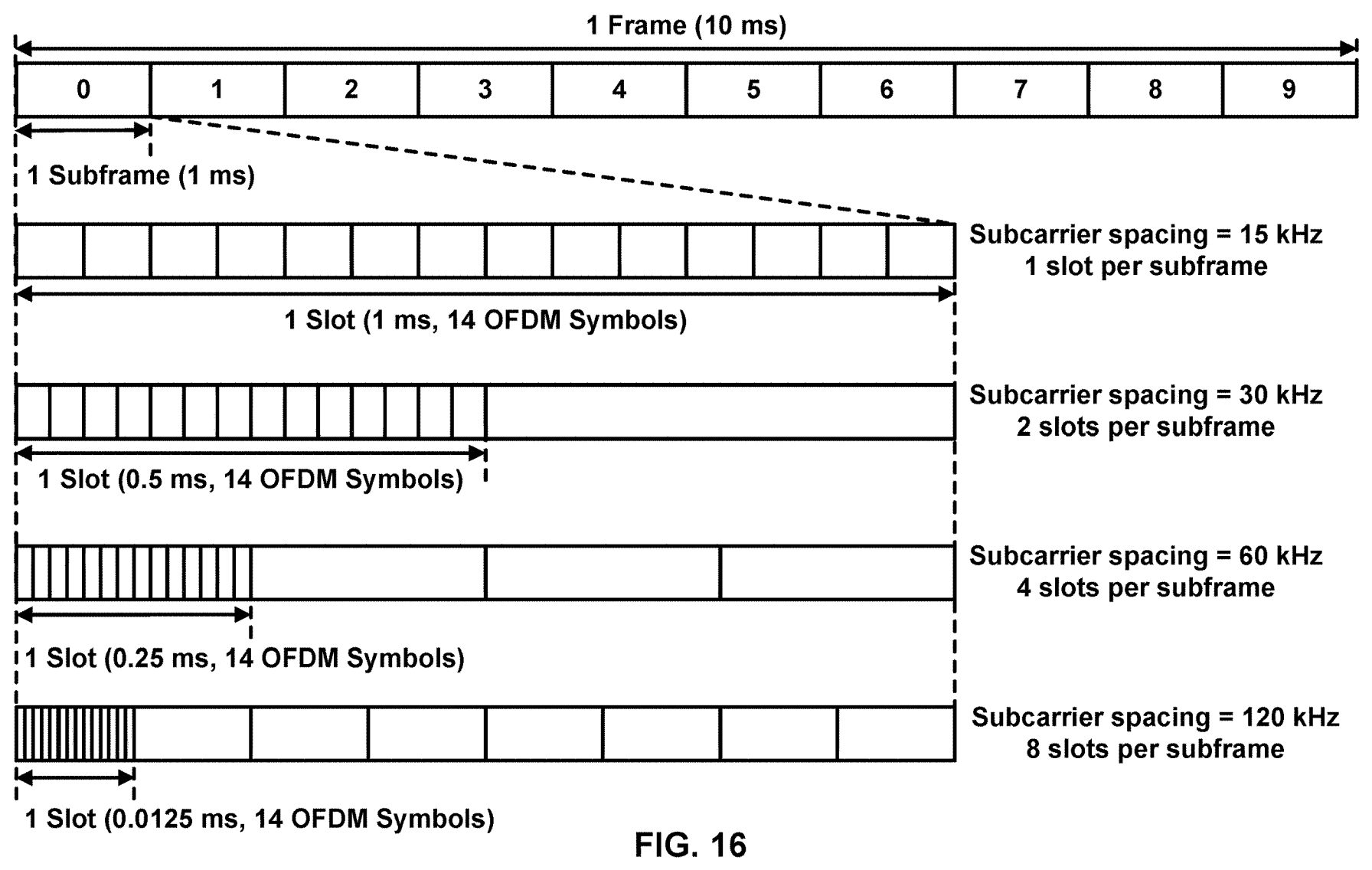

1 Frame (10 ms)

0 | 1 | 2 | 3 | 4 | 5 | 6 | 7 | 8 | 9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 16

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

Standardized 5QI to QoS characteristics mapping

| 5QI value | Resource type | (Default) Priority level | PDB | PER | Maximum data burst volume | Averaging window |
|-----------|---------------|--------------------------|-------|-----------|---------------------------|------------------|
| 1 | GBR | 20 | 100ms | $10^{-2}$ | N/A | 2000ms |
| 5 | Non-GBR | 10 | 100ms | $10^{-6}$ | N/A | N/A |
| 82 | Non-GBR | 19 | 10ms | $10^{-4}$ | 255 bytes | 2000ms |

FIG. 23

Modified 5QI to QoS characteristics mapping

| 5QI value | Resource type | (Default) Priority level | PDB | PER | Maximum data burst volume | Averaging window | MSE |
|---|---|---|---|---|---|---|---|
| 1 | GBR | 20 | 100ms | $10^{-2}$ | N/A | 2000ms | N/A |
| 5 | Non-GBR | 10 | 100ms | $10^{-6}$ | N/A | N/A | N/A |

| 82 | Non-GBR | 19 | 10ms | $10^{-4}$ | 255 bytes | 2000ms | N/A |
| A1 | AirComp | A2 | A3 | N/A | N/A | A4 | A5 |
| B1 | Analog | B2 | B3 | N/A | N/A | B4 | B5 |

FIG. 24

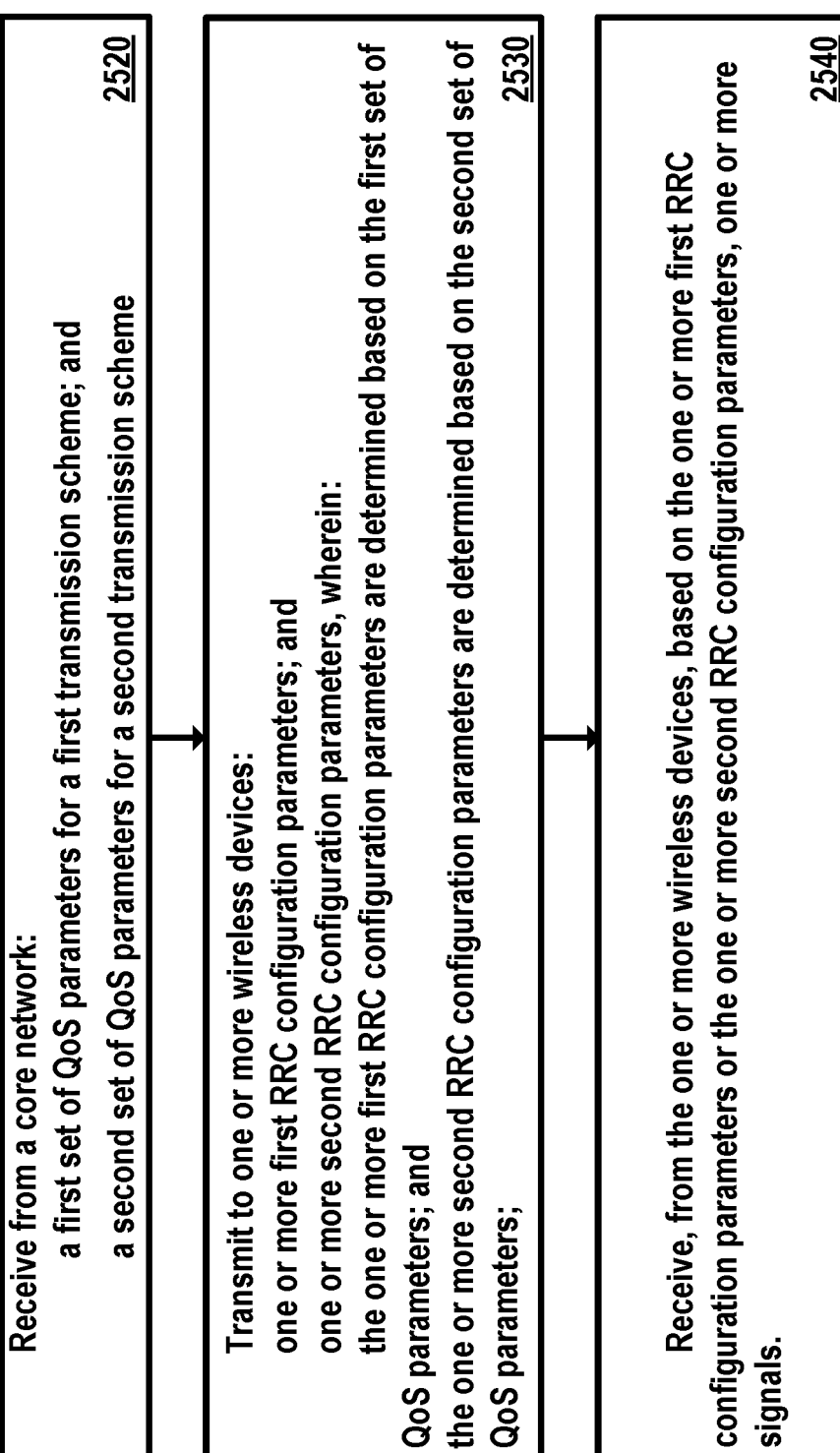

Receive from a core network:
a first set of QoS parameters for a first transmission scheme; and
a second set of QoS parameters for a second transmission scheme    2520

Transmit to one or more wireless devices:
one or more first RRC configuration parameters; and
one or more second RRC configuration parameters, wherein:
the one or more first RRC configuration parameters are determined based on the first set of QoS parameters; and
the one or more second RRC configuration parameters are determined based on the second set of QoS parameters;    2530

Receive, from the one or more wireless devices, based on the one or more first RRC configuration parameters or the one or more second RRC configuration parameters, one or more signals.    2540

FIG. 25A

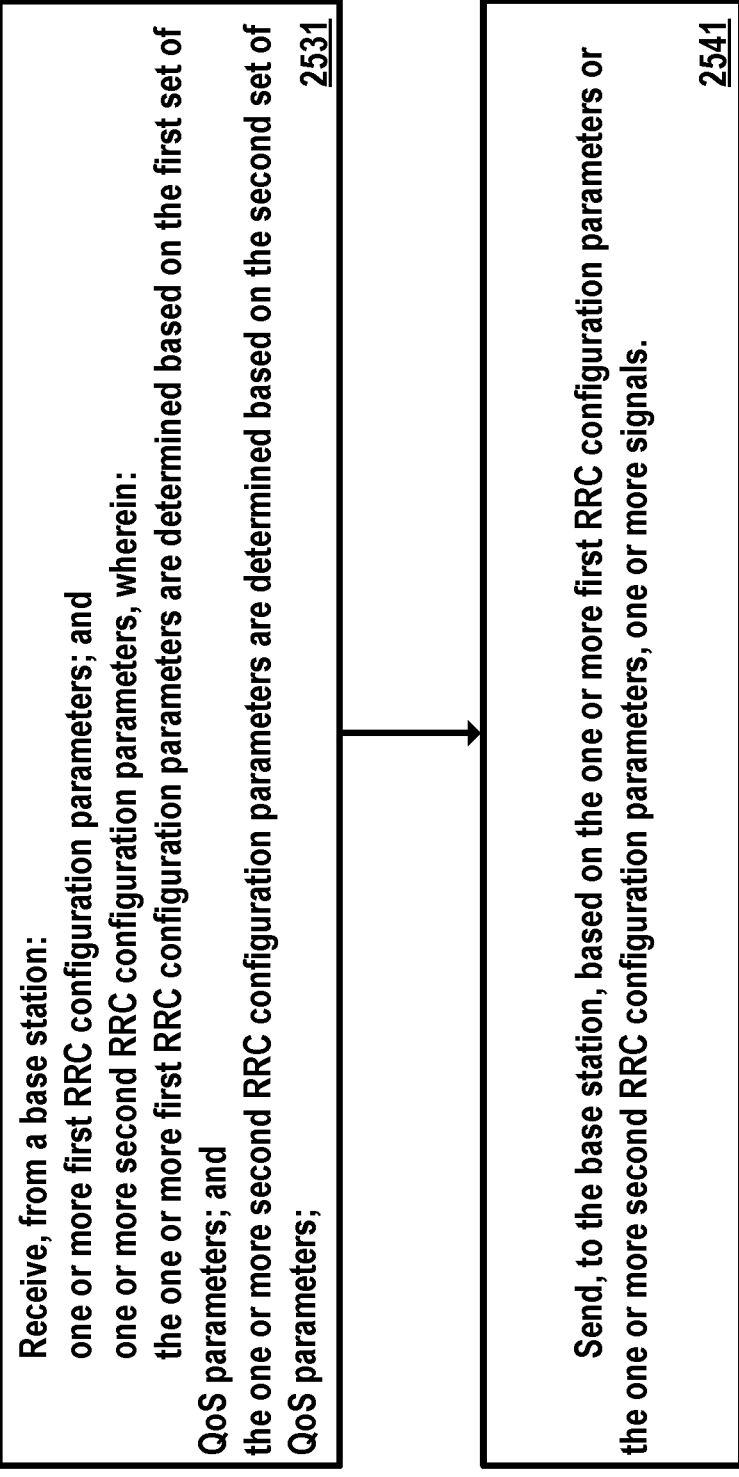

Receive, from a base station:
one or more first RRC configuration parameters; and
one or more second RRC configuration parameters, wherein:
the one or more first RRC configuration parameters are determined based on the first set of QoS parameters; and
the one or more second RRC configuration parameters are determined based on the second set of QoS parameters;

2531

Send, to the base station, based on the one or more first RRC configuration parameters or the one or more second RRC configuration parameters, one or more signals.

Determine:
a first set of QoS parameters for a first transmission scheme; and
a second set of QoS parameters for a second transmission scheme
2511

Send, to a base station:
the first set of QoS parameters for a first transmission scheme; and
the second set of QoS parameters for a second transmission scheme
2521

QUALITY MANAGEMENT FOR WIRELESS DEVICES

CROSS-REFERENCE TO RELATED APPLICATIONS

This application claims the benefit of U.S. Provisional Application No. 63/295,688, filed on Dec. 31, 2021. The above referenced application is hereby incorporated by reference in its entirety.

BACKGROUND

A wireless device is configured by a base station for wireless communications between the wireless device and the base station. A protocol data unit (PDU) session is established for wireless communications between the wireless device and a core network via the base station. The PDU session uses quality of service (QoS) flows to address QoS requirements of the wireless communications.

SUMMARY

The following summary presents a simplified summary of certain features. The summary is not an extensive overview and is not intended to identify key or critical elements.

Wireless devices may communicate with a base station. One or more resources (e.g., time and/or frequency resource(s)) may be used and/or shared by one or more wireless devices. For example, a shared resource may be used by a plurality of wireless devices to communicate information (e.g., a same type of information) to a base station. The information may comprise, for example, measurement data from each of the plurality of wireless devices, such as sensor measurements (e.g., temperature, pressure, humidity, and/or any other sensed/measured data). Rather than using separate configuration parameters for each wireless device and its respective uplink transmission, one or more configuration parameters (e.g., QoS parameter(s)) may be applied for a group of uplink transmissions that use a shared resource. By using group configurations and associated communications described herein, advantages may be achieved such as reduced overhead signaling and/or reduced power consumption.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 2A, FIG. 2B, FIG. 2C, and FIG. 2D show examples frameworks for a service-based architecture within a core network.

FIG. 7A shows an example a user plane protocol stack.

FIG. 7B shows an example a control plane protocol stack.

FIG. 7C shows example services provided between protocol layers of the user plane protocol stack.

FIG. 14A, FIG. 14B, FIG. 14C, and FIG. 14D show various example arrangements of physical core network deployments.

FIG. 16 shows an example configuration of a frame.

FIG. 23 shows an example of mapping QoS characteristics.

FIG. 24 shows an example of mapping QoS characteristics.

FIG. 25A shows an example method for quality management of wireless communications.

FIG. 25B shows an example method for quality management of wireless communications.

DETAILED DESCRIPTION

Figures 1A, 1B:
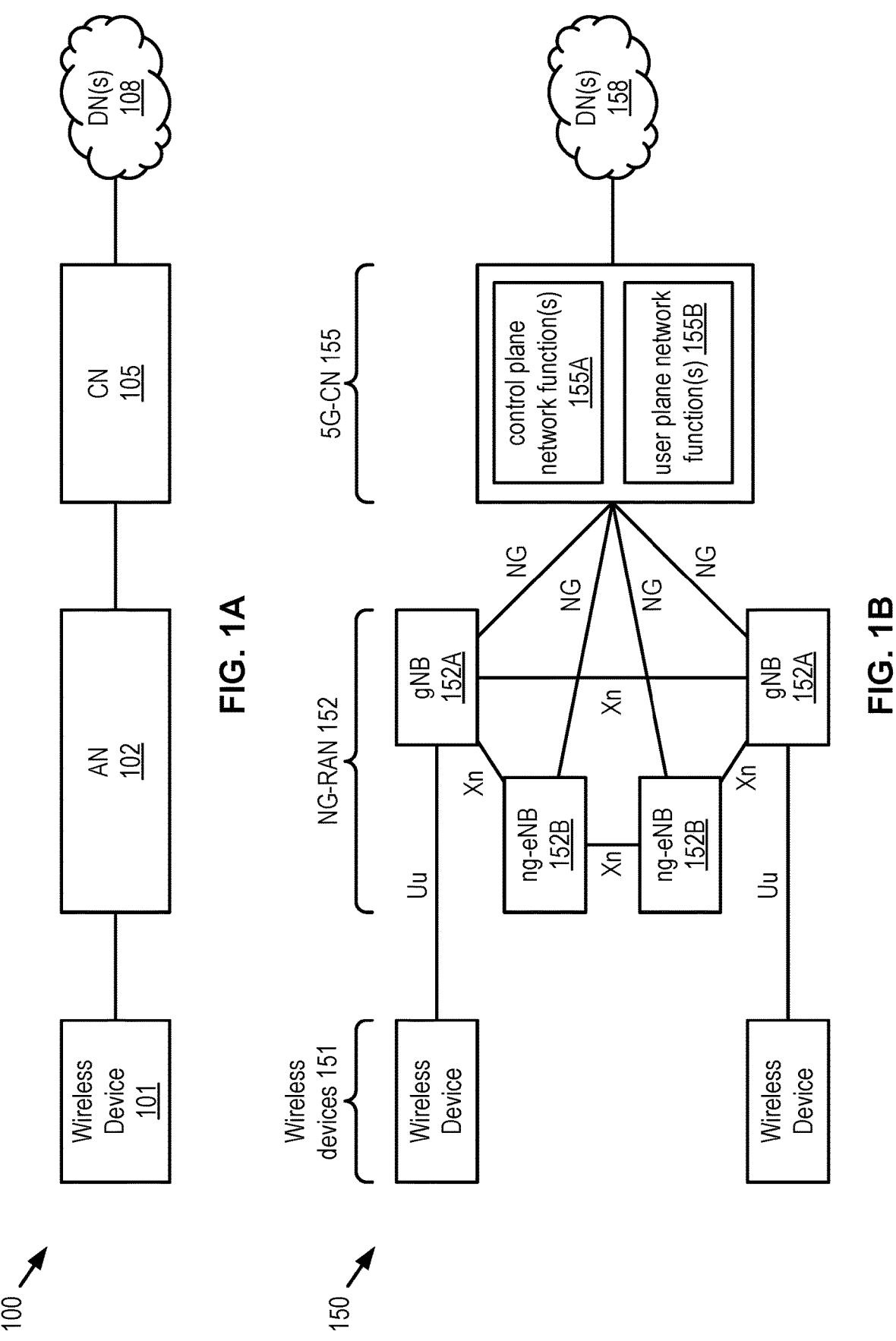
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to a multiple access procedure for wireless communications.

FIG. 1A shows an example communication network 100. The communication network 100 may comprise, for example, a public land mobile network (PLMN) operated/managed/run by a network operator. The communication network 100 comprise one or more of a wireless device 101, an access network (AN) 102, a core network (CN) 105, and/or one or more data network(s) (DNs) 108.

The wireless device 101 may communicate with DNs 108, for example, via AN 102 and/or CN 105. As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, an unmanned aerial vehicle, an urban air mobility aircraft, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The AN 102 may connect the wireless device 101 to the CN 105. A communication direction from the AN 102 to the wireless device 101 may be referred to as a downlink and/or a downlink communication direction. The communication direction from the wireless device 101 to the AN 102 may be referred to as an uplink and/or an uplink communication direction. Downlink transmissions may be separated and/or distinguished from uplink transmissions using frequency division duplexing (FDD), time-division duplexing (TDD), any other duplexing and/or multiplexing schemes, and/or some combination of the two duplexing techniques. The AN 102 may connect to and/or communicate with wireless device 101 via radio communications over an air interface. An AN that at least partially operates over the air interface may be referred to as a radio access network (RAN). A RAN may comprise one or more of: a radio unit (RU), distributed unit (DU), and/or a centralized unit (CU). A RAN may operate in a virtualized and/or in a non-virtualized environment. A RAN may perform one or more network functions in hardware. A RAN may perform one or more network functions in software. A RAN may perform one or more network functions in hardware and/or software. The CN 105 may set up/configure one or more end-to-end connections between wireless device 101 and the one or more DNs 108. The CN 105 may authenticate wireless device 101, provide a charging functionality, and/or provide/configure one or more additional functionalities/services for the wireless device 101.

As used throughout, the term "base station" may refer to, comprise, and/or encompass any element of the AN 102 that facilitates communication between wireless device 101 and the AN 102 (and/or any other elements of the communication network 100). A base station may comprise an RU. ANs and base stations may be referred to by other terminologies and/or may have other implementations. The base station may be a terrestrial base station at a fixed location on the earth. The base station may be a mobile base station with a moving coverage area. The base station may be on an aerial vehicle and/or may be located in space. For example, the base station may be on board an aircraft or a satellite. The RAN may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

The base station may be referred to using different terminologies in different communication standards/protocols. For example, WiFi and other standards may use the term access point. The Third-Generation Partnership Project (3GPP) has produced specifications for three generations of mobile networks, each of which uses a different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use different terminologies to refer to the elements/components which implement the methods described in the present disclosure (e.g., wireless devices, base stations, ANs, CNs, components thereof, and/or other elements in a communication network). A base station may be and/or comprise a repeater or relay node used to extend the coverage area of a donor node. A repeater node may amplify and rebroadcast a radio signal received from a donor node. A relay node may perform the same/similar functions as a repeater node. A relay node may decode radio signals received from the donor node (e.g., to remove noise) before amplifying and rebroadcasting the radio signal.

The AN 102 may include one or more base stations. The one or more base stations may have/serve one or more coverage areas. A geographical size and/or an extent of a coverage area may be based on a range at which a receiver of AN 102 can successfully receive transmissions from a transmitter (e.g., the wireless device 101) operating within the coverage area (and/or vice-versa). The coverage areas may be referred to as sectors or cells. In some contexts, the term cell may refer to a carrier frequency used in a particular coverage area. Base stations with large coverage areas may be referred to as macrocell base stations. Base stations may cover/serve smaller areas, for example, to provide coverage in areas/locations with weak macrocell coverage, and/or to provide additional coverage in areas with high traffic (e.g., referred to as hotspots). Examples of small cell base stations comprise (e.g., in order of decreasing coverage areas) microcell base stations, picocell base stations, femtocell base stations, and/or home base stations. In combination, the coverage areas of the base stations may provide radio coverage/service to the wireless device 101 over a wide geographic area to support wireless device mobility.

A base station may comprise one or more sets of antennas for communicating with the wireless device 101 over an air interface. Each set of antennas may be separately controlled by the base station. Each set of antennas may have a corresponding coverage area. For example, a base station may comprise three sets of antennas to respectively control three coverage areas (e.g., on three different sides) of the base station. A base station may comprise any quantity of antennas, which may correspond to any quantity of coverage areas. The entirety of the base station (and its corresponding antennas) may be deployed at a single location or at a plurality of locations. A controller (e.g., at a central location) may control/operate one or more sets of antennas at one or more distributed locations. The controller may be, for example, a baseband processing unit that comprises a centralized and/or cloud-based RAN architecture. The baseband processing unit may be either centralized in a pool of baseband processing units or may be virtualized. A set of antennas at a distributed location may be referred to as a remote radio head (RRH).

FIG. 1B shows another example communication network 150. The communication network 150 may comprise, for example, a PLMN operated/run by a network operator. The communication network 150 may comprise wireless devices 151, a next generation radio access network (NG-RAN) 152, a 5G core network (5G-CN) 155, and one or more DNs 158. The NG-RAN 152 may comprise one or more base stations (e.g., generation node Bs (gNBs) 152A and/or next generation evolved Node Bs (ng eNBs) 152B). The 5G-CN 155 may comprise one or more network functions (NFs). The one or more NFs may comprise control plane functions 155A and user plane functions 155B. The one or more DNs 158 may comprise public DNs (e.g., the Internet), private DNs, and/or intra-operator DNs. The components/elements shown in FIG. 1B may represent specific implementations and/or terminology of components/elements shown in FIG. 1A.

The base stations of the NG-RAN 152 may be connected to the wireless devices 151 via one or more Uu interfaces. The base stations of the NG-RAN 152 may be connected to each other via one or more first interface(s) (e.g., Xn interface(s)). The base stations of the NG-RAN 152 may be connected to 5G-CN 155 via one or more second interfaces (e.g., NG interface(s)). An interfaces may comprise one or more air interfaces, direct physical connections, indirect connections, and/or combinations thereof. For example, the Uu interface may comprise an air interface. The NG and Xn interfaces may comprise an air interface, direct physical connections, and/or indirect connections over an underlying transport network (e.g., an internet protocol (IP) transport network).

Each of the Uu, Xn, and NG interfaces may be associated with a protocol stack. The protocol stacks may comprise a user plane (UP) protocol stack and a control plane (CP) protocol stack. User plane data may comprise data corresponding to (e.g., associated with and/or pertaining to) users of the wireless devices 151. For example, user plane data may comprise internet content downloaded via a web browser application, sensor data uploaded via a tracking application, and/or email data communicated to and/or from an email server. Control plane data may comprise signaling and/or control message messages. For example, control plane data may facilitate packaging and routing of user plane data such that the user plane data may be communicated with (e.g., sent to and/or received from) the DN(s). The NG interface may be divided into (e.g., may comprise) an NG user plane interface (NG-U) and an NG control plane interface (NG-C). The NG-U interface may provide/perform delivery of user plane data between the base stations and the one or more user plane network functions 155B. The NG-C interface may be used for control signaling between the base stations and the one or more control plane network functions 155A. The NG-C interface may provide, for example, NG interface management, wireless device context management, wireless device mobility management, transport of non-access stratum (NAS) messages, paging, protocol data unit (PDU) session management, and configuration transfer and/or warning message transmission. In at least some scenarios, the NG-C interface may support transmission of user data (e.g., a small data transmission for an IoT device).

One or more of the base stations of the NG-RAN 152 may be split into a central unit (CU) and one or more distributed units (DUs). A CU may be coupled to one or more DUs via an interface (e.g., an F1 interface). The CU may handle one or more upper layers in the protocol stack and the DU may handle one or more lower layers in the protocol stack. For example, the CU may handle a radio resource control (RRC) layer, a physical data convergence protocol (PDCP) layer, and/or a service data application protocol (SDAP) layer, and the DU may handle radio link control (RLC) layer, a medium access control (MAC) layer, and/or a physical (PHY) layer. The one or more DUs may be in geographically diverse locations relative to the CU and/or each other. The CU/DU split architecture may permit increased coverage and/or better coordination.

The gNBs 152A and ng-eNBs 152B may provide different user plane and control plane protocol termination towards the wireless devices 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate wireless devices 151, set up end-to-end connections between wireless devices 151 and the one or more DNs 158, and/or provide charging functionality. The 5G-CN 155 may be based on a service-based architecture. The service-based architecture may enable the NFs comprising the 5G-CN 155 to offer services to each other and to other elements of the communication network 150 via interfaces. The 5G-CN 155 may include any quantity of other NFs and any quantity of instances of each NF.

FIG. 2A, FIG. 2B, FIG. 2C, and FIG. 2D show example frameworks for a service-based architecture within a core network. A service, in a service-based architecture, may be requested/sought by a service consumer and provided by a service producer. An NF may determine, prior to obtaining the requested service, where the requested service may be obtained. The NF may communicate with a network repository function (NRF) to discover a service. For example, an NF that provides one or more services may register with a network repository function (NRF). The NRF may store data relating to the one or more services that the NF is prepared to provide to other NFs in the service-based architecture. A consumer NF may query the NRF to discover/determine a producer NF. For example, the consumer NF may obtain, from the NRF, a list of NF instances that provide a particular service).

As shown in FIG. 2A, an NF 211 (e.g., a consumer NF) may send a request 221 to an NF 212 (e.g., a producer NF). The request 221 may be a request for a particular service. The request 221 may be sent based on a discovery that NF 212 is a producer of that service. The request 221 may comprise data relating to NF 211 and/or the requested service. The NF 212 may receive the request 221, perform one or more actions associated with the requested service (e.g., retrieving data), and provide/send a response 221. The one or more actions performed by the NF 212 may be based on request data included in the request 221, data stored by the NF 212, and/or data retrieved by the NF 212. The response 222 may notify/indicate, to the NF 211, that the one or more actions have been completed. The response 222 may comprise response data relating to the NF 212, the one or more actions, and/or the requested service.

As shown in FIG. 2B, an NF 231 may send a request 241 to an NF 232. A service produced/provided by the NF 232 may comprise sending a request 242 to an NF 233 (e.g., based on receiving the request 241). The NF 233 may perform one or more actions and provide/send a response 243 to the NF 232. The NF 232 may send a response 244 to the NF 231, for example, based on receiving the response 243. As shown in FIG. 2B, an NF (e.g., a single NF) may perform the role of a producer of services, consumer of services, and/or both. A particular NF service may comprise any quantity/number of nested NF services produced by one or more other NFs.

FIG. 2C shows an example of subscribe-notify interactions between a consumer NF and a producer NF. An NF 251 may send a subscription 261 (e.g., a subscription request) to an NF 252. An NF 253 may send a subscription 262 (e.g., a subscription request) to the NF 252. Although FIG. 2C shows two NFs and the NF 252 providing multiple subscription services to the two NFs, a subscribe-notify interaction may comprise one subscriber, and/or any other quantity of subscribers. The NFs 251, 253 may be independent from one another. For example, the NFs 251, 253 may independently discover the NF 252 and/or independently determine to subscribe to the service offered by the NF 252. The NF 252 may provide/send a notification to a subscribing NF, for example, based on receiving the subscription. For example, the NF 252 may send a notification 263 to the NF 251 based on the subscription 261 and/or may send a notification 264 to the NF 253 based on the subscription 262.

The sending of the notifications 263, 264 may be conditional. The sending of the notifications 263, 264 may be based on a determination that a condition has occurred. The notifications 263, 264 may be based on a determination that a particular event has occurred, a determination that a particular condition is outstanding, and/or a determination that a duration of time associated with the subscription has elapsed. The duration of time may be a time period associated with a subscription for notifications (e.g., periodic notifications). The NF 252 may send the notifications 263, 264 to the NFs 251, 253 simultaneously, substantially simultaneously, and/or based on/in response to a same condition. The NF 252 may send the notifications 263, 264 at different times and/or based on/in response to different notification conditions. The NF 251 may request a notification based on a certain parameter, as measured by the NF 252, exceeding a first threshold. The NF 252 may request a notification based on the parameter exceeding a second threshold (e.g., different from the first threshold). A parameter of interest and/or a corresponding threshold may be indicated in the subscriptions 261, 262.

FIG. 2D shows another example of a subscribe-notify interaction. An NF 271 may send a subscription 281 to an NF 272. The NF 272 may send a notification 284, for example, based on/in response to receipt of the subscription 281 and/or a determination that a notification condition has occurred. The notification 284 may be sent to an NF 273. While the example of FIG. 2C shows a notification being sent to the subscribing NF, the example of FIG. 2D shows that a subscription and its corresponding notification may be associated with (e.g., received from and sent to) different NFs. For example, the NF 271 may subscribe to the service provided by the NF 272 on behalf of the NF 273.

Figure 3:
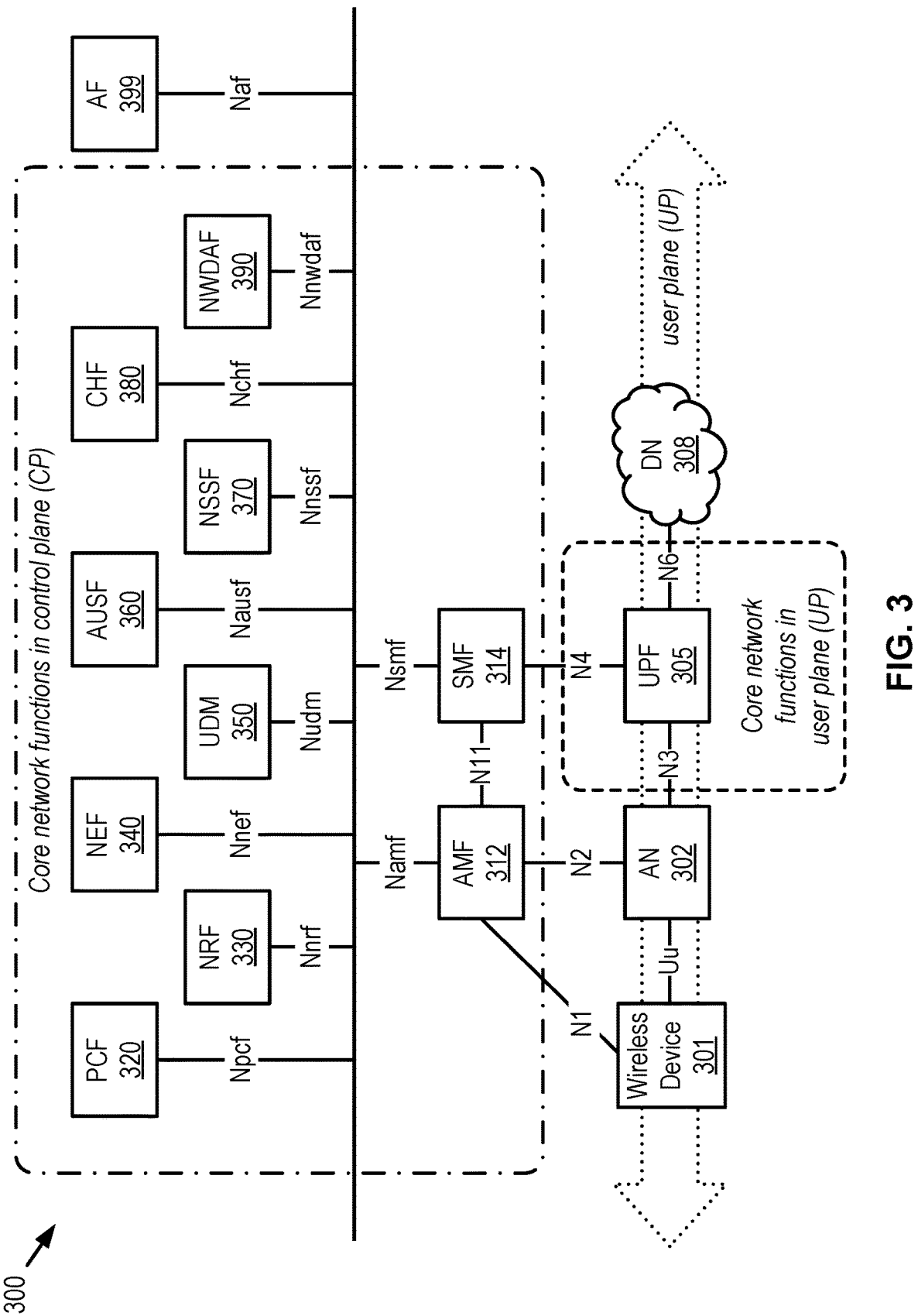
FIG. 3 shows an example communication network.

FIG. 3 shows an example communication network 300. The Communication network 300 may comprise a wireless device 301, an AN 302, and/or a DN 308. The other elements shown in FIG. 3 may be included in and/or associated with a core network. An element (e.g., each element) of the core network may be an NF.

The NFs may comprise a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and/or an application function (AF) 399. The UPF 305 may be a user plane core network function. The NFs 312, 314, and 320-390 may be control plane core network functions. The core network may comprise additional instances of any of the NFs shown in FIG. 3 and/or one or more different types of NF that provide different services. Other examples of NF type may comprise a gateway mobile location center (GMLC), a location management function (LMF), an operations, administration, and maintenance function (OAM), a public warning system (PWS), a short message service function (SMSF), a unified data repository (UDR), and/or an unstructured data storage function (UDSF).

An element (e.g., each element) shown in FIG. 3 may comprise an interface with at least one other element. The interface may be a logical connection and/or a direct physical connection. Any interface may be identified/indicated using a reference point representation and/or a service-based representation. In a reference point representation, the letter N may be used followed by a numeral to indicate an interface between two specific elements. For example, as shown in FIG. 3, the AN 302 and the UPF 305 may interface via N3, whereas UPF 305 and DN 308 may interface via N6. In a service-based representation, the letter N may be followed by one or more alphabets/letters. The letters may identify/indicate an NF that provides services to the core network. For example, PCF 320 may provide services via interface Npcf. The PCF 320 may provide services to any NF in the core network via Npcf. A service-based representation may correspond to a bundle of reference point representations. For example, the Npcf interface between PCF 320 and the core network may generally correspond to an N7 interface between PCF 320 and SMF 314, an N30 interface between PCF 320 and NEF 340, and/or an N# interface between any functions where # may indicate any number.

The UPF 305 may serve as a gateway for user plane traffic between the AN 302 and the DN 308. The wireless device 301 may connect to UPF 305 via a Uu interface and an N3 interface (also described as NG-U interface). The UPF 305 may connect to the DN 308 via an N6 interface. The UPF 305 may connect to one or more other UPFs (not shown) via an N9 interface. The wireless device 301 may be configured to receive services through a protocol data unit (PDU) session. The PDU session may be a logical connection between the wireless device 301 and the DN 308. The UPF 305 (or a plurality of UPFs) may be selected by the SMF 314 to handle/process a particular PDU session between the wireless device 301 and the DN 308. The SMF 314 may control the functions of the UPF 305 with respect to the PDU session. The SMF 314 may connect to the UPF 305 via an N4 interface. The UPF 305 may handle/process any quantity of PDU sessions associated with any quantity of wireless devices (via any quantity of ANs). The UPF 305 may be controlled, for handling the one or more PDU sessions, by any quantity of SMFs via any quantity of corresponding N4 interfaces.

The AMF 312 may control wireless device access to the core network. The wireless device 301 may register with the network via the AMF 312. for the wireless device 301 may register with the network prior to establishing a PDU session. The AMF 312 may manage a registration area of the wireless device 301, which may enable the network to track the physical location of wireless device 301 within the network. The AMF 312 may manage wireless device mobility for a wireless device in connected mode. For example, the AMF 312 may manage wireless device handovers from one AN (or portion thereof) to another. The AMF 312 may perform, for a wireless device in idle mode, registration updates, and/or page the wireless device to transition the wireless device to connected mode.

The AMF 312 may receive, from the wireless device 301, NAS messages. The NAS messages may be sent/transmitted in accordance with NAS protocol. NAS messages may relate to communications between the wireless device 301 and the core network. NAS messages may be relayed to the AMF 312 via the AN 302. Communication between the wireless device 301 and the AMF 312 may be represented as communication via the N1 interface. NAS messages may facilitate wireless device registration and mobility management, for example, by authenticating, identifying, configuring, and/or managing a connection of the wireless device 301. NAS messages may support session management procedures for maintaining user plane connectivity and quality of service (QoS) of a session between the wireless device 301 and the DN 309. The AMF 312 may send a NAS message to SMF 314, for example, if the NAS message involves (e.g., is associated with, corresponds to) session management. NAS messages may be used to transport messages between wireless device 301 and other components of the core network (e.g., core network components other than AMF 312 and SMF 314). The AMF 312 may act on/process a NAS message, or alternatively, forward the NAS message to an appropriate core NF (e.g., SMF 314, etc.).

The SMF 314 may establish, modify, and/or release a PDU session based on messaging received from the wireless device 301. The SMF 314 may allocate, manage, and/or assign an IP address to the wireless device 301, for example, based on establishment of a PDU session. Multiple SMFs may be in/associated with the network. Each of the SMFs may be associated with a respective group of wireless devices, base stations, and/or UPFs. A wireless device with multiple PDU sessions may be associated with a different SMF for each PDU session. The SMF 314 may select one or more UPFs to handle/process a PDU session. The SMF 314 may control the handling/processing of the PDU session by the selected UPF by providing rules for packet handling (e.g., packet detection rules (PDRs), forwarding action rules (FARs), QoS enforcement rules (QERs), etc.). Rules relating to QoS and/or charging for a particular PDU session may be obtained from the PCF 320 and provided to the UPF 305 (e.g., by the SMF 314).

The PCF 320 may provide/send, to other NFs, services relating to policy rules. The PCF 320 may use subscription data and information about network conditions to determine policy rules. The PCF 320 may provide the policy rules to a particular NF which may be responsible for enforcement of those rules. Policy rules may relate to policy control for access and mobility, and may be enforced by the AMF 312.

Policy rules may relate to session management, and may be enforced by the SMF 314. Policy rules may be network-specific, wireless device-specific, session-specific, and/or data flow-specific.

The NRF 330 may provide service discovery functions. The NRF 330 may belong/correspond to a particular PLMN. The NRF 330 may maintain NF profiles relating to other NFs in the communication network 300. The NF profile may comprise, for example, an address, PLMN, and/or type of the NF, a slice indicator/identifier, a list of the one or more services provided by the NF, and/or authorization required to access the services.

The NEF 340 may provide an interface to external domains, permitting the external domains to selectively access the control plane of the communication network 300. The external domain may comprise, for example, third-party network functions, application functions, and/or any other functions. The NEF 340 may act as a proxy between external elements and network functions such as the AMF 312, the SMF 314, the PCF 320, the UDM 350, and/or any other functions. As an example, the NEF 340 may determine a location and/or reachability status of the wireless device 301 based on reports from the AMF 312, and/or may provide status information to an external element. An external element may provide, via the NEF 340, information that facilitates the setting of parameters for establishment of a PDU session. The NEF 340 may determine which data and capabilities of the control plane are exposed to the external domain. The NEF 340 may provide secure exposure (e.g., by authenticating and/or authorizing an external entity) to exposed data or capabilities of the communication network 300. The NEF 340 may selectively control the exposure such that the internal architecture of the core network is hidden/obscured from the external domain.

The UDM 350 may provide data storage for other NFs. The UDM 350 may permit a consolidated view of network information. The consolidated view may be used to ensure that the most relevant information may be made available to different NFs from a single resource. The UDM 350 may store and/or retrieve information from a unified data repository (UDR). For example, the UDM 350 may obtain user subscription data relating to the wireless device 301 from the UDR.

The AUSF 360 may support mutual authentication of the wireless device 301 by the core network and authentication of the core network by the wireless device 301. The AUSF 360 may perform key agreement procedures and provide keying material that may be used to improve security.

The NSSF 370 may select/determine one or more network slices to be used by the wireless device 301. The NSSF 370 may select a slice based on slice selection information. For example, the NSSF 370 may receive single network slice selection assistance information (S-NSSAI) and map the S-NSSAI to a network slice instance identifier (NSI).

The CHF 380 may control billing-related tasks associated with wireless device 301. For example, the UPF 305 may report/send traffic usage information, associated with wireless device 301, to the SMF 314. The SMF 314 may collect usage data from the UPF 305 and one or more other UPFs. The usage data may indicate a quantity of data exchanged, a DN that the data is exchanged with, a network slice associated with the data, and/or any other information that may influence billing. The SMF 314 may share the collected usage data with the CHF 380. The CHF 380 may use the collected usage data to perform billing-related tasks associated with wireless device 301. The CHF 380 may, depending on the billing status of wireless device 301, instruct the SMF

314 to limit and/or influence/control access of the wireless device 301 and/or provide billing-related notifications to wireless device 301.

The NWDAF 390 may collect and/or analyze data from other NFs and/or offer data analysis services to other NFs. The NWDAF 390 may receive/collect, from the UPF 305, the AMF 312, and/or the SMF 314, data/information relating to a load level for a particular network slice instance. The NWDAF 390 may provide (e.g., based on the collected data) load level data to the PCF 320 and/or the NSSF 370, and/or may notify the PCF 320 and/or the NSSF 370 if a load level for a slice reaches and/or if a load level for a slice exceeds a load level threshold.

The AF 399 may be outside the core network, but may interact with the core network to provide information relating to the QoS requirements and/or traffic routing preferences associated with a particular application. The AF 399 may access the core network based on the exposure constraints imposed by the NEF 340. An operator of the core network may consider the AF 399 to be a trusted domain that may directly access the core network (and/or the communication network 300).

Figure 4A:
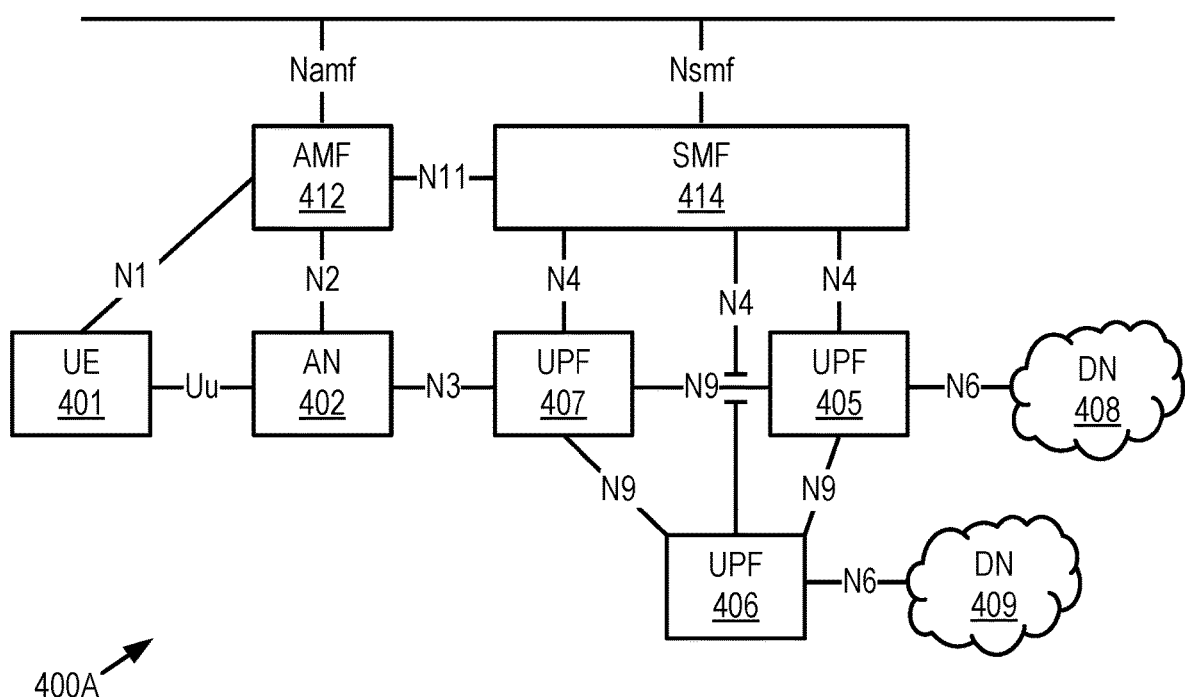
FIG. 4A and FIG. 4B show example core network architectures.
Figure 4B:
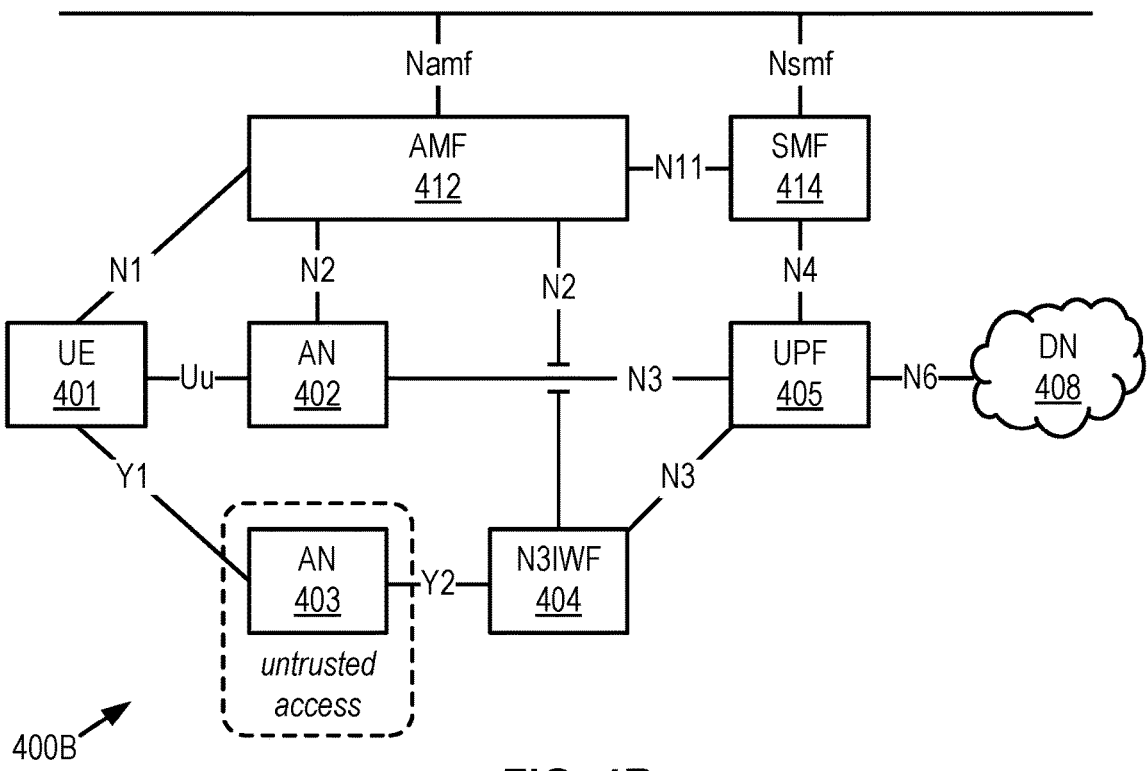
Figure 5:
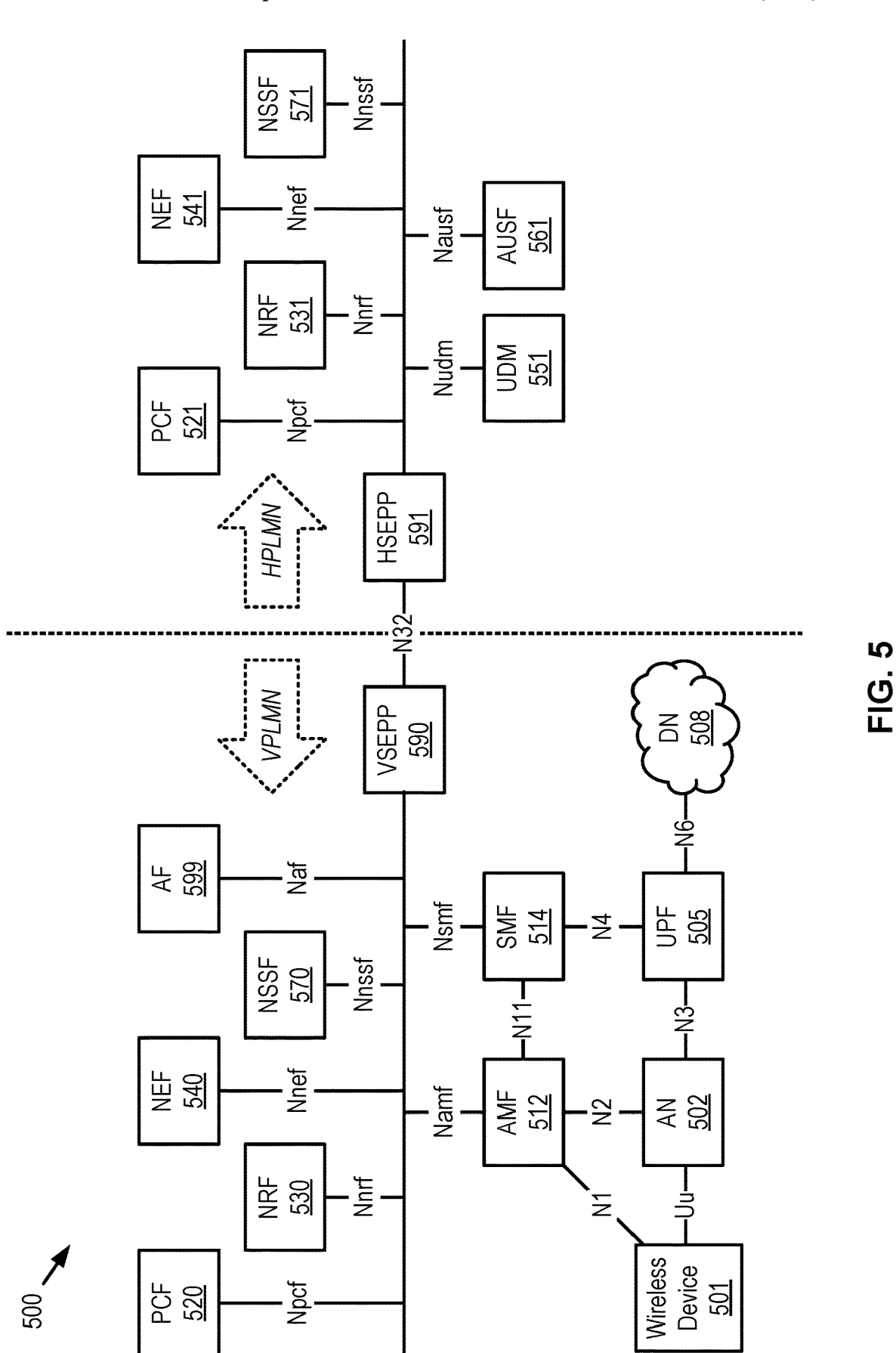
FIG. 5 shows an example of a core network architecture.

FIGS. 4A, 4B, and 5 show examples of core network architectures. The core network architectures shown in FIGS. 4A, 4B, and 5 may be analogous in some respects to the core network architecture 300 shown in FIG. 3. For brevity, some of the core network elements shown in FIG. 3 are not shown in FIGS. 4A, 4B, and 5 but may be included in one or more of these core network architectures. Many of the elements shown in FIGS. 4A, 4B, and 5 may be analogous in some respects to elements depicted in FIG. 3. For brevity, some of the details relating to their functions or operation are not shown but may be included in one or more of these core network architectures. Operation of one or more elements shown in FIGS. 4A, 4B, and 5 may be similar, or substantially similar, to corresponding elements shown in FIG. 3.

FIG. 4A shows an example of a core network architecture. The core network architecture 400A of FIG. 4A may comprise an arrangement of multiple UPFs. Core network architecture 400A may comprise one or more of: a wireless device 401, an AN 402, an AMF 412, and/or an SMF 414. The core network architecture 400A may comprise multiple UPFs (e.g., a UPF 405, a UPF 406, and a UPF 407) and multiple DNs (e.g., a DN 408 and a DN 409). Each of the multiple UPFs 405, 406, 407 may communicate with the SMF 414 via a corresponding N4 interface. The DNs 408, 409 may communicate with the UPFs 405, 406, respectively, via N6 interfaces. The multiple UPFs 405, 406, 407 may communicate with one another via N9 interfaces.

The UPFs 405, 406, 407 may perform traffic detection. The UPFs 405, 406, 407 may indicate, identify, and/or classify packets. Packet indication/identification may be performed based on PDRs provided by the SMF 414. PDRs may comprise packet detection information. Packet detection information may comprise one or more of: a source interface, a wireless device IP address, core network (CN) tunnel information (e.g., a CN address of an N3/N9 tunnel corresponding to a PDU session), a network instance indicator/identifier, a QoS flow indicator/identifier (QFI), a filter set (e.g., an IP packet filter set and/or an ethernet packet filter set), and/or an application indicator/identifier.

PDRs may indicate one or more rules for handling the packet upon detection thereof. The one or more rules may comprise, for example, FARs, multi-access rules (MARs), usage reporting rules (URRs), QERs, and/or any other rule. For example, the PDR may comprise one or more FAR identifiers, MAR identifiers, URR identifiers, and/or QER identifiers. The identifiers may indicate the rules that are prescribed/to be used for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface (e.g., "access" for downlink or "core" for uplink). The FAR may indicate a buffering action rule (BAR), for example, if a packet is to be buffered. The UPF 405 may perform data buffering of a certain quantity downlink packets, for example, if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark/indicate packets belonging to a particular QoS flow with a corresponding QFI. The marking may enable a recipient of the packet to determine a QoS of the packet (e.g., a QoS to be enforced for the packet).

The UPF 405 may provide/send usage reports to the SMF 414 in accordance with a URR. The URR may indicate one or more triggering conditions for generation and/or reporting of the usage report. The reporting may be based on immediate reporting, periodic reporting, a threshold for incoming uplink traffic, and/or any other suitable triggering condition. The URR may indicate a method for measuring usage of network resources (e.g., data volume, duration, and/or event).

The DNs 408, 409 may comprise public DNs (e.g., the Internet), private DNs (e.g., private, internal corporate-owned DNs), and/or intra-operator DNs. A DN (e.g., each DN) may provide an operator service and/or a third-party service. The service provided by a DN may be an Internet service, an IP multimedia subsystem (IMS), an augmented or virtual reality network, an edge computing or mobile edge computing (MEC) network, and/or any other service. A DN (e.g., each DN) may be indicated/identified using a data network name (DNN). The wireless device 401 may be configured to establish a first logical connection with the DN 408 (e.g., a first PDU session), a second logical connection with DN 409 (e.g., a second PDU session), or both simultaneously (e.g., the first PDU session and the second PDU sessions).

A PDU session (e.g., each PDU) session may be associated with at least one UPF configured to operate as a PDU session anchor (PSA, or anchor). The anchor may be a UPF that may provide an N6 interface with a DN.

The UPF 405 may be the anchor for the first PDU session between wireless device 401 and DN 408. The UPF 406 may be the anchor for the second PDU session between wireless device 401 and DN 409. The core network may use the anchor to provide service continuity of a particular PDU session (e.g., IP address continuity) as wireless device 401 moves from one access network to another. The wireless device 401 may establish a PDU session using a data path to the DN 408 and using an access network other than AN 402. The data path may use the UPF 405 acting as anchor. The wireless device 401 may (e.g., later) move into the coverage area of the AN 402. The SMF 414 may select a new UPF (e.g., the UPF 407) to bridge the gap between the newly-entered access network (e.g., the AN 402) and the anchor UPF (e.g., the UPF 405). The continuity of the PDU session may be preserved as any quantity/number of UPFs may be added and/or removed from the data path. A UPF added to a data path (e.g., as shown in FIG. 4A) may be described as an intermediate UPF and/or a cascaded UPF.

The UPF 406 may be the anchor for the second PDU session between wireless device 401 and the DN 409. The anchor for the first PDU session and the anchor for the second PDU sessions being associated with different UPFs (e.g., as shown in FIG. 4A) is merely exemplary. Multiple PDU sessions with a single DN may correspond to any quantity/number of anchors. A UPF at the branching point (e.g., the UPF 407 in FIG. 4) may operate as an uplink classifier (UL-CL), for example, if there are multiple UPFs. The UL-CL may divert uplink user plane traffic to different UPFs.

The SMF 414 may allocate, manage, and/or assign an IP address to the wireless device 401. The SMF 414 may allocate, manage, and/or assign an IP address to the wireless device 401, for example, based on establishment of a PDU session. The SMF 414 may maintain an internal pool of IP addresses to be assigned. The SMF 414 may (e.g., if necessary) assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of wireless device 401 may be maintained (and the same anchor UPF may be used) as the wireless device moves within the network. In SSC mode 2, the IP address of wireless device 401 may be changed as the wireless device 401 moves within the network. For example, the old IP address and an old anchor UPF may be abandoned and a new IP address and a new anchor UPF may be established, for example, as the wireless device 401 moves within the network. In SSC mode 3, it may be possible to maintain an old IP address (e.g., similar to SSC mode 1) temporarily while establishing a new IP address (e.g., similar to SSC mode 2). Applications that may be sensitive to IP address changes may operate in accordance with SSC mode 1.

UPF selection may be controlled by the SMF 414. The SMF 414 may select the UPF 405 as the anchor for the PDU session and/or the UPF 407 as an intermediate UPF, for example, based on establishment and/or modification of a PDU session between the wireless device 401 and DN 408. Criteria for UPF selection may comprise path efficiency and/or speed (e.g., a data rate) between the AN 402 and the DN 408. Reliability, load status, location, slice support and/or other capabilities of candidate UPFs may also be considered for UPF selection.

FIG. 4B shows an example of a core network architecture. The core network architecture 400B of FIG. 4B may accommodate untrusted access. The wireless device 401, as shown in FIG. 4B, may communicate with (e.g., connect to) the DN 408 via the AN 402 and the UPF 405. The AN 402 and the UPF 405 may constitute/comprise/provide trusted (e.g., 3GPP) access to the DN 408. The wireless device 401 may access the DN 408 using an untrusted access network. The untrusted access network may comprise the AN 403 and/or a non-3GPP interworking function (N3IWF) 404.

The AN 403 may be a wireless local area network (WLAN) (e.g., operating in accordance with the IEEE 802.11 standard). The wireless device 401 may communicate with (e.g., connect to) the AN 403 via an interface Y1. The connection may be in a manner that is prescribed for the AN 403. The connection to the AN 403 may or may not involve authentication. The wireless device 401 may obtain/receive an IP address from the AN 403. The wireless device 401 may determine to connect to the core network 400B using untrusted access. The AN 403 may communicate with N3IWF 404 via a Y2 interface. After selecting untrusted access, the wireless device 401 may provide N3IWF 404 with sufficient information to select an AMF. The selected AMF may be, for example, the same AMF that is used by wireless device 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA). The UPF 405 may remain the anchor for a PDU session, for example, even as wireless device 401 shifts between trusted access and untrusted access.

FIG. 5 shows an example of a core network architecture. The core network architecture 500 of FIG. 5 may correspond to an example in which a wireless device 501 may be roaming. The wireless device 501 (e.g., in a roaming scenario) may be a subscriber of a first PLMN (e.g., a home PLMN, or HPLMN) but may attach to a second PLMN (e.g., a visited PLMN, or VPLMN). The core network architecture 500 may comprise a wireless device 501, an AN 502, a UPF 505, and/or a DN 508. The AN 502 and the UPF 505 may be associated with a VPLMN. The VPLMN may manage the AN 502 and/or the UPF 505 using core network elements associated with the VPLMN. The core network elements associated with the VPLMN may comprise an AMF 512, an SMF 514, a PCF 520, an NRF 530, an NEF 540, and/or an NSSF 570. An AF 599 may be adjacent the core network of the VPLMN.

The wireless device 501 may not be a subscriber of the VPLMN. The AMF 512 may authorize the wireless device 501 to access the network (e.g., the VPLMN), for example, based on roaming restrictions that may apply to wireless device 501. The core network of the VPLMN may interact with core network elements of an HPLMN of the wireless device 501 (e.g., a PCF 521, an NRF 531, an NEF 541, a UDM 551, and/or an AUSF 561), for example, to obtain network services provided by the VPLMN. The VPLMN and the HPLMN may communicate using an N32 interface connecting respective security edge protection proxies (SEPPs). The respective SEPPs may be a VSEPP 590 and/or an HSEPP 591.

The VSEPP 590 and/or the HSEPP 591 may communicate via an N32 interface (e.g., for defined purposes). The VSEPP 590 and the HSEPP 591 may communicate via an N32 interface while concealing information about each PLMN from the other. The SEPPs may apply roaming policies, for example, based on communications via the N32 interface. The PCF 520 and/or the PCF 521 may communicate via the SEPPs to exchange policy-related signaling. The NRF 530 and/or the NRF 531 may communicate via the SEPPs to enable service discovery of NFs in the respective PLMNs. The VPLMN and HPLMN may independently maintain the NEF 540 and the NEF 541. The NSSF 570 and/or the NSSF 571 may communicate via the SEPPs to coordinate slice selection for the wireless device 501. The HPLMN may handle all authentication and subscription related signaling. The VPLMN may authenticate the wireless device 501 and/or obtain subscription data of the wireless device 501 by accessing, via the SEPPs, the UDM 551 and the AUSF 561 of the HPLMN, for example, if the wireless device 501 registers and/or requests service via the VPLMN.

The core network architecture 500 may be referred to as a local breakout configuration, in which the wireless device 501 may access the DN 508 using one or more UPFs of the VPLMN (i.e., the UPF 505). Other configurations are possible. For example, in a home-routed configuration (not shown in FIG. 5), the wireless device 501 may access a DN using one or more UPFs of the HPLMN. In the home-routed configuration, an N9 interface may run parallel to the N32 interface, crossing the frontier between the VPLMN and the HPLMN, to carry user plane data. One or more SMFs of the respective PLMNs may communicate, via the N32 interface, to coordinate session management for the wireless device 501. The SMFs may control their respective UPFs on either side of the frontier.

Figure 6:
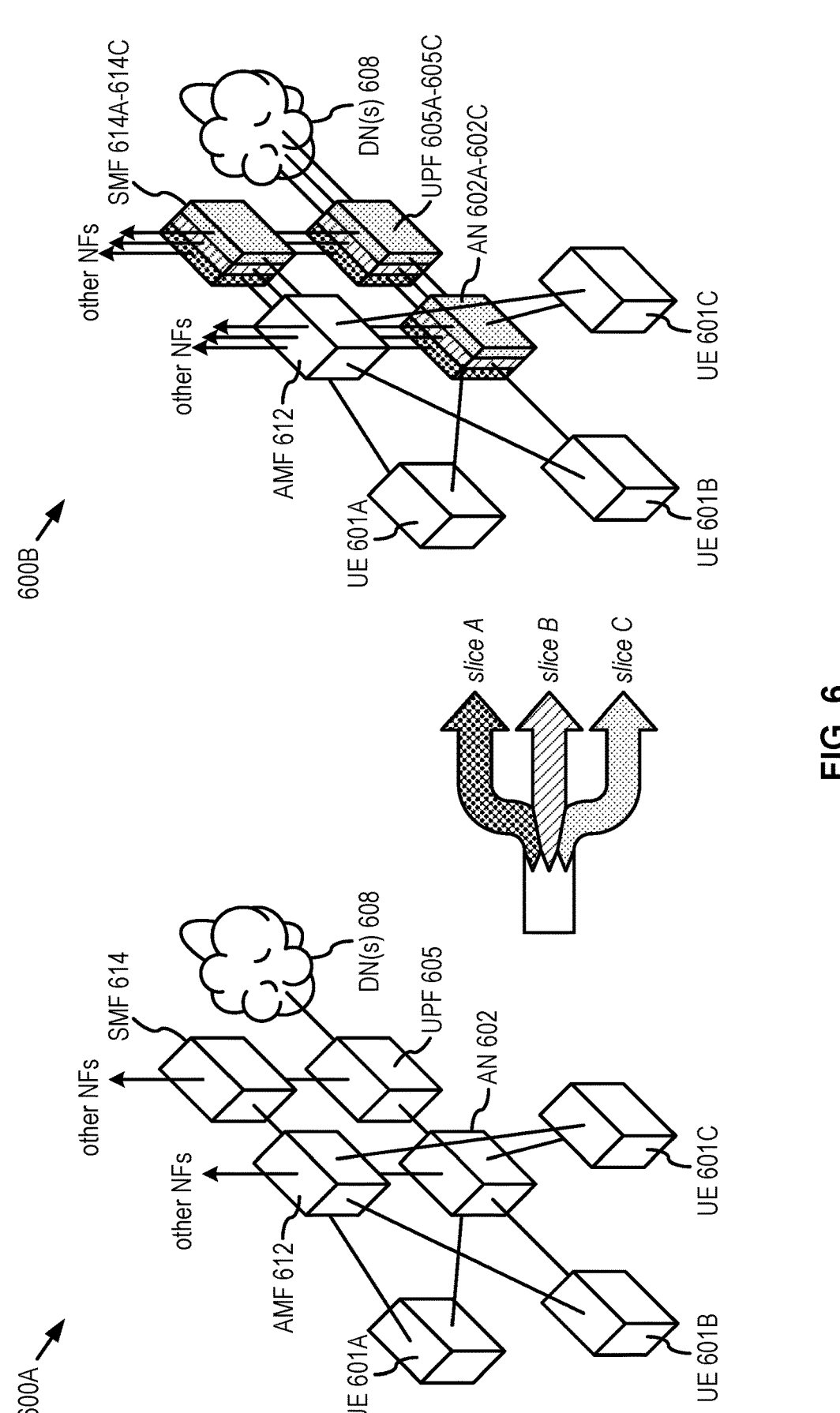
FIG. 6 shows an example of network slicing.

FIG. 6 shows an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A shows an un-sliced physical network corresponding to a single logical network. The network architecture 600A may comprise a user plane. Wireless devices 601A, 601B, 601C (collectively, wireless devices 601) may have a physical and/or a logical connection to a DN 608 via an AN 602 and a UPF 605 of the user plane. The network architecture 600A may comprise a control plane. An AMF 612 and an SMF 614, in the control plane, may control various aspects of the user plane.

The network architecture 600A may have a specific set of characteristics (e.g., relating to maximum bit rate, reliability, latency, bandwidth usage, power consumption, etc.). The set of characteristics may be affected by the nature/properties of the network elements (e.g., processing power, availability of free memory, proximity to other network elements, etc.) and/or the management thereof (e.g., optimization to maximize bit rate or reliability, reduce latency, reduce power, reduce bandwidth usage, etc.). The characteristics of the network architecture 600A may change over time. For example, by upgrading equipment and/or by modifying procedures to target a particular characteristic may change the characteristics of the network architecture 600A. At any given time, the network architecture 600A may have a single set of characteristics that may or may not be optimized for a particular use case. For example, wireless devices 601A, 601B, 601C may have different requirements, with the network architecture 600A being optimized for one of the three wireless devices.

The network architecture 600B shows an example of a sliced physical network divided into multiple logical networks. The physical network may be divided into three logical networks (e.g., slice A, slice B, and slice C). For example, the wireless device 601A may be served by AN 602A, UPF 605A, AMF 612, and SMF 614A. Wireless device 601B may be served by AN 602B, UPF 605B, AMF 612, and SMF 614B. Wireless device 601C may be served by AN 602C, UPF 605C, AMF 612, and SMF 614C. Although the respective wireless devices 601 may communicate with different network elements from a logical perspective, the network elements may be deployed by a network operator using the same physical network elements.

One or more network slices (e.g., each network slice) may be configured for providing network services with different sets of characteristics. For example, slice A may correspond to an enhanced mobile broadband (eMBB) service. Mobile broadband may refer to internet access by mobile users, commonly associated with smartphones. Slice B may correspond to ultra-reliable low-latency communication (URLLC), which may focus on reliability and speed. Relative to eMBB, URLLC may improve the feasibility of use cases such as autonomous driving and telesurgery. Slice C may correspond to massive machine type communication (mMTC), which may focus on low-power services delivered to a large number of users. For example, slice C may be optimized for a dense network of battery-powered sensors that may provide small amounts of data at regular intervals. Many mMTC use cases may be prohibitively expensive if they operated using an eMBB or URLLC network.

A network slice serving a wireless device 601 may be updated (e.g., to provide better and/or more suitable services), for example, if service requirements for one of the wireless devices 601 changes. The set of network characteristics corresponding to eMBB, URLLC, and mMTC may be varied, such that differentiated species of eMBB, URLLC, and mMTC may be provided for a wireless device. Network operators may provide entirely new services, for example, based on/in response to customer demand.

A wireless device 601 (e.g., each of the wireless devices 601) may have/use (or be associated with) a corresponding network slice. A single slice may serve any number/quantity of wireless devices and a single wireless device may operate using any number/quantity of slices. The AN 602, the UPF 605 and the SMF 614 may be separated into three separate slices, and the AMF 612 may be unsliced. A network operator may deploy any architecture that selectively utilizes any mix of sliced and unsliced network elements, with different network elements divided into different numbers/quantities of slices. Although FIG. 6 shows three core network functions (e.g., the UPF 605, the AMF 612, the SMF 614), other core network functions (e.g., such as other core network functions not shown) may be sliced. A PLMN that supports multiple network slices may maintain a separate network repository function (NFR) for each slice, which may enable other NFs to discover network services associated with that slice.

Network slice selection may be controlled by an AMF, or alternatively, by a separate network slice selection function (NSSF). For example, a network operator may define/configure and implement distinct network slice instances (NSIs). Each NSI may be associated with single network slice selection assistance information (S-NSSAI). The S-NSSAI may comprise a particular slice/service type (SST) indicator (e.g., indicating eMBB, URLLC, mMTC, etc.). For example, a particular tracking area may be associated with one or more configured S-NSSAIs. wireless devices may identify one or more requested and/or subscribed S-NSSAIs (e.g., during registration). The network may indicate to the wireless device one or more allowed and/or rejected S-NSSAIs.

The S-NSSAI may comprise a slice differentiator (SD) to distinguish between different tenants of a particular slice and/or service type. For example, a tenant may be a customer (e.g., a vehicle manufacture, a service provider, etc.) of a network operator that obtains (e.g., purchases) guaranteed network resources and/or specific policies for servicing its subscribers. The network operator may configure different slices and/or slice types, and use the SD to determine which tenant is associated with a particular slice.

Figures 7A, 7B, 7C:
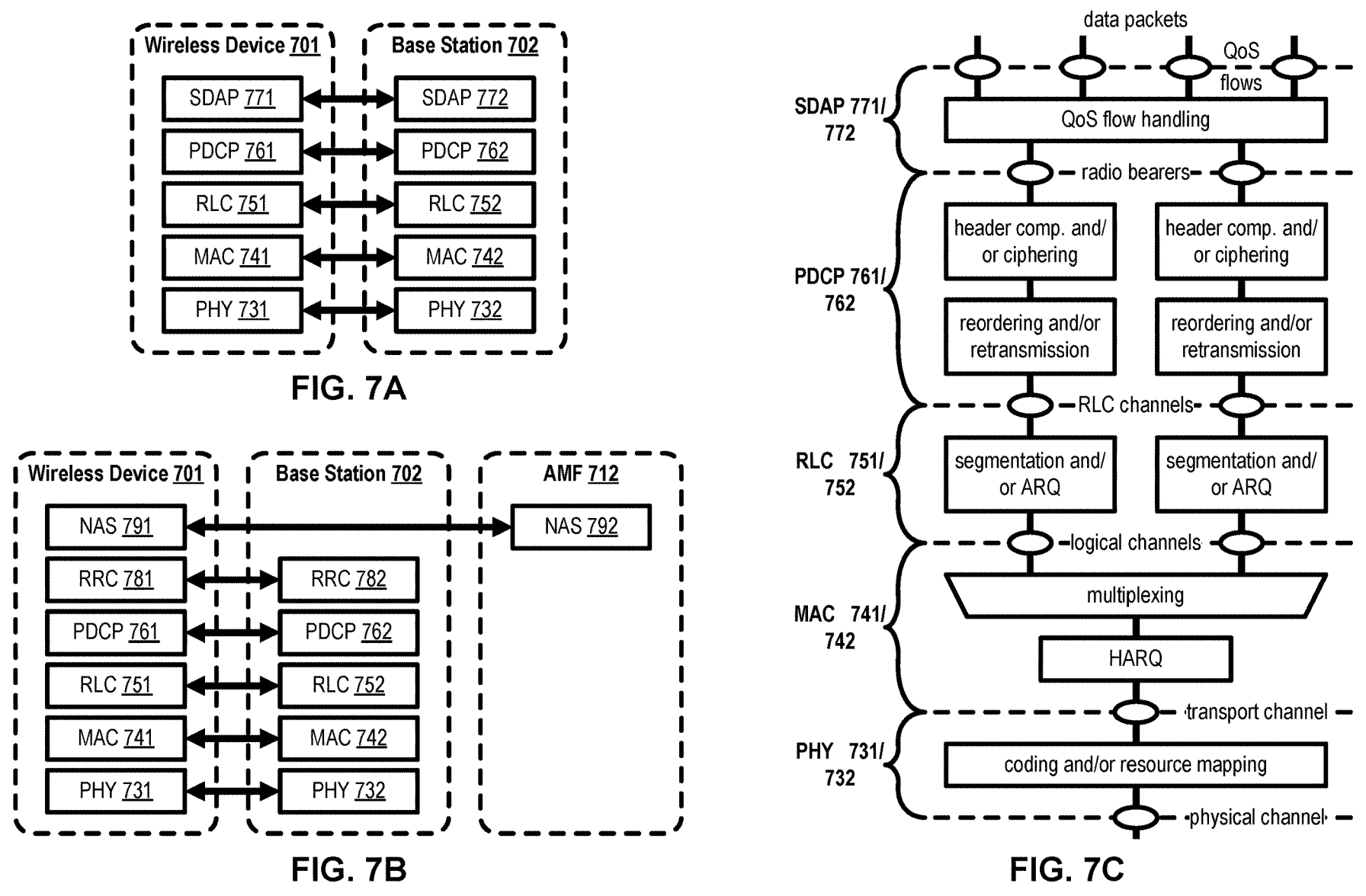

FIG. 7A shows an example UP protocol stack. FIG. 7B shows an example CP protocol stack. FIG. 7C shows example services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a PHY layer. PHY layer may correspond to physical infrastructure used for transfer of signals (e.g., cables, fiber optics, and/or radio frequency transceivers). Layer 1 (e.g., in NR protocols) may comprise a PHY layer. Layer 2 may correspond to a data link layer. Layer 2 may correspond to/be associated with packaging of data (into, e.g., data frames) for transfer, between nodes of the network (e.g., using the physical infrastructure of layer 1). Layer 2 (e.g., in NR protocols) may comprise a MAC layer, an RLC layer, a PDCP layer, and an SDAP layer.

Layer 3 may correspond to a network layer. Layer 3 may be associated with routing of the data which has been packaged in layer 2. Layer 3 may handle prioritization of data and traffic avoidance. Layer 3 (e.g., in NR protocols) may comprise an RRC layer and a NAS layer. Layers 4 through 7 may correspond to a transport layer, a session layer, a presentation layer, and an application layer. The application layer may interact with an end user to provide data associated with an application. An end user, implementing the application, may generate data associated with the application and initiate sending of that information to a targeted data network (e.g., the Internet, an application server, etc.). Starting at the application layer, each layer in the OSI model may manipulate and/or repackage the information and/or deliver it to a lower layer. At the lowest layer, the manipulated and/or repackaged information may be exchanged via physical infrastructure (e.g., electrically, optically, and/or electromagnetically). The information, approaching/received at the targeted data network, may be unpackaged and provided to higher layers, for example, until it reaches the application layer in a form that is usable by the targeted data network (e.g., the same form in which it was provided by the end user). The data network may perform this procedure, in reverse, for responding to the end user.

FIG. 7A shows an example UP protocol stack. The UP protocol stack may be an NR protocol stack for a Uu interface between a wireless device 701 and a base station 702. In layer 1 of the UP protocol stack, the wireless device 701 may implement a PHY layer (e.g., PHY 731) and the base station 702 may implement a PHY layer (e.g., PHY 732). In layer 2 of the UP protocol stack, the wireless device 701 may implement a MAC layer (e.g., MAC 741), an RLC layer (e.g., RLC 751), a PDCP layer (e.g., PDCP 761), and an SDAP layer (e.g., SDAP 771). The base station 702 may implement a MAC layer (e.g., MAC 742), an RLC layer (e.g., RLC 752), a PDCP layer (e.g., PDCP 762), and an SDAP layer (e.g., SDAP 772).

FIG. 7B shows a CP protocol stack. The CP protocol stack may be an NR protocol stack for the Uu interface between the wireless device 701 and the base station 702 and/or an N1 interface between the wireless device 701 and an AMF 712. In layer 1 of the CP protocol stack, the wireless device 701 may implement the PHY 731 and the base station 702 may implement the PHY 732. In layer 2 of the CP protocol stack, the wireless device 701 may implement the MAC 741, the RLC 751, the PDCP 761, an RRC layer (e.g., RRC 781), and a NAS layer (e.g., NAS 791). The base station 702 may implement the MAC 742, the RLC 752, the PDCP 762, and an RRC layer (e.g., RRC 782). The AMF 712 may implement a NAS layer (e.g., NAS 792).

The NAS (e.g., NAS 791 and NAS 792) may be concerned with/correspond to the non-access stratum. The non-access stratum may comprise communication between the wireless device 701 and the core network (e.g., the AMF 712). Lower layers may be concerned with/correspond to the access stratum. The access stratum may comprise communication between the wireless device 701 and the base station 702. Messages sent between the wireless device 701 and the core network may be referred to as NAS messages.

A NAS message may be relayed by the base station 702. Content of the NAS message (e.g., information elements of the NAS message) may not be visible to the base station 702.

FIG. 7C shows an example of services provided between protocol layers (e.g., of the NR user plane protocol stack shown in FIG. 7A). The wireless device 701 may receive services through a PDU session. The PDU session may be a logical connection between the wireless device 701 and a DN. The wireless device 701 and the DN may exchange data packets associated with the PDU session. The PDU session may comprise one or more QoS flows. The SDAP 771 and/or the SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the base station 702. The wireless device 701 may be notified of the mapping (e.g., based on control signaling and/or reflective mapping). The SDAP 772 of the base station 220 may mark downlink packets with a QFI and/or deliver the downlink packets to the wireless device 701 (e.g., for reflective mapping). The wireless device 701 may determine the mapping based on the QFI of the downlink packets.

The PDCP 761 and the PDCP 762 may perform header compression and/or decompression. Header compression may reduce the amount of data transmitted over the physical layer. The PDCP 761 and the PDCP 762 may perform ciphering and/or deciphering. Ciphering may reduce unauthorized decoding of data sent/transmitted over the physical layer (e.g., intercepted on an air interface), and/or may protect data integrity (e.g., to ensure control messages originate from intended sources). The PDCP 761 and/or the PDCP 762 may perform retransmissions of undelivered packets, in-sequence delivery and/or reordering of packets, duplication of packets, and/or identification and removal of duplicate packets. The PDCP 761 and/or the PDCP 762 may perform mapping between a split radio bearer and RLC channels, for example, in a dual connectivity scenario.

The RLC 751 and the RLC 752 may perform segmentation and retransmission through automatic repeat request (ARQ). The RLC 751 and the RLC 752 may perform removal of duplicate data units received from the MAC 741 and the MAC 742, respectively. The RLC 751 and the RLC 752 may provide RLC channels as a service to the PDCP 761 and the PDCP 762, respectively.

The MAC 741 and/or the MAC 742 may perform multiplexing and/or demultiplexing of logical channels. The MAC 741 and/or the MAC 742 may map logical channels to transport channels. The wireless device 701 may (e.g., in MAC 741) multiplex data units of one or more logical channels into a transport block. The wireless device 701 may send/transmit the transport block to the base station 702 using PHY 731. The base station 702 may receive the transport block using the PHY 732. The base station 702 may demultiplex data units of the transport blocks back into logical channels. The MAC 741 and/or the MAC 742 may perform error correction through hybrid automatic repeat request (HARQ), logical channel prioritization, and/or padding.

The PHY 731 and/or the PHY 732 may perform mapping of transport channels to physical channels. The PHY 731 and/or the PHY 732 may perform digital and analog signal processing functions (e.g., coding/decoding and modulation/demodulation) for sending and receiving information (e.g., transmission via an air interface). The PHY 731 and/or the PHY 732 may perform multi-antenna mapping.

Figure 8:
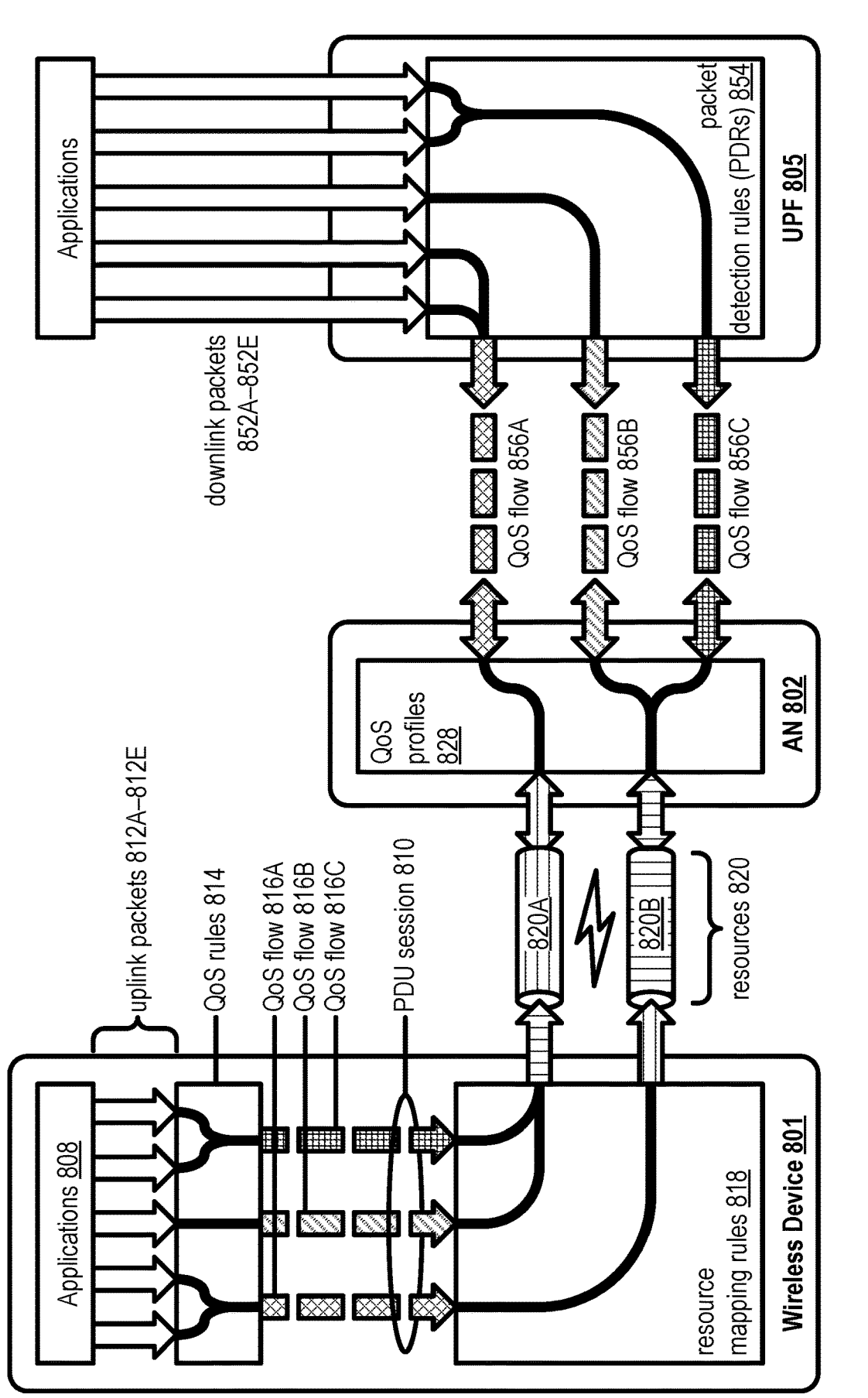
FIG. 8 shows an example quality of service (QoS) model.

FIG. 8 shows an example of a QoS model. The QoS model may be for differentiated data exchange. The QoS model may comprise a wireless device 801, an AN 802, and/or a UPF 805. The QoS model may facilitate prioritization of PDUs (which may also be referred to as packets). Higher-priority packets may be exchanged faster and/or more reliably than lower-priority packets. The network may devote more resources to exchange of high QoS packets (e.g., high priority packets).

A PDU session 810 may be established between the wireless device 801 and the UPF 805. The PDU session 810 may be a logical connection enabling the wireless device 801 to exchange data with a particular data network (e.g., the Internet). The wireless device 801 may request establishment of the PDU session 810. The wireless device 801 may indicate/identify the targeted data network based on its data network name (DNN), for example, at the time that the PDU session 810 is established. The PDU session 810 may be managed by an SMF (not shown). The SMF may select the UPF 805 (and/or optionally, one or more other UPFs, not shown), for example, to facilitate exchange of data associated with the PDU session 810, between the wireless device 801 and the data network.

One or more applications 808 associated with wireless device 801 may generate uplink packets 812A-812E associated with the PDU session 810. The wireless device 801 may apply QoS rules 814 to the uplink packets 812A-812E in accordance with a QoS model. The QoS rules 814 may be associated with the PDU session 810. The QoS rules 814 may be determined by and/or provided to the wireless device 801, for example, based on establishment and/or modification of the PDU session 810 (e.g., if/when the PDU session 810 is established and/or modified). The wireless device 801, based on the QoS rules 814, may classify the uplink packets 812A-812E, map each of the uplink packets 812A-812E to a QoS flow, and/or mark the uplink packets 812A-812E with a QFI. A packet may be sent through the network. A packet may mix with other packets from other wireless devices (e.g., having potentially different priorities). The QFI may indicate how the packet should be handled in accordance with the QoS model. As shown in the example of FIG. 8, uplink packets 812A, 812B may be mapped to a QoS flow 816A, an uplink packet 812C may be mapped to a QoS flow 816B, and the remaining packets may be mapped to QoS flow 816C.

The QoS flows may be the finest granularity of QoS differentiation in a PDU session. In FIG. 8, three QoS flows 816A-816C are shown. A different quantity/number of QoS flows may be present/used (e.g., 1, 2, 4, 5, or any other number/quantity). One or more QoS flows may be associated with a guaranteed bit rate (e.g., guaranteed bit rate (GBR) QoS flows). One or more QoS flows may have bit rates that are not guaranteed (non-GBR QoS flows). QoS flows may be subject to per-wireless device and/or per-session aggregate bit rates. A QoS flow of the QoS flows may be a default QoS flow. QoS flows may have different priorities. For example, the QoS flow 816A may have a higher priority than the QoS flow 816B, which may have a higher priority than the QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may be subject to per-wireless device and/or per-session aggregate bit rates.

The wireless device 801 may apply resource mapping rules 818 to the QoS flows 816A-816C for operating within the QoS model. The air interface between wireless device 801 and/or the AN 802 may be associated with resources 820. The QoS flow 816A may be mapped to resource 820A, and the QoS flows 816B, 816C may be mapped to resource 820B. The resource mapping rules 818 may be provided by the AN 802. The resource mapping rules 818 may designate more resources for relatively high priority QoS flows for meeting QoS requirements. A high priority QoS flow (e.g., the QoS flow 816A) may, based on the resources, be more likely to obtain the high flow bit rate, low packet delay budget, and/or other satisfy other characteristics associated with QoS rules 814. The resources 820 may comprise radio bearers. The radio bearers (e.g., data radio bearers) may be established between the wireless device 801 and the AN 802. The radio bearers in 5G, between the wireless device 801 and the AN 802, may be distinct from bearers in LTE (e.g., evolved packet system (EPS) bearers between a wireless device and a packet data network gateway (PGW), Si bearers between an eNB and a serving gateway (SGW), and/or an S5/S8 bearer between an SGW and a PGW).

A packet associated with a particular QoS flow may be received at the AN 802 via the resource 820A or the resource 820B. The AN 802 may separate packets into respective QoS flows 856A-856C based on QoS profiles 828. The QoS profiles 828 may be received from an SMF. A QoS profile (e.g., each QoS profile) may correspond to a QFI (e.g., the QFI marked on the uplink packets 812A-812E). A QoS profile (e.g., each QoS profile) may comprise QoS parameters. The QoS parameters may comprise/indicate one or both of 5G QoS identifier (5QI) and/or an allocation and retention priority (ARP). The QoS profile for non-GBR QoS flows may comprise/indicate other/additional QoS parameters (e.g., a reflective QoS attribute (RQA)). The QoS profile for GBR QoS flows may further comprise/indicate additional QoS parameters (e.g., a GFBR, an MFBR, and/or a maximum packet loss rate). The 5QI may be a standardized 5QI having one-to-one mapping to a standardized combination of 5G QoS characteristics. The 5QI may be a dynamically assigned 5QI for which the standardized 5QI values may not be defined. The 5QI may represent 5G QoS characteristics. The 5QI may comprise/indicate one or more of a resource type, a default priority level, a packet delay budget (PDB), a packet error rate (PER), a maximum data burst volume, and/or an averaging window. The resource type may indicate a non-GBR QoS flow, a GBR QoS flow, and/or a delay-critical GBR QoS flow. The averaging window may represent a duration over which the GFBR and/or MFBR may be calculated/determined. The ARP may be a priority level comprising pre-emption capability and a pre-emption vulnerability. The AN 802 may apply admission control for the QoS flows (e.g., if resource limitations are determined), for example, based on the ARP.

The AN 802 may select/determine one or more N3 tunnels for transmission of the QoS flows 856A-856C. The packets (e.g., the uplink packets 812A-812E) may be sent to the UPF 805 (e.g., towards a DN) via the selected one or more N3 tunnels. The UPF 805 may verify that the QFIs of the uplink packets 812A-812E are aligned with the QoS rules 814 provided to the wireless device 801. The UPF 805 may measure, count packets, and/or provide packet metrics to one or more other entities in the network (e.g., a NF such as a PCF).

FIG. 8 shows a process that may comprise downlink transmissions. One or more applications may generate downlink packets 852A-852E. The UPF 805 may receive the downlink packets 852A-852E from one or more DNs and/or one or more other UPFs. The UPF 805 may apply PDRs 854 to downlink the packets 852A-852E, for example, based on the QoS model. The UPF 805 may map, based on the PDRs 854, the packets 852A-852E into QoS flows. As shown in FIG. 8, downlink packets 852A, 852B may be mapped to a QoS flow 856A, downlink packet 852C may be mapped to a QoS flow 856B, and/or the remaining packets may be mapped to a QoS flow 856C.

The QoS flows 856A-856C may be sent to the AN 802. The AN 802 may apply resource mapping rules to the QoS flows 856A-856C. The QoS flow 856A may be mapped to the resource 820A. The QoS flows 856B, 856C may be mapped to the resource 820B. The resource mapping rules may designate more resources to high priority QoS flows in order to meet QoS requirements.

FIGS. 9A-9D show example states and state transitions of a wireless device. The wireless device, at any given time, may have (or be associated with) one or more of an RRC state, a registration management (RM) state, and/or a connection management (CM) state.

Figure 9A:
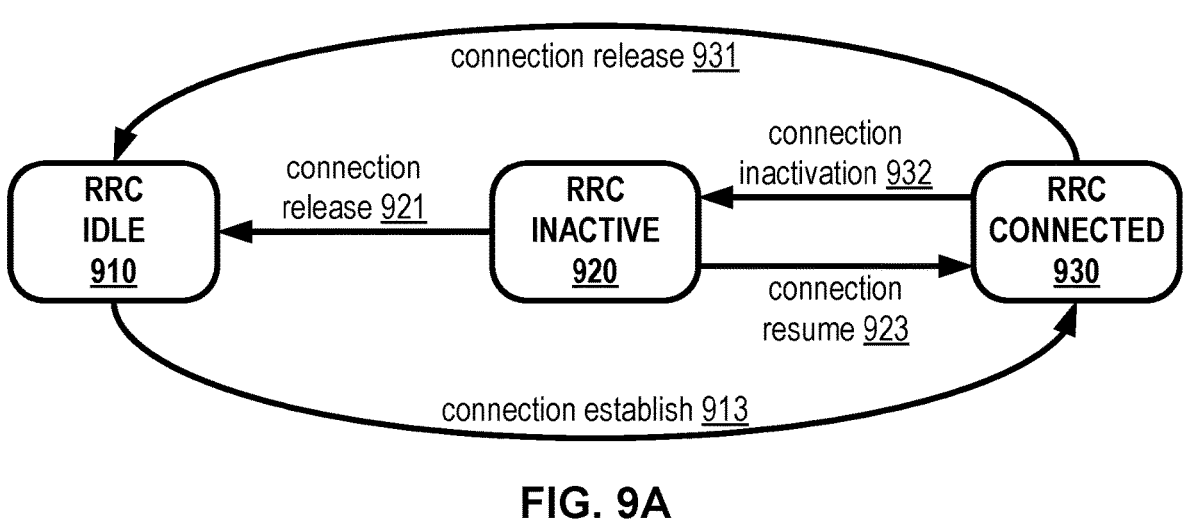
FIG. 9A, FIG. 9B, FIG. 9C, and FIG. 9D show example states and state transitions of a wireless device.

FIG. 9A shows RRC state transitions of a wireless device. The wireless device may be in one of three RRC states: RRC idle 910 (e.g., RRC_IDLE), RRC inactive 920 (e.g., RRC_I-NACTIVE), or RRC connected 930 (e.g., RRC_CON-NECTED). The wireless device may implement/apply/use different RAN-related control plane procedures, for example, depending on the RRC state of the wireless device. Other elements of the network (e.g., a base station) may track RRC state(s) of one or more wireless devices and/or implement/apply/use RAN-related control plane procedures appropriate to an RRC state of each wireless device.

The wireless device may exchange data with a network (e.g., a base station) in an RRC connected state (e.g., RRC connected 930). The parameters necessary for exchange of data may be established and/or may be known to both the wireless device and the network. The parameters may be referred to (and/or may be included in) an RRC context of the wireless device (e.g., which may be referred to as a wireless device context). The parameters may comprise, for example, one or more access stratum (AS) contexts, one or more radio link configuration parameters, bearer configuration information (e.g., relating to a data radio bearer, signaling radio bearer, logical channel, QoS flow, and/or PDU session), security information, and/or PHY layer, MAC layer, RLC layer, PDCP layer, and/or SDAP layer configuration information. The base station with which the wireless device may be connected may store the RRC context of the wireless device.

Mobility of the wireless device, in the RRC connected state, may be managed by the access network. The wireless device may manage mobility, for example, if the wireless device is in an RRC idle state (e.g., the RRC idle 910) and/or an RRC inactive state (e.g., the RRC inactive 920). The wireless device may manage mobility, for example, by measuring signal levels (e.g., reference signal levels) of signals from a serving cell and neighboring cells, and/or by reporting measurements to the base station currently serving the wireless device. The network may initiate handover, for example, based on the reported measurements. The RRC state may transition from the RRC connected state to the RRC idle state via a connection release procedure 930. The RRC state may transition from the RRC connected state to the RRC inactive state via a connection inactivation procedure 932.

An RRC context may not be established for the wireless device. For example, this may be during the RRC idle state.

During the RRC idle state (e.g., the RRC idle 910), an RRC context may not be established for the wireless device. During the RRC idle state (e.g., the RRC idle 910), the wireless device may not have an RRC connection with the base station. During the RRC idle state (e.g., the RRC idle 910), the wireless device may be in a sleep state for the majority of the time (e.g., to conserve battery power). The wireless device may wake up periodically (e.g., each discontinuous reception (DRX) cycle) to monitor for paging messages (e.g., paging messages set from the AN). Mobility of the wireless device may be managed by the wireless device via a procedure of a cell reselection. The RRC state may transition from the RRC idle state (e.g., the RRC idle 910) to the RRC connected state (e.g., the RRC connected 930) via a connection establishment procedure 913, which may involve a random-access procedure.

A previously established RRC context may be maintained for the wireless device. For example, this may be during the RRC inactive state. During the RRC inactive state (e.g., the RRC inactive 920), the RRC context previously established may be maintained in the wireless device and the base station. The maintenance of the RRC context may enable/allow a fast transition to the RRC connected state (e.g., the RRC connected 930) with reduced signaling overhead as compared to the transition from the RRC idle state (e.g., the RRC idle 910) to the RRC connected state (e.g., the RRC connected 930). The RRC state may transition from the RRC inactive state (e.g., the RRC inactive 920) to the RRC connected state (e.g., the RRC connected 930) via a connection resume procedure 923. The RRC state may transition from the RRC inactive state (e.g., the RRC inactive 920) to the RRC idle state (e.g., the RRC idle 910) via a connection release procedure 921 that may be the same as or similar to connection release procedure 931.

An RRC state may be associated with a mobility management mechanism. During the RRC idle state (e.g., RRC idle 910) and the RRC inactive state (e.g., the RRC inactive 920), mobility may be managed/controlled by the wireless device via a cell reselection. The purpose of mobility management during the RRC idle state (e.g., the RRC idle 910) or during the RRC inactive state (e.g., the RRC inactive 920) may be to enable/allow the network to be able to notify the wireless device of an event via a paging message without having to broadcast the paging message over the entire mobile communications network. The mobility management mechanism used during the RRC idle state (e.g., the RRC idle 910) and/or during the RRC inactive state (e.g., the RRC inactive 920) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms may be based on different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN may send to the wireless device a list of TATs associated with a wireless device registration area (e.g., a wireless device registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 920), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 920).

Figure 9B:
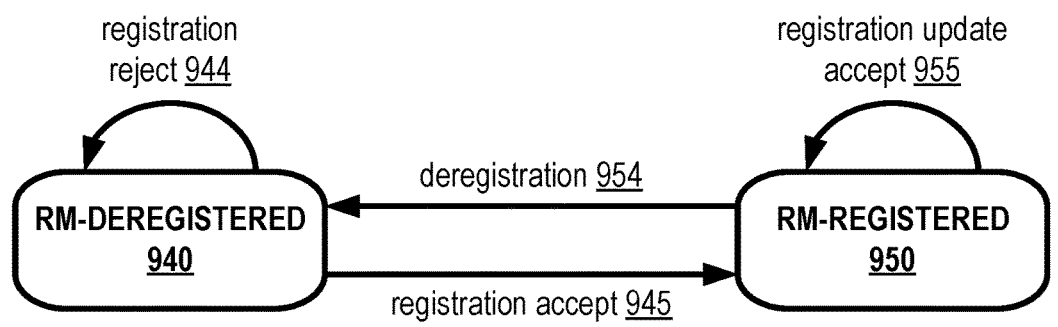

FIG. 9B shows example registration management (RM) state transitions of a wireless device. The states may be RM deregistered 940, (e.g., an RM deregistered state, RM-DEREGISTERED) and RM registered 950 (e.g., an RM deregistered state, RM-REGISTERED).

The wireless device (e.g., in RM deregistered state) may not be registered with the network, and/or the wireless device may not be reachable by the network. The wireless device may perform an initial registration, for example, in order to be reachable by the network. The wireless device may register with an AMF of the network. The wireless device may remain in the RM deregistered state, for example, if registration is rejected (e.g., via a registration reject procedure 944). The wireless device may transition to the RM registered state, for example, if the registration is accepted (e.g., via a registration accept procedure 945). The network may store, keep, and/or maintain a wireless device context for the wireless device, for example, if (e.g., while) the wireless device is in RM registered state. The wireless device context corresponding to network registration (e.g., maintained by the core network) may be different from the RRC context corresponding to RRC state (e.g., maintained by an access network or an element thereof, such as a base station). The wireless device context may comprise a wireless device indicator/identifier and a record of information relating to the wireless device. The information relating to the wireless device may comprise one or more of wireless device capability information, policy information for access and mobility management of the wireless device, lists of allowed or established slices or PDU sessions, and/or a registration area of the wireless device (i.e., a list of tracking areas covering the geographical area where the wireless device is likely to be found).

The network may store the wireless device context of the wireless device, for example, if (e.g., while) the wireless device is in an RM registered state. The network may (e.g., if necessary) use the wireless device context to reach/communicate the wireless device, for example, if (e.g., while) the wireless device is in an RM registered state. Some services may not be provided by the network unless the wireless device is registered. The wireless device may update its wireless device context while remaining in the RM registered state (e.g., via a registration update accept procedure 955). The wireless device may provide a tracking area indicator/identifier to the network, for example, if the wireless device leaves one tracking area and enters another tracking area. The network may deregister the wireless device, or the wireless device may deregister itself (e.g., via a deregistration procedure 954). The network may automatically deregister the wireless device if the wireless device is inactive for a certain amount of time. The wireless device may transition to the RM deregistered state, for example, based on the deregistration.

Figure 9C:
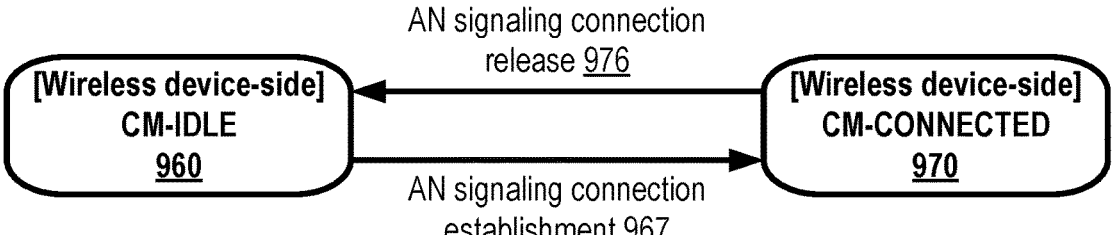

FIG. 9C shows example connection management (CM) state transitions of a wireless device. The example CM state transitions of the wireless device as shown in FIG. 9C are from a perspective of the wireless device. The wireless device may be in CM idle 960 (e.g., CM idle state, CM-IDLE) or CM connected 970 (e.g., CM connected state, CM-CONNECTED).

The wireless device may not have a NAS signaling connection with the network, for example, if the wireless device is in a CM idle state. The wireless device may not communicate with core network functions, for example, based on not having the NAS signaling connection. The wireless device may transition to a CM connected state by establishing an AN signaling connection (e.g., via an AN signaling connection establishment procedure 967). The transition may be initiated by sending an initial NAS message. The initial NAS message may be a registration request (e.g., if the wireless device is in an RM deregistered state) or a service request (e.g., if the wireless device is in an RM registered state). The wireless device may initiate the AN signaling connection establishment by sending a service request and/or the network may send a page (e.g., triggering the wireless device to send the service request), for example, If the wireless device is in an RM registered state.

The wireless device may communicate with core network functions using NAS signaling, for example, if the wireless device is in a CM connected state. For example, the wireless device may exchange (e.g., send and/or receive) NAS signaling with an AMF for registration management purposes, service request procedures, and/or authentication procedures. The wireless device may exchange NAS signaling, with an SMF, to establish and/or modify a PDU session. The network may disconnect the wireless device, or the wireless device may disconnect itself (e.g., via an AN signaling connection release procedure 976). The wireless device may transition to the CM idle state, for example, if the wireless device transitions to the RM deregistered state. The network may deactivate a user plane connection of a PDU session of the wireless device, for example, based on the wireless device transitioning to the CM idle state.

Figure 9D:
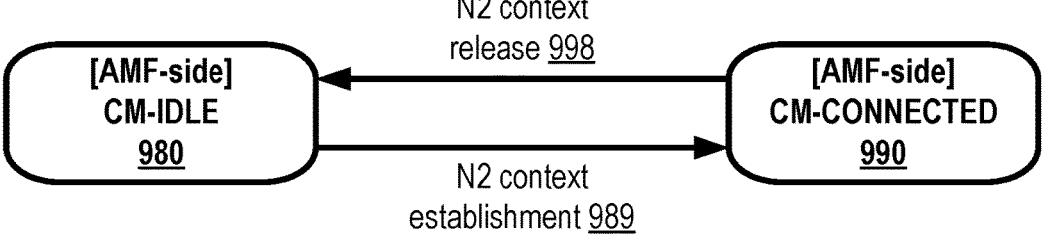

FIG. 9D shows example CM state transitions of the wireless device. The example CM state transitions of the wireless device as shown in FIG. 9D may be from a network perspective (e.g., an AMF perspective). The CM state of the wireless device, as tracked by the AMF, may be CM idle 980 (e.g., CM idle state, CM-IDLE) or CM connected 990 (e.g., CM connected state, CM-CONNECTED). The AMF many establish an N2 context of the wireless device (e.g., via an N2 context establishment procedure 989), for example, based on the wireless device transitioning from CM idle 980 to CM connected 990. The AMF may release the N2 context of the wireless device (e.g., via an N2 context release 998 procedure), for example, based on the wireless device transitioning from CM connected 990 to CM idle 980.

Figure 10:
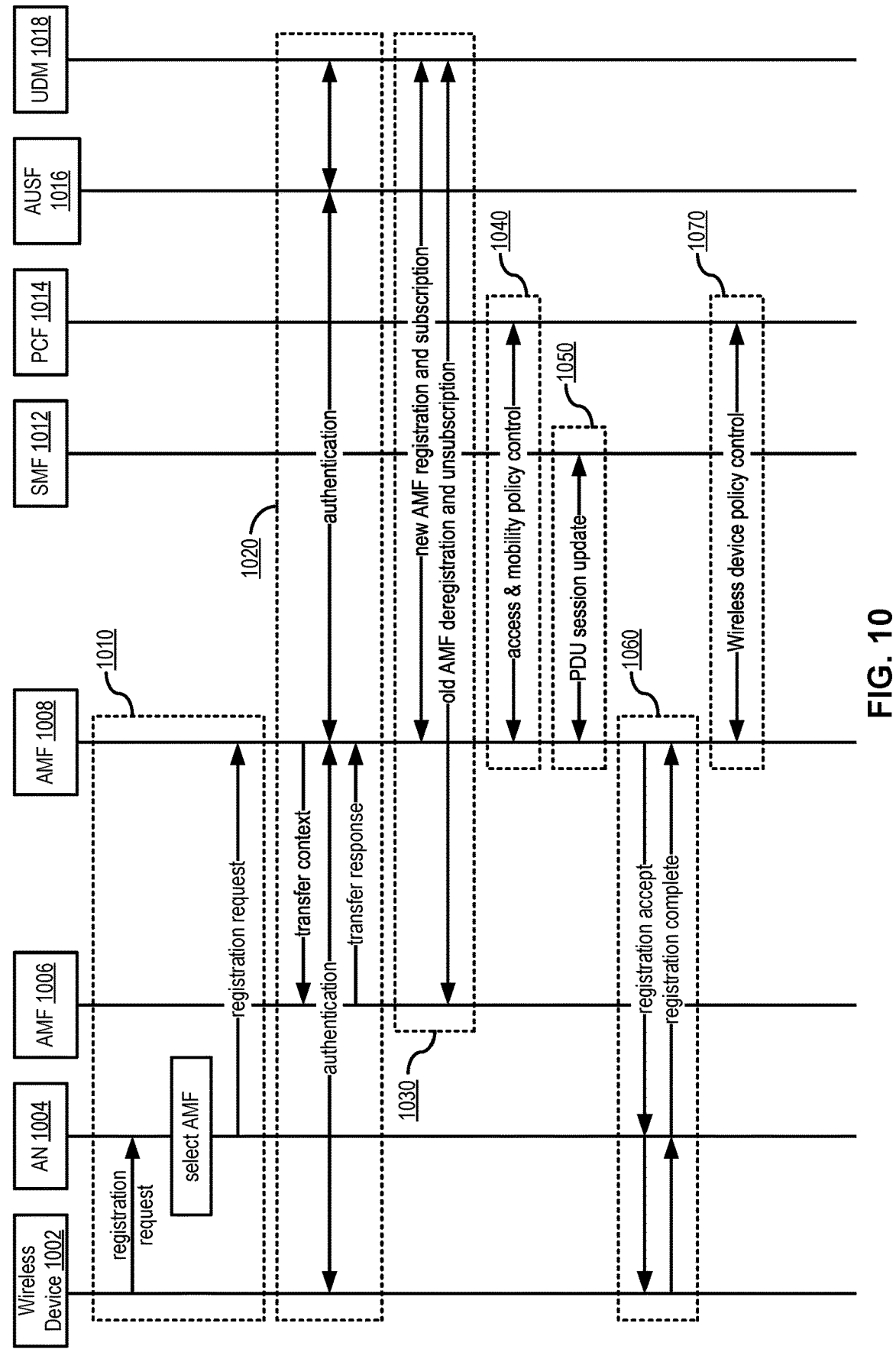
FIG. 10 shows an example registration procedure for a wireless device.
Figure 11:
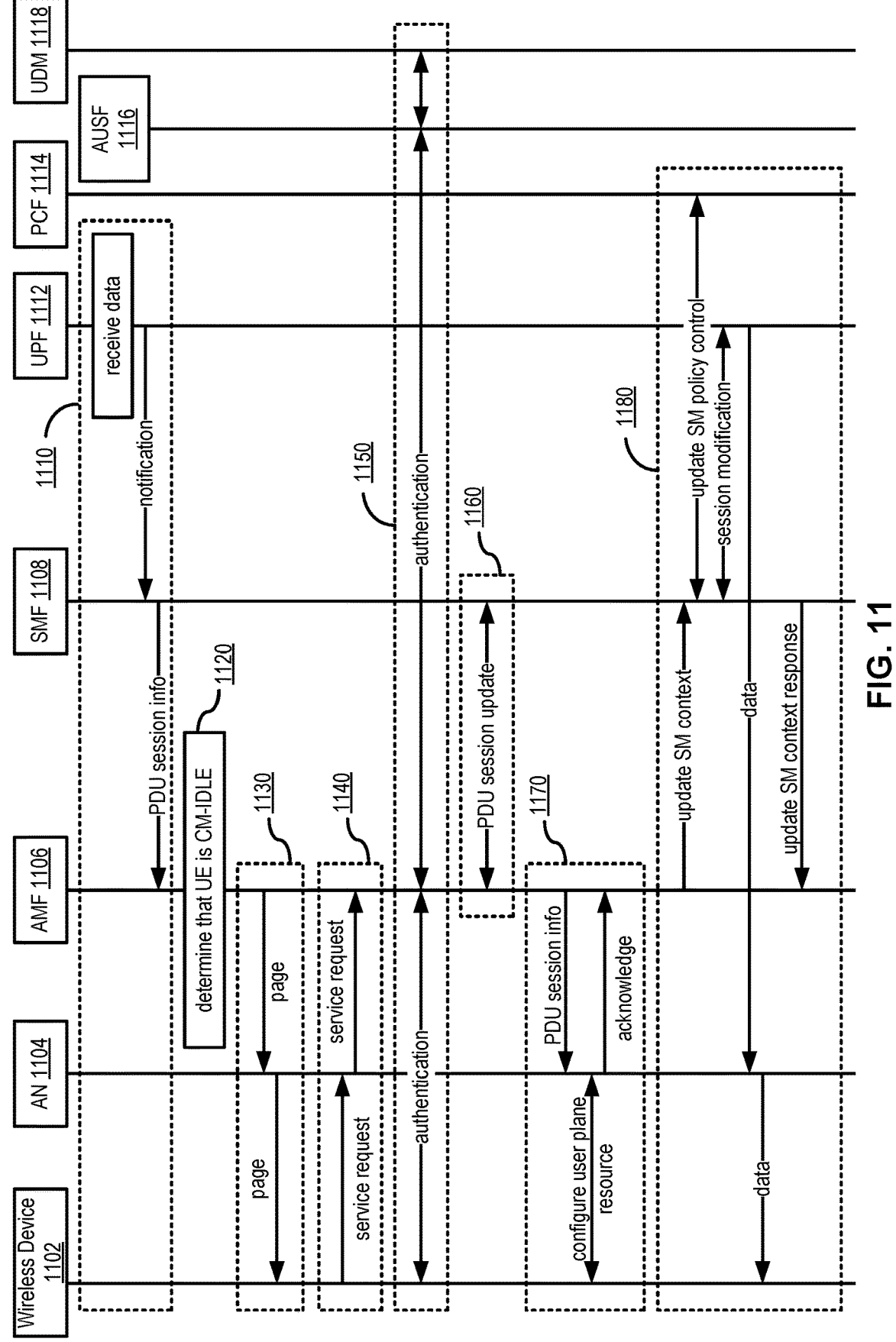
FIG. 11 shows an example service request procedure for a wireless device.
Figure 12:
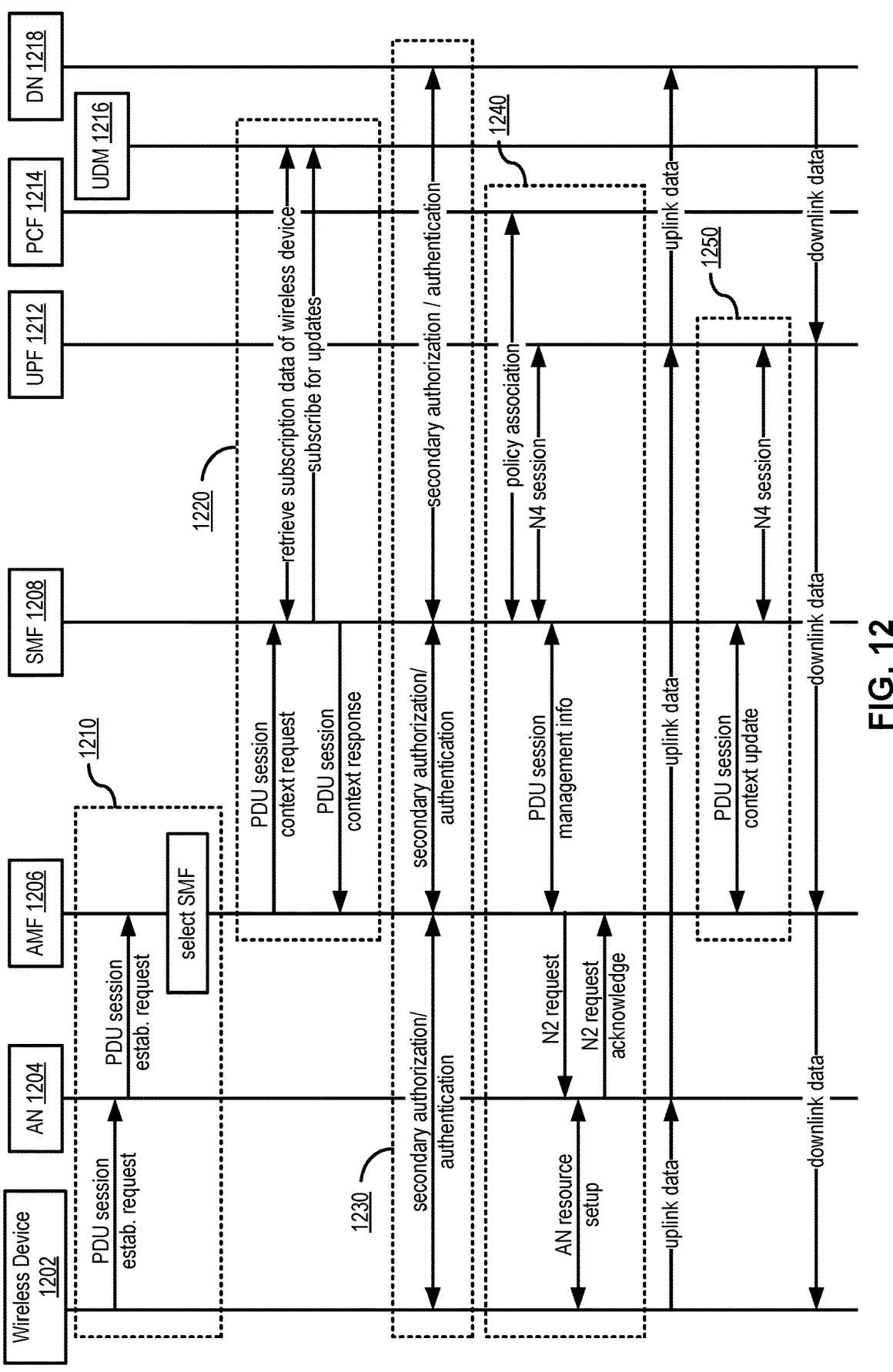
FIG. 12 shows an example of a protocol data unit session establishment procedure for a wireless device.

FIG. 10, FIG. 11, and FIG. 12 show example procedures for registering, service request, and PDU session establishment of a wireless device. FIG. 10 shows an example registration procedure for a wireless device. The wireless device 1002 may transition from an RM deregistered state (e.g., RM deregistered 940) to an RM registered state (e.g., RM registered 950), for example, based on the registration procedure.

Registration may be initiated by a wireless device 1002 for obtaining authorization to receive services, enabling mobility tracking, enabling reachability, and/or any other purpose. The wireless device 1002 may perform an initial registration (e.g., as a first step toward connecting to the network). For example, the wireless device 1002 may perform an initial registration based on the wireless device being powered on (e.g., if the wireless device is powered on), based on an airplane mode being turned off (e.g., if an airplane mode is turned off), and/or based on one or more other conditions and/or events. Registration may be performed periodically which may keep the network informed of the wireless device's presence (e.g., while the wireless device 1002 is in a CM idle state). Registration may be performed based on (e.g., in response to) a change in wireless device capability and/or registration area. Deregistration (not shown in FIG. 10) may be performed to stop network access.

At step 1010, the wireless device 1002 may send/transmit a registration request to an AN 1004. For example, the wireless device 1002 may have moved from a coverage area of a previous AMF (e.g., AMF 1006) into a coverage area of a new AMF (e.g., AMF 1008). The registration request may be/comprise a NAS message. The registration request may comprise a wireless device identifier. The AN 1004 may determine/select an AMF for registration of the wireless device. The AN 1004 may select a default AMF, or may determine/select an AMF that is already mapped to the wireless device 1002 (e.g., a previous AMF). The NAS registration request may comprise a network slice identifier. The AN 1004 may determine/select an AMF based on the requested slice. The AN 1004 may send the registration request to the selected AMF, for example, based on determination of the selected AMF. The selected AMF (e.g., AMF 1008) may receive the registration request.

At step 1020, the AMF that receives the registration request (e.g., AMF 1008) may perform a context transfer. The context may be a wireless device context (e.g., an RRC context for the wireless device). The AMF 1008 may send, to the AMF 1006, a message (e.g., an Namf_Communication_UEContextTransfer message) requesting a context of the wireless device. The message may comprise the wireless device indicator/identifier.

The AMF 1006 may send, to the AMF 1008, a message (e.g., an Namf_Communication_UEContextTransfer message) that comprises the requested wireless device context. The AMF 1008 may coordinate authentication of the wireless device 1002, for example, based on receiving the wireless device context. The AMF 1008 may send, to the AMF 1006 and based on completion of authentication, a message (e.g., an Namf_Communication_UEContextTransfer Response message) indicating that the wireless device context transfer is complete.

The authentication may involve participation of one or more of the wireless device 1002, an AUSF 1016, a UDM 1018 and/or a UDR (not shown). The AMF 1008 may request that the AUSF 1016 authenticate the wireless device 1002. The AUSF may execute authentication of the wireless device 1002 (e.g., based on the request). The AUSF 1016 may get authentication data from the UDM 1018. The AUSF 1016 may send, to the AMF 1008, a subscription permanent identifier (SUPI), for example, based on the authentication being successful. The AUSF 1016 may provide an intermediate key to the AMF 1008. The intermediate key may be used to derive an access-specific security key for the wireless device 1002. The access-specific security key may enable the AMF 1008 to perform security context management (SCM). The AUSF 1016 may obtain subscription data from the UDM 1018. The subscription data may be based on information obtained from the UDM 1018 (and/or the UDR). The subscription data may comprise subscription identifiers/indicators, security credentials, access and mobility related subscription data, and/or session related data.

At step 1030, the AMF 1008 may register and/or subscribe to the UDM 1018. The AMF 1008 may perform registration using a wireless device context management service of the UDM 1018 (e.g., Nudm_UECM). The AMF 1008 may obtain subscription information of the wireless device 1002 using a subscriber data management service of the UDM 1018 (e.g., Nudm_SDM). The AMF 1008 may further request that the UDM 1018 notify/send a notification to the AMF 1008 if the subscription information of the wireless device 1002 changes. The AMF 1006 may deregister and unsubscribe, for example, based on the AMF 1008 registering and/or subscribing. The AMF 1006 may no longer need to perform mobility management of the wireless device 1006, for example, based on (e.g., after) deregistering.

At step 1040, the AMF 1008 may retrieve access and mobility (AM) policies from the PCF 1014. The AMF 1008 may provide subscription data of the wireless device 1002 to the PCF 1014. The PCF 1014 may determine access and mobility policies for the wireless device 1002, for example, based on the subscription data, network operator data, current network conditions, and/or other suitable information. For example, the owner/user of a first wireless device may purchase a higher level of service than the owner/user of a second wireless device. The PCF 1014 may provide the rules associated with the different levels of service. The network may apply different policies which facilitate different levels of service, for example, based on the subscription data of the respective wireless devices.

Access and mobility policies may relate to (e.g., may be based on and/or comprise) service area restrictions, radio access technology (RAT) frequency selection priority (RFSP), authorization and prioritization of access type (e.g., LTE versus NR), and/or selection of non-3GPP access (e.g., access network discovery and selection policy (ANDSP)). The service area restrictions may comprise list(s) of tracking areas where the wireless device is allowed to be served (and/or forbidden from being served). The access and mobility policies may comprise a wireless device (e.g., UE) route selection policy (URSP) that may influence routing to an established PDU session and/or a new PDU session. Different policies may be obtained and/or be enforced based on subscription data of the wireless device, location of the wireless device (e.g., location of the AN and/or AMF), and/or other suitable factors.

At step 1050, the AMF 1008 may update a context of a PDU session. The AMF 1008 may coordinate/communicate with an SMF (e.g., SMF 1012) to activate a user plane connection associated with an existing PDU session, for example, if the wireless device has/is associated with an existing PDU session. The SMF 1012 may update and/or release a session management context of the PDU session (e.g., Nsmf_PDUSession_UpdateSMContext, Nsmf_P-DUSession_ReleaseSMContext).

At step 1060, the AMF 1008 may send a registration accept message to the AN 1004. The AN 1004 may forward the registration accept message to the wireless device 1002. The registration accept message may comprise a new wireless device indicator/identifier and/or a new configured slice indicator/identifier. The wireless device 1002 may send/transmit a registration complete message to the AN 1004. The AN 1004 may forward the registration complete message to the AMF 1008. The registration complete message may acknowledge receipt of the new wireless device identifier and/or new configured slice identifier.

At step 1070, the AMF 1008 may receive/obtain wireless device policy control information from the PCF 1014. The PCF 1014 may send/provide an ANDSP (e.g., to facilitate non-3GPP access). The PCF 1014 may provide URSP to facilitate mapping of particular data traffic to particular PDU session connectivity parameters. The URSP may indicate that data traffic associated with a particular application should be mapped to a particular SSC mode, network slice, PDU session type, and/or preferred access type (e.g., 3GPP or non-3GPP).

FIG. 11 shows an example service request procedure for a wireless device. The service request procedure may be a network-triggered service request procedure for a wireless device in a CM idle state. Other service request procedures (e.g., a wireless device-triggered service request procedure) may be performed in a manner similar to that described with reference to FIG. 11.

At step 1110, a UPF 1112 may receive data. The data may be downlink data for transmission to a wireless device (e.g., wireless device 1102). The data may be associated with an existing PDU session between the wireless device 1102 and a DN. The data may be received from a DN and/or another UPF. The UPF 1112 may buffer the received data. The UPF 1112 may notify an SMF (e.g., SMF 1108) of the received data, for example, based on (e.g., in response to) receiving the data. The identity of the SMF to be notified may be determined based on the received data. The notification may be an N4 session report. The notification may indicate that the UPF 1112 has received data associated with the wireless device 1102 and/or a particular PDU session associated with the wireless device 1102. The SMF 1108 may send PDU session information to an AMF 1106, for example, based on (e.g., in response to) receiving the notification. The PDU session information may be sent in an N1N2 message transfer for forwarding to an AN 1104. The PDU session information may comprise UPF tunnel endpoint information and/or QoS information.

At step 1120, the AMF 1106 may determine that the wireless device 1102 is in a CM idle state. The determining may be based on (e.g., in response to) the receiving of the PDU session information. The service request procedure may proceed to steps 1130 and 1140, for example, based on the determination that the wireless device is in CM idle state. The steps 1130 and 1140 may be skipped, and the service request procedure may proceed directly to 1150, for example, based on determining that the wireless device is not in CM idle state (e.g., the wireless device is in CM connected state).

At step 1130, the AMF 1106 may page the wireless device 1102. The paging at step 1130 may be performed based on the wireless device being in a CM idle state. The AMF 1106 may send a page to the AN 1104 to perform the paging. The page may be referred to as a paging or a paging message. The page may be an N2 request message. The AN 1104 may be one of a plurality of ANs in a RAN notification area of the wireless device 1102. The AN may send a page to the wireless device 1102. The wireless device 1102 may be in a coverage area of the AN 1104 and may receive the page.

At step 1140, the wireless device 1102 may request service. The wireless device 1102 may send/transmit a service request to the AMF 1106 via the AN 1104. The wireless device 1102 may request service at step 1140, for example, based on (e.g., in response to) receiving the paging at step 1130. The wireless device 1102 may receive the page and request service based on the service request procedure being a network-triggered service request procedure. The wireless device 1102 may commence a wireless device-triggered service request procedure in some scenarios (e.g., if uplink data becomes available at the wireless device). The wireless device-triggered service request procedure may commence starting at step 1140 (e.g., one or more of steps 1110 and 1120 may be skipped).

At step 1150, the network may authenticate the wireless device 1102. Authentication may require participation of the wireless device 1102, an AUSF 1116, and/or a UDM 1118 (e.g., as described herein). The authentication at step 1150 may be skipped, for example, in one or more scenarios (e.g., if the wireless device 1102 has recently been authenticated).

At step 1160, the AMF 1106 and the SMF 1108 may perform a PDU session update. The PDU session update may comprise the SMF 1108 providing, to the AMF 1106, with one or more UPF tunnel endpoint identifiers. The SMF 1108 may coordinate with one or more other SMFs and/or one or more other UPFs to set up a user plane.

At step 1170, the AMF 1106 may send PDU session information to the AN 1104. The PDU session information may be included in an N2 request message. The AN 1104 may configure a user plane resource for the wireless device 1102, for example, based on the PDU session information. The AN 1104 may perform an RRC reconfiguration of the wireless device 1102, for example, to configure the user plane resource. The AN 1104 may acknowledge the AMF 1106 (e.g., send an acknowledgment message to the AMF 1106 indicating) that the PDU session information has been received. The AN 1104 may notify the AMF 1106 (e.g., via the acknowledgment message) that the user plane resource has been configured, and/or provide information relating to the user plane resource configuration.

The wireless device 1102 may receive (e.g., at step 1170), for a wireless device-triggered service procedure, a NAS service accept message from the AMF 1106 via the AN 1104. The wireless device 1102 may send/transmit uplink data (e.g., the uplink data that caused the wireless device 1102 to trigger the service request procedure), for example, based on (e.g., after) configuring the user plane resource.

At step 1180, the AMF 1106 may update a session management (SM) context of the PDU session. The AMF 1106 may notify the SMF 1108 (and/or one or more other associated SMFs) that the user plane resource has been configured, and/or may provide information relating to the user plane resource configuration. The AMF 1106 may provide/send to the SMF 1108 (and/or one or more other associated SMFs) one or more AN tunnel endpoint identifiers/indicators of the AN 1104. The SMF 1108 may send an update SM context response message to the AMF 1106, for example, based on (e.g., after) the SM context update being complete.

The SMF 1108 may update a PCF (e.g., the PCF 1114) for purposes of policy control, for example, based on the update of the session management context. For example, the SMF 1108 may notify (e.g., via PCF 1114 update) the PCF 1114 of a new location of the wireless device 1102 if a location of the wireless device 1102 has changed. The SMF 1108 and the UPF 1112 may perform a session modification, for example, based on the update of the session management context. The session modification may be performed using N4 session modification messages. The UPF 1112 may send/transmit downlink data (e.g., the downlink data that caused the UPF 1112 to trigger the network-triggered service request procedure) to the wireless device, for example, based on the session modification being completed. The sending/transmitting of the downlink data may be based on the one or more AN tunnel endpoint identifiers of the AN 1104.

FIG. 12 shows an example PDU session establishment procedure for a wireless device. The wireless device 1202 may determine to send/transmit a PDU session establishment request (e.g., for the PDU session establishment procedure) to create a new PDU session, to hand over an existing PDU session to a 3GPP network, and/or for any other suitable reason.

At step 1210, the wireless device 1202 may initiate PDU session establishment. The wireless device 1202 may send/transmit a PDU session establishment request, via an AN 1204, to an AMF 1206. The PDU session establishment request may be a NAS message. The PDU session establishment request may indicate/comprise one or more of: a PDU session indicator/ID; a requested PDU session type (e.g., whether the requested PDU session is new or existing); a requested DN (e.g., a DNN); a requested network slice (S-NSSAI); a requested SSC mode; and/or any other suitable information. The PDU session ID may be generated by the wireless device 1202. The PDU session type may be, for example, an Internet Protocol (IP)-based type (e.g., IPv4, IPv6, or dual stack IPv4/IPv6), an Ethernet type, or an unstructured type.

The AMF 1206 may determine/select an SMF (e.g., SMF 1208) based on the PDU session establishment request. The requested PDU session may, in at least some scenarios, already be associated with a particular SMF. For example, the AMF 1206 may store a wireless device context of the wireless device 1202, and the wireless device context may indicate that the PDU session ID of the requested PDU session is already associated with the particular SMF. In some scenarios, the AMF 1206 may select the SMF based on a determination that the SMF is prepared to handle the requested PDU session. For example, the requested PDU session may be associated with a particular DNN and/or S-NSSAI. The SMF may be selected based on a determination that the SMF can manage a PDU session associated with the particular DNN and/or S-NSSAI.

At step 1220, the network may manage a context of the PDU session. The AMF 1206 may send a PDU session context request to the SMF 1208, for example, based on (e.g., after) selecting the SMF 1208 at 1210. The PDU session context request may comprise the PDU session establishment request received from the wireless device 1202 at step 1210. The PDU session context request may be a Nsmf_PDUSession_CreateSMContext Request and/or a Nsmf_PDUSession_UpdateSMContext Request. The PDU session context request may indicate/comprise indicators/identifiers of the wireless device 1202; the requested DN; and/or the requested network slice. The SMF 1208 may retrieve subscription data from a UDM 1216, for example, based on the PDU session context request. The subscription data may be session management subscription data of the wireless device 1202. The SMF 1208 may subscribe for updates to the subscription data. The PCF 1208 may send, to the SMF 1208, new information if the subscription data of the wireless device 1202 changes, for example, based on the SMF 1208 subscribing for the updates. The SMF 1208 may send/transmit a PDU session context response to the AMF 1206, for example, based on (e.g., after) receiving/obtaining the subscription data of the wireless device 1202. The PDU session context response may be a Nsmf_PDUSession_CreateSMContext Response and/or a Nsmf_PDUSession_UpdateSMContext Response. The PDU session context response may include/comprise a session management context ID.

At step 1230, secondary authorization/authentication may be performed, if necessary. The secondary authorization/authentication may involve the wireless device 1202, the AMF 1206, the SMF 1208, and/or the DN 1218. The SMF 1208 may access the DN 1218 via a server (e.g., a data network authentication, authorization, and accounting (DN AAA) server).

At step 1240, the network may set up a data path for uplink data associated with the PDU session. The SMF 1208 may select/determine a PCF (e.g., a PCF 1214). The SMF 1208 may establish a session management policy association. The PCF 1214 may provide an initial set of policy control and charging rules (PCC rules) for the PDU session, for example, based on the association. The PCF 1214 may (e.g., if targeting a particular PDU session) indicate, to the SMF 1208, one or more of a method for allocating an IP address to the PDU Session, a default charging method for the PDU session, an address of the corresponding charging entity, triggers for requesting new policies, and/or any other method, action, and/or information. The PCF 1214 may target a service data flow (SDF) comprising one or more PDU sessions. The PCF may (e.g., if targeting an SDF) indicate, to the SMF 1208, policies for one or more of applying QoS requirements, monitoring traffic (e.g., for charging purposes), steering traffic (e.g., by using one or more particular N6 interfaces), and/or any other purpose.

The SMF 1208 may determine and/or allocate an IP address for the PDU session. The SMF 1208 may select one or more UPFs (e.g., a single UPF 1212 as shown in FIG. 12) to handle the PDU session. The SMF 1208 may send an N4 session message to the selected UPF 1212. The N4 session message may be an N4 session establishment request and/or an N4 session modification request. The N4 session message may include/comprise packet detection, enforcement, and/or reporting rules associated with the PDU session. The UPF 1212 may acknowledge the N4 session message by sending an N4 session establishment response and/or an N4 session modification response.

The SMF 1208 may send PDU session management information to the AMF 1206. The PDU session management information may be/comprise a Namf_Communication_N1N2MessageTransfer message. The PDU session management information may include/comprise the PDU session ID. The PDU session management information may be/comprise a NAS message. The PDU session management information may include/comprise N1 session management information and/or N2 session management information. The N1 session management information may include/comprise a PDU session establishment accept message. The PDU session establishment accept message may include/comprise tunneling endpoint information of the UPF 1212 and QoS information associated with the PDU session.

The AMF 1206 may send an N2 request to the AN 1204. The N2 request may include/comprise the PDU session establishment accept message. The AN 1204 may determine AN resources for the wireless device 1202, for example, based on the N2 request. The AN resources may be used by the wireless device 1202 to establish the PDU session, via the AN 1204, with the DN 1218. The AN 1204 may determine resources to be used for the PDU session and indicate, to the wireless device 1202, the determined resources. The AN 1204 may send the PDU session establishment accept message to the wireless device 1202. The AN 1204 may perform an RRC reconfiguration of the wireless device 1202. The AN 1204 may send an N2 request acknowledge to the AMF 1206, for example, based on (e.g., after) the AN resources being set up. The N2 request acknowledge may include/comprise N2 session management information (e.g., the PDU session ID and tunneling endpoint information of the AN 1204).

The wireless device 1202 may (e.g., optionally) send uplink data associated with the PDU session, for example, based on the data path for uplink data being set up (e.g., at step 1240). The uplink data may be sent to a DN 1218, associated with the PDU session, via the AN 1204 and the UPF 1212.

At step 1250, the network may update the PDU session context. The AMF 1206 may send/transmit a PDU session context update request to the SMF 1208. The PDU session context update request may be a Nsmf_PDUSession_UpdateSMContext request. The PDU session context update request may comprise the N2 session management information received from the AN 1204. The SMF 1208 may acknowledge (e.g., send an acknowledgment message based on/in response to) the PDU session context update. The acknowledgement may be a Nsmf_PDUSession_UpdateSMContext response. The acknowledgement may comprise a subscription requesting that the SMF 1208 be notified of any wireless device mobility event. The SMF 1208 may send an N4 session message to the UPF 1212, for example, based on the PDU session context update request. The N4 session message may be an N4 session modification request. The N4 session message may comprise tunneling endpoint information of the AN 1204. The N4 session message may comprise forwarding rules associated with the PDU session. The UPF 1212 may acknowledge (e.g., reception of the N4 session message) by sending an N4 session modification response.

The UPF 1212 may relay downlink data associated with the PDU session, for example, based on (e.g., after) the UPF 1212 receiving the tunneling endpoint information of the AN 1204 The downlink data may be received from a DN 1218, associated with the PDU session, via the AN 1204 and the UPF 1212.

Figure 13A:
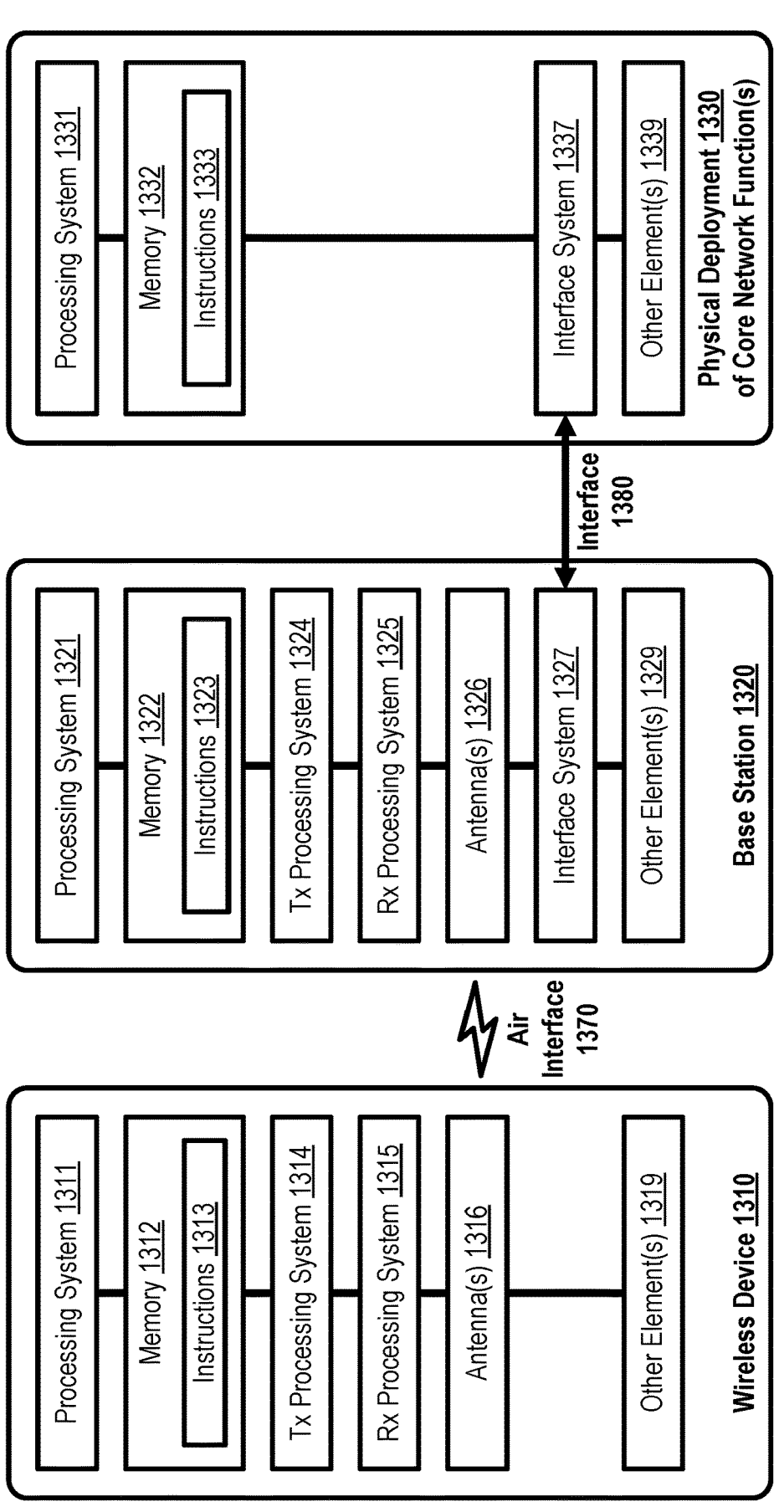
FIG. 13A shows example elements in a communications network.

FIG. 13A shows example elements in a communications network. FIG. 13A shows a wireless device 1310, a base station 1320, and a physical deployment of one or more network functions 1330 (henceforth, "deployment 1330"). Any wireless device described herein may have similar components and/or may be implemented in a similar manner as the wireless device 1310. Any base station described herein (or any portion of the base station, depending on the architecture of the base station) may have similar components and/or may be implemented in a similar manner as the base station 1320. Any physical core network deployment described herein (or any portion of the deployment, depending on the architecture of the deployment) may have similar components and may be implemented in a similar manner as the deployment 1330.

The wireless device 1310 may communicate with base station 1320 over an air interface 1370. A communication direction from wireless device 1310 to base station 1320 over air interface 1370 may be known as uplink, and a communication direction from base station 1320 to wireless device 1310 over air interface 1370 may be known as downlink. Downlink transmissions may be separated from uplink transmissions using FDD, TDD, and/or some combination of duplexing techniques. FIG. 13A shows a single wireless device 1310 and a single base station 1320, but it may be understood that wireless device 1310 may communicate with any number/quantity of base stations and/or other access network components over air interface 1370, and it may be understood that that base station 1320 may communicate with any number/quantity of wireless devices over air interface 1370.

The wireless device 1310 may comprise a processing system 1311 and a memory 1312. The memory 1312 may comprise one or more computer-readable media (e.g., one or more non-transitory computer readable media). The memory 1312 may include/comprise/store instructions 1313. The processing system 1311 may process and/or execute the instructions 1313. Processing and/or execution of the instructions 1313 may cause the wireless device 1310 and/or the processing system 1311 to perform one or more functions or activities. The memory 1312 may include/comprise data (not shown). One of the functions or activities performed by the processing system 1311 may be to store data in the memory 1312 and/or retrieve previously-stored data from the memory 1312. For example, downlink data received from the base station 1320 may be stored in the memory 1312, and uplink data for transmission to the base station 1320 may be retrieved from the memory 1312. The wireless device 1310 may communicate with the base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13A, the transmission processing system 1314 and/or the reception processing system 1315 may be coupled to a dedicated memory that may be analogous to but separate from the memory 1312. The dedicated memory may comprise instructions that may be processed and/or executed to carry out one or more respective functionalities of the transmission processing system 1314 and/or the reception processing system 1315. The wireless device 1310 may comprise one or more antennas 1316 to access the air interface 1370.

The wireless device 1310 may comprise one or more other elements 1319. The one or more other elements 1319 may comprise software and/or hardware that may provide features and/or functionalities. For example, the one or more other elements 1319 may comprise one or more of a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise or connect to one or more sources of power (e.g., a battery, a solar cell, a fuel cell, a wall outlet, an electrical grid, and/or any combination thereof).

The wireless device 1310 may send/transmit uplink data to and/or receive downlink data from the base station 1320 via the air interface 1370. One or more of the processing system 1311, transmission processing system 1314, and/or reception system 1315 may implement open systems interconnection (OSI) functionality to perform transmission and/or reception. For example, the transmission processing system 1314 and/or the reception system 1315 may perform layer 1 OSI functionality, and the processing system 1311 may perform higher layer functionality. The wireless device 1310 may transmit and/or receive data over the air interface 1370 via/using one or more antennas 1316. For scenarios where the one or more antennas 1316 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media (e.g., one or more non-transitory computer readable media). The memory 1322 may comprise instructions 1323. The processing system 1321 may process and/or execute the instructions 1323. Processing and/or execution of the instructions 1323 may cause the base station 1320 and/or the processing system 1321 to perform one or more functions or activities. The memory 1322 may comprise data (not shown). One of the functions or activities performed by the processing system 1321 may be to store data in the memory 1322 and/or retrieve previously-stored data from the memory 1322. The base station 1320 may communicate with the wireless device 1310 using a transmission processing system 1324 and/or a reception processing system 1325. The transmission processing system 1324 and/or the reception processing system 1325 may be coupled to a dedicated memory (not shown) that may be analogous to but separate from memory 1322. The dedicated memory may comprise instructions that may be processed and/or executed to carry out one or more of their respective functionalities. The base station 1320 may comprise one or more antennas 1326 to access the air interface 1370.

The base station 1320 may send/transmit downlink data to and/or receive uplink data from wireless device 1310 via the air interface 1370. To perform the transmission and/or reception, one or more of the processing system 1321, the transmission processing system 1324, and/or the reception system 1325 may implement OSI functionality. For example, the transmission processing system 1324 and/or the reception system 1325 may perform layer 1 OSI functionality, and the processing system 1321 may perform higher layer functionality. The base station 1320 may transmit and/or receive data via the air interface 1370 using one or more antennas 1326. For scenarios where the one or more antennas 1326 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless. The interface system 1327 may comprise one or more components suitable for communicating via the interface 1380. As shown in FIG. 13A, the interface 1380 may connect the base station 1320 to a single deployment 1330 (e.g., as shown in FIG. 13A), but it may be understood that wireless device 1310 may communicate with any number/quantity of base stations and/or CN deployments via the interface 1380, and it may be understood that that deployment 1330 may communicate with any number/quantity of base stations and/or other CN deployments via the interface 1380. The base station 1320 may comprise one or more other elements 1329 analogous to one or more of the one or more other elements 1319.

The deployment 1330 may comprise any quantity/number of portions of any quantity/number of instances of one or more NFs. The deployment 1330 may comprise a processing system 1331 and a memory 1332. The memory 1332 may comprise one or more computer-readable media (e.g., one or more non-transitory computer readable media). The memory 1332 may comprise instructions 1333. The processing system 1331 may process and/or execute instructions 1333. Processing and/or execution of the instructions 1333 may cause the deployment 1330 and/or the processing system 1331 to perform one or more functions or activities. The memory 1332 may comprise data (not shown). One of the functions or activities performed by processing system 1331 may be to store data in the memory 1332 and/or retrieve previously-stored data from the memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

The wireless device 1310, the base station 1320, and/or the deployment 1330 may implement timers and/or counters. A timer/counter may start and/or restart at an initial value. The timer/counter may run based on the starting. Running of the timer/counter may be associated with an occurrence. The value of the timer/counter may change (e.g., increment or decrement). The occurrence may be an exogenous event (e.g., a reception of a signal, a measurement of a condition, etc.), an endogenous event (e.g., a transmission of a signal, a calculation, a comparison, a performance of an action or a decision to so perform, etc.), and/or any combination thereof. The occurrence may be the passage of a particular amount of time. A timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused (e.g., a present value of the timer/counter may be held, maintained, and/or carried over), for example, even after an occurrence of one or more occurrences that would otherwise cause the value of the timer/counter to change. The timer/counter may be un-paused or continued (e.g., the value that was held, maintained, and/or carried over may begin changing again), for example, after an occurrence of the one or more occurrence occur. A timer/counter may be set and/or reset. As used herein, setting may comprise resetting. The value of the timer/counter may be set to the initial value, for example, if the timer/counter sets and/or resets. A timer/counter may be started and/or restarted. Starting may comprise restarting. The value of the timer/counter may be set to the initial value and the timer/counter may begin to run (e.g., increment or decrement), for example, if the timer/counter restarts.

Figure 13B:
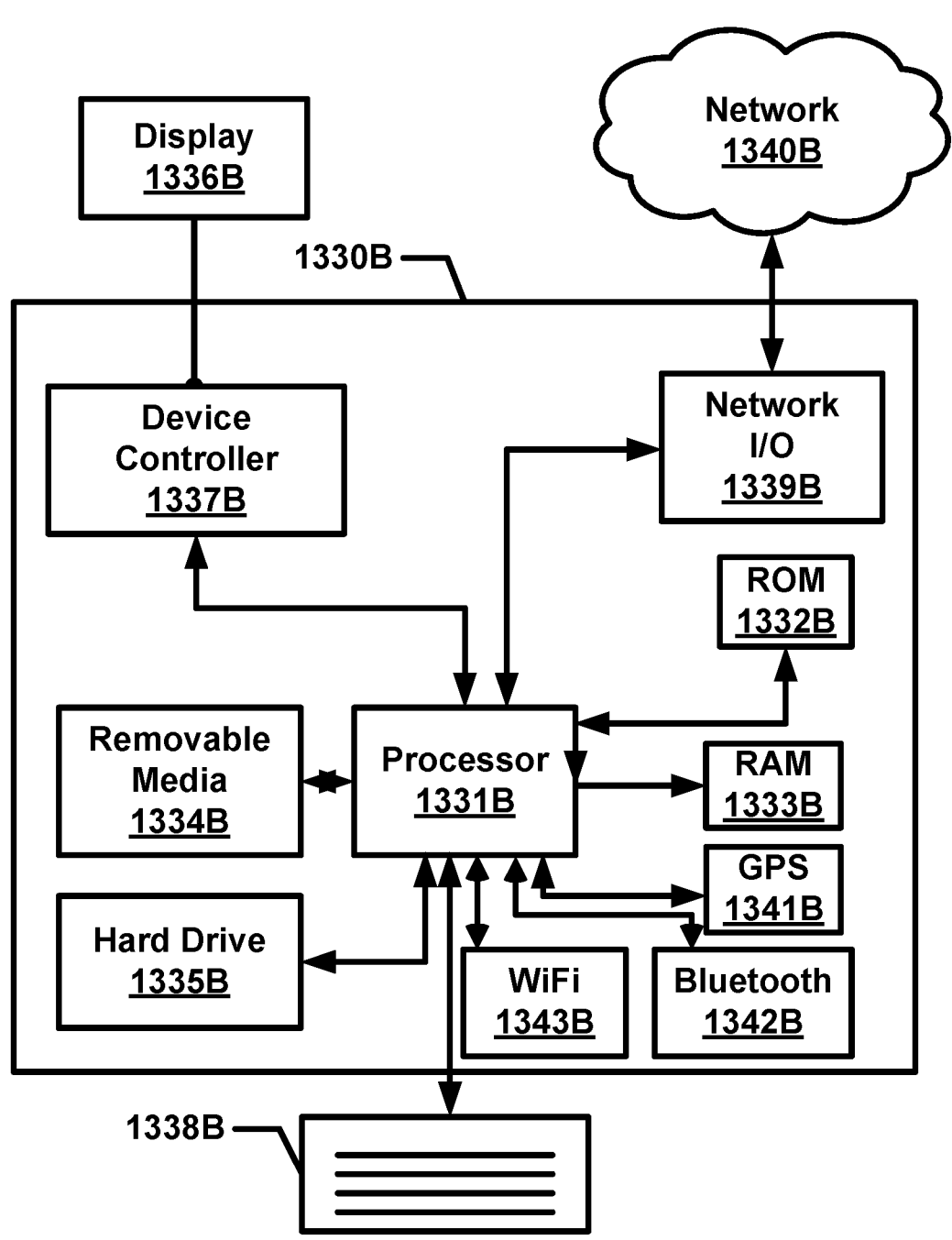
FIG. 13B shows example elements of a computing device that may be used to implement any of the various devices described herein.

FIG. 13B shows example elements of a computing device that may be used to implement any of the various devices described herein, including, for example, a base station 152A, 152B, 302, 402, 403, 502 602, 602A, 602B, 602C, 702, 802, 1004, 1104, 1204, 1320, 1840, 1940, 2040, 2140, and/or 2240, a wireless device 101, 151, 301, 401, 501, 601A, 601B, 601C, 701, 801, 1002, 1102, 1202, 1310, 1810, 1820, 1830, 1910, 1920, 1930, 2011, 2012, 2013, 2014, 2110, 2120, and/or 2210, or any other base station, wireless device, node, NF (e.g., AMF, SMF, UPF, PCF, etc.), UDM, OAM, UDM/OAM, network device, or computing device described herein. The computing device 1330B may include one or more processors 1331B, which may execute instructions stored in the random-access memory (RAM) 1333B, the removable media 1334B (such as a Universal Serial Bus (USB) drive, compact disk (CD) or digital versatile disk (DVD), or floppy disk drive), or any other desired storage medium. Instructions may also be stored in an attached (or internal) hard drive 1335B. The computing device 1330B may also include a security processor (not shown), which may execute instructions of one or more computer programs to monitor the processes executing on the processor 1331B and any process that requests access to any hardware and/or software components of the computing device 1330B (e.g., ROM 1332B, RAM 1333B, the removable media 1334B, the hard drive 1335B, the device controller 1337B, a network interface 1339B, a GPS 1341B, a Bluetooth interface 1342B, a WiFi interface 1343B, etc.). The computing device 1330B may include one or more output devices, such as the display 1336B (e.g., a screen, a display device, a monitor, a television, etc.), and may include one or more output device controllers 1337B, such as a video processor. There may also be one or more user input devices 1338B, such as a remote control, keyboard, mouse, touch screen, microphone, etc. The computing device 1330B may also include one or more network interfaces, such as a network interface 1339B, which may be a wired interface, a wireless interface, or a combination of the two. The network interface 1339B may provide an interface for the computing device 1330B to communicate with a network 1340B (e.g., a RAN, or any other network). The network interface 1339B may include a modem (e.g., a cable modem), and the external network 1340B may include communication links, an external network, an in-home network, a provider's wireless, coaxial, fiber, or hybrid fiber/coaxial distribution system (e.g., a DOCSIS network), or any other desired network. Additionally, the computing device 1330B may include a location-detecting device, such as a global positioning system (GPS) microprocessor 1341B, which may be configured to receive and process global positioning signals and determine, with possible assistance from an external server and antenna, a geographic position of the computing device 1330B.

The example in FIG. 13B may be a hardware configuration, although the components shown may be implemented as software as well. Modifications may be made to add, remove, combine, divide, etc. components of the computing device 1330B as desired. Additionally, the components may be implemented using basic computing devices and components, and the same components (e.g., processor 1331B, ROM storage 1332B, display 1336B, etc.) may be used to implement any of the other computing devices and components described herein. For example, the various components described herein may be implemented using computing devices having components such as a processor executing computer-executable instructions stored on a computer-readable medium, as shown in FIG. 13B. Some or all of the entities described herein may be software based, and may co-exist in a common physical platform (e.g., a requesting entity may be a separate software process and program from a dependent entity, both of which may be executed as software on a common computing device).

FIGS. 14A, 14B, 14C, and 14D show various example arrangements of physical core network deployments. Each of the arrangements may comprise one or more network functions and/or portions thereof. The core network deployments may comprise a deployment 1410, a deployment 1420, a deployment 1430, a deployment 1440, and/or a deployment 1450. Any of the deployments (e.g., each deployment) may be analogous to the deployment 1330 as shown in FIG. 13A. Any of the deployments (e.g., each deployment) may comprise a processing system for performing one or more functions and/or activities, memory for storing data and/or instructions, and/or an interface system for communicating with other network elements (e.g., other core network deployments). Any of the deployments (e.g., each deployment) may comprise one or more NFs. An NF may refer to a particular set of functionalities and/or one or more physical elements configured to perform those functionalities (e.g., a processing system and memory comprising instructions that, when executed by the processing system, cause the processing system to perform the functionalities). As described herein, a network function performing X, Y, and Z, may comprise the one or more physical elements configured to perform X, Y, and Z (e.g., irrespective of configuration and/or location of the deployment of the one or more physical elements), where X, Y, and Z, each may refer to one or more operations. An NF may comprise one or more of a network node, network element, and/or network device.

Different types of NF may be present in a deployment. Each type of NF may be associated with a different set of one or more functionalities. A plurality of different NFs may be flexibly deployed at different locations (e.g., in different physical core network deployments) or in a same location (e.g., co-located in a same deployment). A single NF may be flexibly deployed at different locations (e.g., implemented using different physical core network deployments) or in a same location. Physical core network deployments may also implement one or more base stations, application functions (AFs), data networks (DNs), and/or any portions thereof. NFs may be implemented in many ways, including as network elements on dedicated or shared hardware, as software instances running on dedicated or shared hardware, and/or as virtualized functions instantiated on a platform (e.g., a cloud-based platform).

FIG. 14A shows an example arrangement of core network deployments. Any of the core network deployments (e.g., each of the core network deployments) may comprise one network function. A deployment 1410 may comprise an NF

1411, a deployment 1420 may comprise an NF 1421, and a deployment 1430 may comprise an NF 1431. The deployments 1410, 1420, 1430 may communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B shows an example arrangement where a single deployment may comprise more than one NF. Multiple NFs may be deployed in deployments 1410, 1420. Deployments 1410, 1420 may implement a software-defined network (SDN) and/or a network function virtualization (NFV).

Deployment 1410 may comprise an additional network function, NF 1411A. The NFs 1411, 1411A may comprise multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. NFs 1411, 1411A may be associated with different PLMNs, but deployment 1410, which implements NFs 1411, 1411A, may be owned and/or operated by a single entity.

Deployment 1420 may comprise a NF 1421 and an additional NF 1422. The NFs 1421, 1422 may be different NF types. Similar to NFs 1411, 1411A, the NFs 1421, 1422 may be co-located within the same deployment 1420, but may be separately implemented. For example, a first PLMN may own and/or operate deployment 1420 comprising NFs 1421, 1422. As another example, the first PLMN may implement the NF 1421 and a second PLMN may obtain, from the first PLMN (e.g., rent, lease, procure, etc.), at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. Networks may operate with greater speed, coverage, security, and/or efficiency, for example, if multiple NFs are provided at a single deployment.

FIG. 14C shows an example arrangement of core network deployments in which a single instance of an NF may be implemented using a plurality of different deployments. For example, a single instance of NF 1422 may be implemented at deployments 1420, 1440. The functionality provided by NF 1422 may be implemented as a bundle or sequence of subservices. Any subservice (e.g., each subservice) may be implemented independently, for example, at a different deployment. Any subservice (e.g., each subservice) may be implemented in a different physical location. By distributing implementation of subservices of a single NF across different physical locations, the mobile communications network may operate with greater speed, coverage, security, and/or efficiency.

FIG. 14D shows an example arrangement of core network deployments in which one or more network functions may be implemented using a data processing service. As shown in FIG. 14D, NFs 1411, 1411A, 1421, 1422 may be included in a deployment 1450 that may be implemented as a data processing service. The deployment 1450 may comprise a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the FIGS. 14A-14D, different network elements (e.g., NFs) may be located in different physical deployments, or co-located in a single physical deployment. Sending and receiving of messages among different network elements, as described herein, is not limited to inter-deployment transmission or intra-deployment transmission, unless explicitly indicated.

A deployment may be a black box that may be preconfigured with one or more NFs and preconfigured to communicate, in a prescribed manner, with other black box deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figures 15A, 15B:
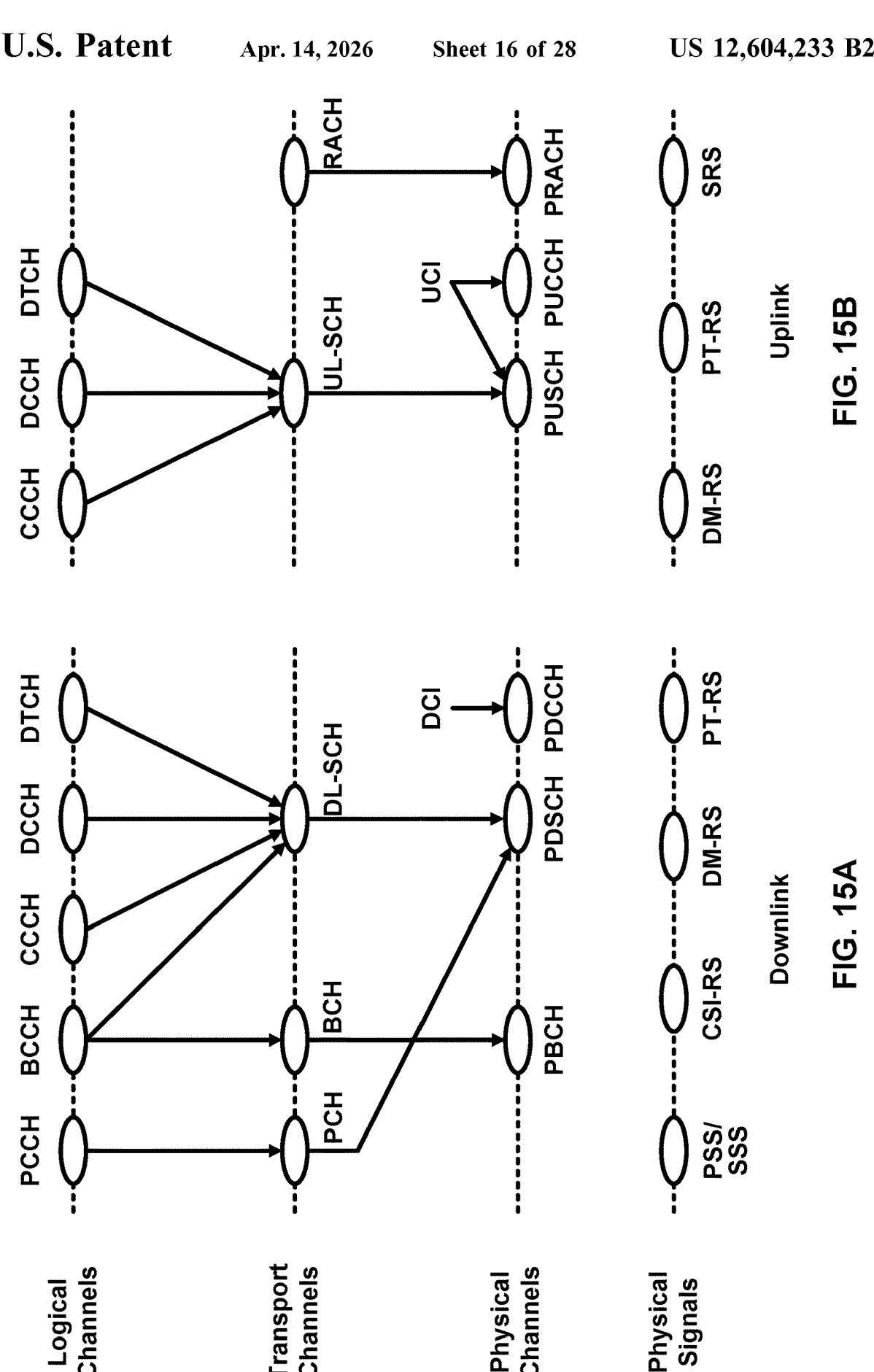
FIG. 15A shows an example mapping for downlink channels.
FIG. 15B shows an example mapping for uplink channels.

FIG. 15A shows an example mapping for downlink channels. The mapping for uplink channels may comprise mapping between channels (e.g., logical channels, transport channels, and physical channels) for downlink. FIG. 15B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random-access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 15A and FIG. 15B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

The physical signals and physical channels (e.g., described with respect to FIG. 15A and FIG. 15B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

FIG. 16 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 16 (the numerology with a subcarrier spacing of 240 kHz is not shown in FIG. 16). A subframe (e.g., in an NR configuration) may be used as a numerology-independent time reference. A slot may be used as the unit upon which uplink and downlink transmissions are scheduled. Scheduling (e.g., in an NR configuration)

may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 17:
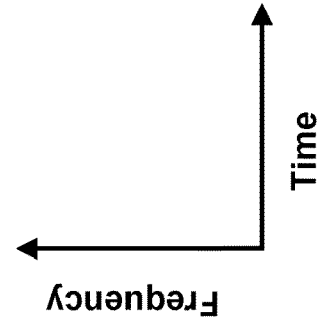
FIG. 17 shows an example resource configuration of one or more carriers.

FIG. 17 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 17. An RB may span twelve consecutive REs in the frequency domain, such as shown in FIG. 17. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 17). In other example configurations, multiple numerologies may be supported on the same carrier.

In at least some wireless communications, aggregation may be used. Aggregation may be used, for example, by combining one or more signals. The one or more signals may be combined from one or more wireless devices into a signal, or a first quantity of signals less than a second quantity of signals sent/transmitted by the one or more wireless devices. An aggregating operation may comprise, for example, receiving and/or detecting, by a first wireless device, data and/or information from one or more second wireless devices. The one or more second wireless devices may generate the data and/or the information. For example, the one or more second wireless devices may comprise a sensor wireless device, an IoT device, and/or any other type of wireless device. The one or more second wireless devices may observe/determine/detect a certain physical phenomenon and/or a condition, such as temperature, pressure, and/or humidity. One or more second wireless devices (e.g., one or more sensor wireless devices) may observe/determine/detect a same target and/or object (e.g., temperature, pressure, and/or humidity in one or more first areas) as other second wireless device(s) (e.g., temperature, pressure, and/or humidity in one or more second areas). The one or more second wireless devices (e.g., sensor wireless devices) may measure an observed target and/or object and/or quantify (e.g., quantize) the measured value of the observed target and/or object. The measured value and/or quantified (e.g., quantized) value may be within a range of values and/or with a step size (e.g., a resolution value). For example, a measured value or quantified value of the temperature may be in a range between A (e.g., A=−100 F or any other value) and B (e.g., B=200 F or any other value) with a step size C (e.g., C=1 F or any other value). For example, the range and/or the step size may be predefined and/or based on one or more conditions. The step size may be zero and/or there may be no step size. A lack of a step size (and/or a step size of zero) may indicate that the one or more second wireless devices (e.g., sensor wireless devices) may indicate any measured value in a continuous domain. For example, a first wireless device may send (e.g., transmit), to the one or more second wireless devices (e.g., sensor wireless devices), a message indicating a range and/or a step size. The one or more second wireless devices (e.g., sensor wireless devices) may send (e.g., transmit) the measured value and/or the quantified value to the first wireless device.

One or more second wireless devices, which may perform machine learning (ML) and/or artificial intelligence (AI) for a certain task may observe and/or generate data or one or more model (e.g., neural network model) parameter(s). The one or more second wireless devices may share the one or more model parameter(s) and share them with the first wireless device (and/or any other device). For example, the one or more second wireless devices may perform training on the model (e.g., neural network model) parameter(s) based on training data. The training data may be the same or different between the one or more second wireless devices. The one or more second wireless devices may send (e.g., transmit) and/or share the model parameters to/with the first wireless device. The first wireless device may average out the model parameters across the one or more second wireless devices. The first wireless device may obtain the averaged model parameters, so called a federated averaged model. This operation may be referred to as federated averaging.

A first wireless device may aggregate observed data from the one or more second wireless devices, for example, one or more sensor devices. An aggregating operation may comprise decoding and/or detecting data and/or information from one or more second wireless devices. For example, a first wireless device may decode one or more transport blocks sent (e.g., transmitted) by one or more second wireless devices. For example, a first wireless device may detect some information from received signals sent (e.g., transmitted) by one or more second wireless devices. The first wireless device may estimate one or more parameters from received signals sent (e.g., transmitted) by the one or more second wireless devices. The one or more parameters may be estimated and/or determined based on one or more characteristics of one or more received signals, such as a received signal power, an estimated signal phase, a detected sequence index, and/or any other characteristic(s).

A first wireless device may aggregate data and/or information from one or more second wireless devices. The first wireless device may compute/determine one or more functions and/or forward results (or outputs) of the one or more functions to one or more third wireless devices. The first wireless device may be called as an aggregating wireless device. The first wireless device may be a base station, a relay wireless device, a (normal) wireless device, a node, a core network device, and/or any type of wireless device. For example, a base station may aggregate data from one or more second wireless devices. The first wireless device may be an edge node in a wireless network. The edge node may comprise a radio unit and/or a central unit. The central unit may store data received from one or more second wireless device. The one or more second wireless devices may be one or more wireless devices. For example, the first wireless device may be a relay wireless device. The relay wireless device may aggregate data from nearby one or more wireless devices. The relay wireless device may send (e.g., transmit) and/or forward the aggregated data to a base station. The first wireless device that may be a data aggregating wireless device may be replaced by a base station, a relay wireless device, an edge node, a wireless device, or any type of wireless device. A base station, a relay wireless device, an edge node, a wireless device, and/or an aggregating wireless device may be a device for data aggregation and may be referred to as a different name.

A digital transmission may refer to a signal transmission method in which information and/or data may be converted into finite values (e.g., −1, 0, +1). Information and/or data may, in some cases, be converted into discrete values, such as binary bits (e.g., two finite values of 0 and 1). Information and/or data may be converted and then sent (e.g., transmitted), for example, after performing channel coding, modulation, and/or resource mapping processes. MIMO precoding and/or beamforming may be considered as a kind of resource mapping process. Modulation symbols may be mapped into spatial domain resource. Digital samples after coding, modulation mapping, and/or resource mapping process, may use a digital-to-analog conversion process, for example, in the digital transmission. Final transmission signal may be an analog signal converted from a digital signal. Baseband processing such as the coding, modulation, and/or resource mapping may be performed in a digital domain. Finite values may be converted into a plurality of digital samples. The plurality of digital samples may be converted into one or more analog signals. The one or more analog signals may be sent (e.g., transmitted), for example, at an antenna port and/or using any type of transmission component. For example, the data may be composed of binary bits. The binary bits may be converted into coded bits through a channel coding process. The coded bits may be converted into QPSK, QAM, and/or any other type of modulation symbols. Modulation symbols may be mapped to one or more resources. A wireless device may send (e.g., transmit) the modulation symbols via the one or more resources. Digital transmission may be referred to as, for example, a digital signal, a digital communication, and/or a digital communication transmission.

An analog transmission may refer to a signal transmission method in which information and/or data may vary over a continuous range of values (e.g., 2.1, 2.5, 10, −11.2), may vary over a continuous period of time, and/or may be mapped to a signal transmission parameter for transmission. The signal transmission parameter may be used for a signal transmission (e.g., physical layer signal transmission). A signal format of the signal may be (pre)configured between a transmitter wireless device and a receiver wireless device. The signal may be a (pre)configured sequence, a preamble, a reference signal, and/or a specific physical layer format. The signal may be sent (e.g., transmitted) in (pre)configured time and/or frequency resources. In the analog transmission, information and/or data may be embedded in transmission parameter(s) such as amplitude, power, time delay, phase, and/or any other transmission parameter(s). The analog transmission may not require digital-to-analog conversion, for example, if the analog signal may be generated in analog domain. Analog transmission may be referred to as, for example, an analog signal, an analog communication, and/or an analog communication transmission.

A signal may be (pre)determined or (pre)configured between a transmitter wireless device and a receiver wireless device. For example, a base station (e.g., a receiver wireless device) may indicate and/or configure, to a transmitter wireless device, one or more configuration parameters. The one or more configuration parameters may comprise a sequence index. The one or more configuration parameters may comprise a sequence identity. The one or more configuration parameters may comprise an orthogonal cover code. The one or more configuration parameters may comprise an antenna port number for the signal. The one or more configuration parameters may comprise a number/quantity of ranks of the signal. The one or more configuration parameters may comprise a format indicator. For example, a signal may be one of one or more signal formats. The format indicator may indicate one among the one or more signal formats. For example, a signal for analog or AirComp transmission may have one or more signal formats (e.g., similar to an uplink control channel). A base station and/or a receiver wireless device may indicate, to a wireless device, the one or more signal formats for one or more uplink transmissions (e.g., an analog transmission and/or an Air-Comp transmission). The one or more configuration parameters may comprise a size of time resources (e.g., a number of retransmissions, or a number of symbols). The one or more configuration parameters may comprise a size of frequency resources (e.g., a number of resource blocks, a number of groups of subcarriers, or a number of subcarriers).

A signal transmission parameter may comprise a transmit power (e.g., transmission power). A wireless device may determine the signal transmit power of a signal based on the information and/or the data. The wireless device may determine the signal transmit power in decibel scale based on the information and/or the data. The wireless device may determine the signal transmit power in linear scale based on the information or the data. A converting function may be used, for example, to map the information and/or the data to the signal transmit power.

The signal transmission parameter may comprise an amplitude of a signal. A wireless device may determine the amplitude of a signal based on the information and/or the data. For example, a converting function may be used to map the information and/or the data to the amplitude of the signal.

The signal transmission parameter may comprise a signal phase. A wireless device may determine a signal phase of a signal based on the data and/or the information. For example, a converting function may be used to map the information and/or the data to the phase of the signal. A value of the data or the information may be mapped into a value from 0 to $2\pi$ (or any other value(s) and/or range of values).

The signal transmission parameter may comprise a cycle delay of a signal. For example, the signal may be an OFDM symbol. A converting function may be used to map the information and/or data to the cycle delay of the signal. A normalized range of the cycle delay may be zero to one. The cycle delay value may be normalized by an OFDM symbol length.

The signal transmission parameter may comprise an index of a sequence and/or a sequence set. The sequence set may comprise one or more orthogonal sequences. The sequence set may be (pre)determined and/or shared between wireless devices. Each orthogonal sequence may be indexed with a unique number. A wireless device may have/receive/determine data and/or information. The wireless device may send (e.g., transmit) a first sequence among the sequence set, for example, if the data and/or the information satisfies a first condition. The wireless device may send (e.g., transmit) a second sequence among the sequence set, for example, if the data or the information satisfies a second condition. Any quantity of sequences and/or conditions (e.g., conditions corresponding to respective sequences) may be used. One or more sequences in the sequence set may be mapped to one or more conditions, respectively. The one or more conditions may comprise that the data belongs to a range. The one or more conditions may comprise whether data occurred within a range. The one or more conditions may comprise whether an event has occurred.

Channel coding process may be skipped, for example, in the analog transmission. The information and/or the data may be generated and/or measured by a wireless device. The information and/or the data may be represented and/or expressed by one or more scalar values. The information or the data may be represented and/or expressed by one or more points in a vector space. The one or more points in the vector space may be represented by one or more scalar values. Each of the one or more scalar values may be mapped to each of one or more signal transmission parameters.

A second wireless device may detect (e.g., in an analog transmission) information and/or data, such as a temperature level and/or any other information and/or data (e.g., sensor-based data). The second wireless device may determine a transmit power based on the information and/or data (e.g., temperature level), such as may be indicated in an analog transmission. The second wireless device may send (e.g., transmit) a (pre)determined signal with the transmit power. A first wireless device may receive the (pre)determined signal. The first wireless device may estimate the received power of the (pre)determined signal. The first wireless device may estimate the information and/or data (e.g., temperature level) based on the received power of the (pre)determined signal (e.g., of an analog transmission indicating the information and/or data).

A second wireless device may determine a transmit power based on the information and/or data (e.g., temperature level) and a pathloss of wireless channel between the second wireless device and a first wireless device. For example, the second wireless device may estimate the pathloss. The second wireless device may determine a first part of the transmit power based on the pathloss. The second wireless device may determine a second part of the transmit power based on the information and/or data (e.g., temperature level). The second wireless device may add the first part and the second part to determine the transmit power. The second wireless device may send (e.g., transmit), to a first wireless device, a (pre)determined signal with the transmit power.

A second wireless device may send (e.g. transmit) sensing information to a first wireless device. For example, a second wireless device may send (e.g., transmit) to an edge node or a base station, sensing information (e.g., information detected by a sensor) such as temperature, humidity, pressure, and/or other measured information. The sensing information may be converted to a signal transmit power. The second wireless device may determine a transmit power based on the sensing information. For example, if the temperature range is from A to B, the transmit power may be determined based on one-to-one conversion from P Watt to Q Watt according to the temperature (e.g., where A, B, P, and Q may each correspond to a different value).

The second wireless device may send (e.g., transmit) a specific sequence, for example, if the wireless device identifies and/or detects an event. For example, if the second wireless device detects a discovery signal of a specific wireless device in the vicinity and/or succeeds in decoding a specific transport block, the second wireless device may send (e.g., transmit) a specific sequence.

An aggregating operation may comprise computing/determining one or more functions based on the received data and/or information and/or the estimated parameter(s). The aggregating operation may comprise forwarding the one or more functions to one or more third wireless devices and/or to a core network (e.g., a core network function device).

Aggregating may be used for gathering, acquiring, and/or receiving information and/or data. For example, data and/or information may be aggregated from a plurality of locations and/or from a plurality of wireless devices. The data and/or information may be sent (e.g., transmitted) to a receiving device that may analyze the data and/or information in an aggregated manner.

A first wireless device may aggregate data from one or more second wireless devices, for example, in ML and/or AI applications. For example, an aggregating node, such as a base station and/or a relay wireless device, may aggregate data sent (via e.g., analog transmission) from one or more second wireless devices. The aggregating node may be referred to as an edge node (e.g., in ML or AI applications). The edge node may aggregate data samples and/or train one or more models (e.g., neural network models) for ML and/or AI applications based on the data samples. Edge learning may refer to the implementation of ML at the network edge so as to leverage enormous data distribution at one or more wireless devices for training one or more models (e.g., neural network models). The one or more wireless devices may send (e.g., transmit) observed data or model parameters to the edge node (e.g., in ML or AI applications). The edge node may aggregate the data and/or model parameters. The one or more wireless devices may send (e.g., transmit) one or more model parameters to the edge node, for example, in a federated ML application. Without direct exchanging data between devices, privacy issue may be mitigated. The edge node may average out the model parameters to get an averaged and/or a federated model. This procedure may be referred to as a federated averaging.

One or more second wireless devices may send (e.g., transmit) raw data and/or sample data directly to the first wireless device (e.g., an edge node), for example, in an edge learning application. This may be direct data exchanging between devices. The data may be represented by one or more points in a vector space. The one or more points may be represented by one or more scalar values or one or more coefficients. One or more wireless devices may convert its own data to a point in a complex vector space (e.g., in the edge learning application). For example, a data sample may be mapped into a m-dimensional subspace in n-dimensional complex vector space. Data samples may be classified to m subsets. A data sample (e.g., one data sample) may be expressed by m orthonormal bases in n-dimensional vector space. One or more wireless devices may send (e.g., transmit) m-coefficients of m-orthonormal bases to an edge node. For example, one or more wireless devices may send (e.g., transmit) the m-coefficients via a digital transmission. The m-coefficients may be converted into binary bits. A channel coding process, modulation process, and/or a resource mapping process may be used from the binary bits. For example, one or more wireless devices may send (e.g., transmit) the m-coefficients via an analog transmission. Each of the m-coefficients may be sent (e.g., transmitted) via a (pre)determined signal. A transmission parameter of the (pre)determined signal may be determined based on each of the m-coefficients. For example, a transmit power of the (pre)determined signal may be determined based on one of the m-coefficients.

Figures 18A, 18B:
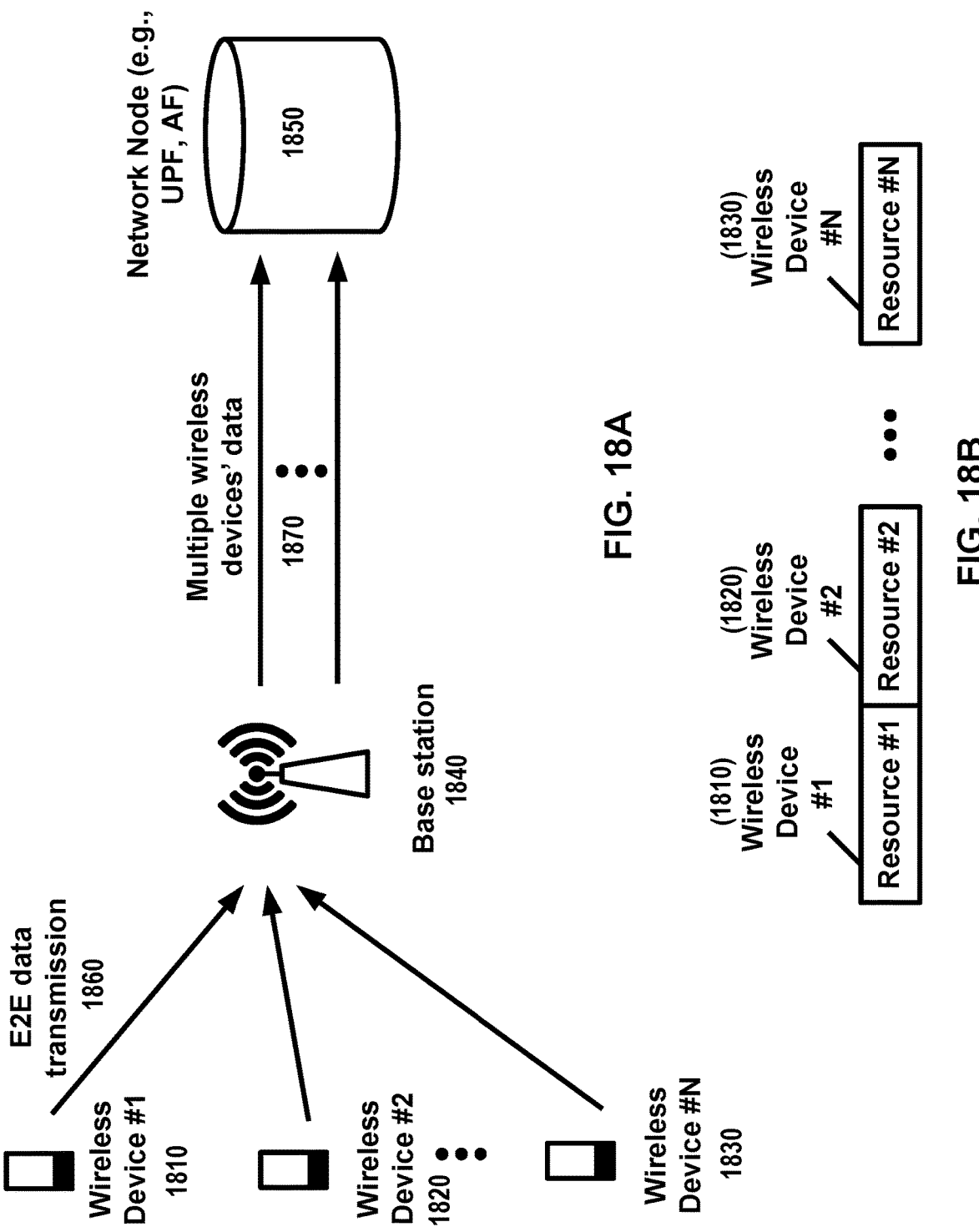
FIG. 18A and FIG. 18B show an example of data aggregation.

FIGS. 18A and 18B show an example of data aggregation. A base station 1840 may aggregate data from wireless device #1 (1810) to any quantity of wireless devices, such as wireless device #2 1820 to wireless device #N (1830). The base station 1840 may transfer individual wireless device's data to a network node 1850 (e.g., a core network function device). The network node 1850 may comprise user plane function (UPF) and/or an application function (AF). The network node 1850 may compute/determine a function based on the individual wireless device's data 1870. A base station may assign, among the multiple wireless devices' data 1870, separate data for different wireless devices (1810/1820/1830). Resources allocated to the wireless devices (1810/1820/1830) may be large, for example, if the number of wireless devices is large. FIG. 18B shows an example of resource allocation, wherein each of wireless devices 1810, 1820, and 1830 may respective resources Resource #1, Resource #2, and Resource #N.

A large quantity of wireless devices may be connected to the Internet. For example, more than a million, billion, or trillion (or any other quantity of) wireless devices may be connected to the Internet in a wireless network (e.g., 5G, 6G, WiFi, and/or any other technology). An increasing quantity of wireless devices may raise challenges for data aggregation in a wireless network. For example, resource allocation for so many wireless devices may be difficult. The amount of data delivered between devices (e.g., between a base station and a core network) may be increasingly large. In addition, machine learning (ML) applications may create challenges. For example, a huge amount of data may be generated by various devices. Data collection from ubiquitous massive smart sensors/devices with limited spectrum bandwidth may be challenging, for example, if the data needs to be processed/communication in a timely manner. For example, a base station may allocate orthogonal resources in time and/or frequency to wireless devices for data aggregation. As the quantity of wireless devices increases, the quantity of orthogonal resources may become insufficient to aggregate the data in a timely manner.

Due to a large number of data sources, the value of each individual data source may be less significant to (and/or too numerous to realistically handle for) a core network entity, a base station, a relay, a wireless device, and/or any computing device. Instead of focusing on individual data sources, interest may be shifted to the fusion of massive data and/or a function computation result based on the massive data. The computation of a large amount of data may be challenging for a computing device (e.g. a core network entity, a base station, a relay, a wireless device, etc.) that may have a limited computation capacity.

As described herein, a function may be computed/determined over-the-air. A function may be computed/determined over-the-air, for example, by utilizing a superposition nature of a wireless channel. Two (or more) signals may be weighted (e.g., linearly weighted), combined, and/or summed up (e.g., from a receiver perspective), for example, if a first wireless device sends (e.g., transmits) a first signal on/via/using a shared resource and a second wireless device (or any other quantity of wireless devices) sends (e.g., transmits) a second signal (or any other quantity of signals) on/via/using the shared resource. A first signal and a second signal (or more signals) may be superposed in/via/using the shared resource. The receiver may receive a weighted sum of these two (or more) signals. A base station (e.g., an edge node/function, an aggregator device, etc.) may assign a shared resource to wireless devices, for example, in a dense network in which the quantity of wireless devices may be large. The wireless devices may send (e.g., transmit) a (pre)determined signal using a different transmission parameter. For example, each wireless device may determine a transmission parameter based on its data, a pathloss, and/or a wireless channel. The (pre)determined signals may be superposed in the air. The base station may compute/determine a function based on the superposed signals.

One or more resources (e.g., time and/or frequency resource(s)) may be used and/or shared by one or more wireless devices. For example, a shared resource may be used by a plurality of wireless devices to communicate information (e.g., a same type of information) to a base station. The information may comprise, for example, measurement data from each of the plurality of wireless devices, such as sensor measurements (e.g., temperature, pressure, humidity, and/or any other sensed/measured data). Rather than using separate configuration parameters for each wireless device and its respective uplink transmission, one or more configuration parameters (e.g., QoS parameter(s)) may be applied for a group of uplink transmissions that use a shared resource. By using group configurations and associated communications described herein, advantages may be achieved such as reduced overhead signaling and/or reduced power consumption.

For example, a wireless device (e.g., each wireless device of a plurality of wireless devices) may determine a transmit power based on its sensing data, a pathloss, and/or a wireless channel. A wireless device (e.g., each wireless device) may send (e.g., transmit) a signal to a base station using the transmit power. The base station may estimate a received power of the aggregated signal superposed in the air. The base station may determine a function (e.g., a computation result) based on the (estimated) received power. This operation may be referred to as AirComp, AirComp transmission, and/or over-the-air computation.

A wireless device (e.g., each wireless device of a plurality of wireless devices, such as one or more sensors) may send (e.g., transmit) data in/via/using a shared resource. A base station may indicate, to one or more wireless devices (e.g., one or more sensors), a same time and/or frequency resource as the shared resource. The one or more wireless devices (e.g., one or more sensors) may perform a transmission (e.g., AirComp transmission) on/via/using the same time and/or frequency resource. The base station (e.g., aggregator) may compute/determine one or more functions based on the received signal of the shared resource. The transmission (e.g., AirComp transmission) may be used to compute/determine, for example, at least one of: an arithmetic mean, Euclidean Norm, a number of active nodes, a maximum, a minimum, a histogram, a linear regression, a Geometric mean, and/or any other operation(s). Determining which function to compute/determine over-the-air may be determined based on a transmission parameter and/or how a transmission parameter is determined (e.g., in AirComp transmission). For example, an arithmetic mean may be calculated/determined by one or more wireless devices using a method of linear mapping a measured value to a transmit power. A geometric mean may be computed/determined by converting the measured value to a value taking the exponent and then linearly mapping the value to a transmit power.

Figures 19A, 19B:
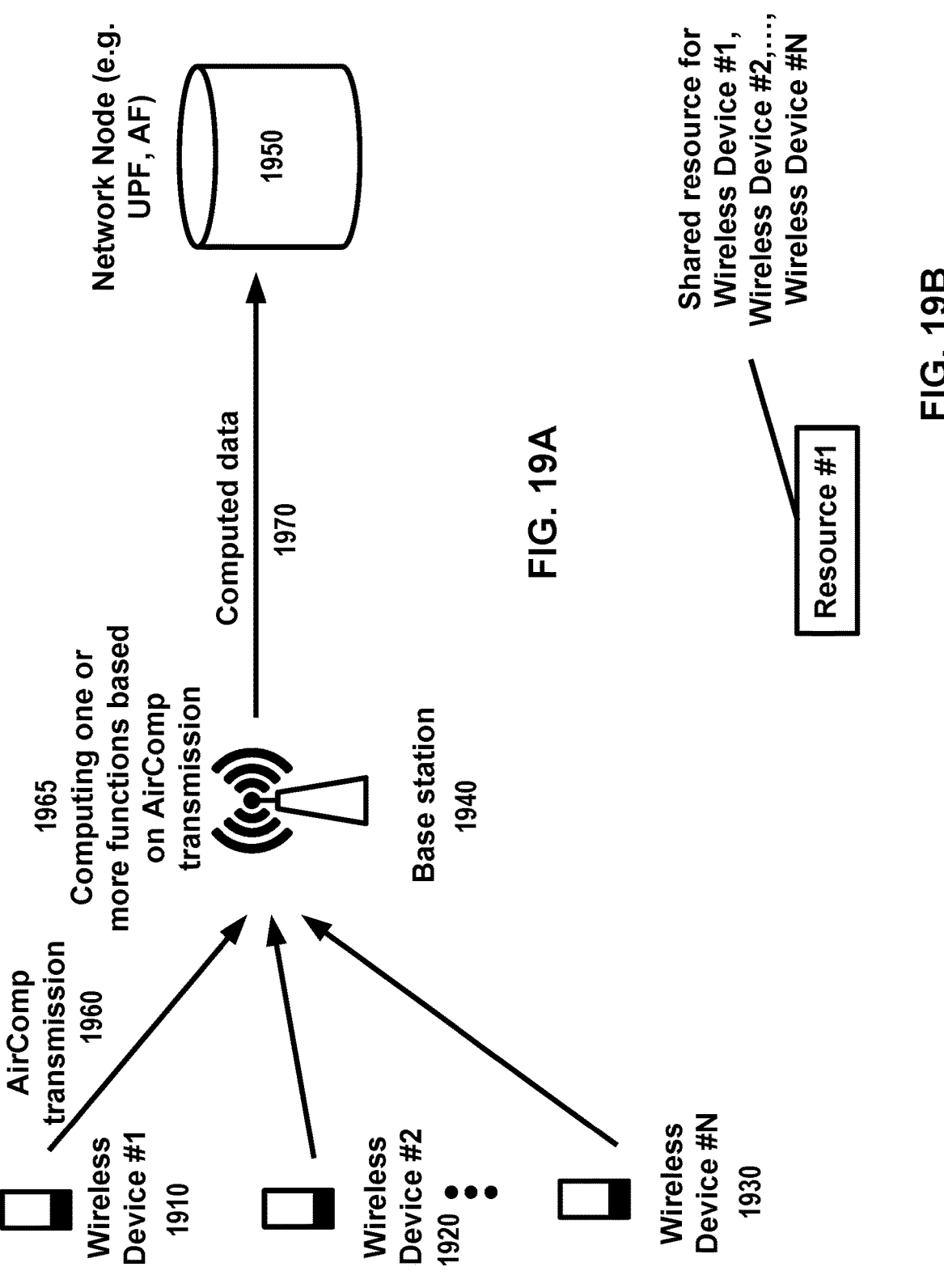
FIG. 19A and FIG. 19B show an example of uplink transmission.

At least some wireless networks may achieve one or more objectives to provide end-to-end (E2E) information transmission. A focus may shift from each device's individualized data to one or more computation results based on data from a group of devices, for example, in at least some other wireless networks (e.g., for IoT devices and/or machine type communication (MTC) devices). For example, there may be numerous sensors (e.g., thermostats, and/or any other type of sensors) at a location (e.g., a building). As another example, a user may be associated with a plurality of wireless devices (such as a smart watch, a mobile phone, a computer, and/or any other device capable of sensing, determining, and/or sending information and/or data). As described herein, utilizing the superposition nature of a wireless channel in an uplink transmission (e.g., using AirComp transmission) information and/or data may be communicated on/via/using a shared resource that may provide advantages such as resourced overhead and/or communication load (e.g., via a wired line from a base station to a core network), and/or other advantages evident from descriptions herein. As also described herein, group configurations may be advantageously used in various applications such as over-the-air computation (e.g., AirComp), for example, in which low-power wireless devices may be configured to send analog signals, aggregated via a shared resource, to indicate measurement data, as well as any other applications benefitting from the efficiencies of group configurations. Group configurations described herein may be advantageously used in various applications such as over-the-air computation (e.g., AirComp), for example, in which low-power wireless devices may be configured to send analog signals, aggregated via a shared resource, to indicate measurement data, as well as any other applications benefitting from the efficiencies of group configurations. FIG. 19A and FIG. 19B show an example of uplink transmission. For example, the uplink transmission may be AirComp transmission. A base station may indicate a shared resource (e.g., Resource #1). This shared resource (e.g., Resource #1) may be used by a plurality of wireless devices (e.g., Wireless Device #1, Wireless Device #2, . . . Wireless Device #N). From wireless device #1 (1910) to wireless device #N (1930), each wireless device of a plurality of wireless devices may send (e.g., transmit) its data via an analog transmission. A base station 1940 may indicate, to wireless devices (1910/1920/1930), a configuration parameter to indicate a signal format or a sequence index. The wireless devices (1910/1920/1930) may send (e.g., transmit) a same signal or same sequence (such as a reference signal, a preamble, and/or a known signal between the base station 1940 and each wireless device (1910/1920/1930)). Each wireless device's transmission parameter may be different. Each wireless device (1910/1920/1930) may determine its transmission parameter based on its data and/or a pathloss and/or a wireless channel. For example, each wireless device (1910/1920/1930) may determine its transmit power based on its data and/or a pathloss and/or a wireless channel. The pathloss or the wireless channel may be one between each wireless device (1910/1920/1930) to a base station 1940. The base station 1940 may receive the AirComp transmission/signal 1960. The base station 1940 may estimate a parameter based on the AirComp transmission 1960 (e.g., at step 1965). The base station 1940 may compute/determine a function directly based on the parameter. The base station 1940 may send (e.g., transmit), to a network node 1950 (e.g., UPF, AF, etc.), the computed/determined function as computed data 1970.

A broadcast (or a multicast) may indicate that a transmitter wireless device may send (e.g., transmit), to one or more receiver wireless devices, one or more transport blocks via the same time and/or frequency resources. The one or more transport blocks may be sent (e.g., transmitted) in an area. The broadcast may indicate that all wireless devices in a certain area may receive or listen to the one or more transport blocks. The one or more transport blocks may be deliverable to all wireless devices in the certain area. The one or more transport blocks may convey one or more broadcast messages. The one or more transport blocks may be used to provide broadcast services such as a broadcasting service (e.g., a television broadcast, a radio broadcast, a media streaming broadcast, and/or any other broadcast). The transmitter wireless device may be a base station. The transmitter wireless device may be a wireless device. The transmitter wireless device may indicate, to the one or more receiver wireless devices, the same time and/or frequency resources for the one or more transport blocks. The one or more receiver wireless devices may need to monitor or decode the one or more transport blocks.

A groupcast may indicate that a transmitter wireless device may send (e.g., transmit) to a group of the one or more receiver wireless devices, the one or more transport blocks. A difference between the groupcast and the broadcast may be that the group of the one or more receiver wireless devices may be a subset of wireless devices in a certain area. For example, when there are N receiver wireless devices in an area, a groupcast may mean that a transmitter wireless device may send (e.g., transmit) one or more transport blocks to M (<N) receiver wireless devices, and a broadcast may mean that a transmitter wireless device may send (e.g., transmit) one or more transport blocks to N receiver wireless devices. The group may be (pre)associated by an application layer.

Multimedia Broadcast Multicast Services (MBMS) may be a point-to-multipoint interface in a wireless network. The MBMS may be designed to provide efficient delivery of broadcast or multicast services. The MBMS may be designed to provide broadcast or multicast services within a cell or within a core network. For broadcast or multicast transmissions across multiple cells, it may define transmission via single-frequency network (SFN) configurations. In an SFN configuration, a group of adjacent base stations may send, to wireless devices, the same signal simultaneously on the same frequency resources (e.g., sub-carriers, resource blocks, a group of resource blocks). Broadcast and/or multicast subscribing wireless devices (such as television viewers, radio listeners, and/or media consumers) may be served by the groups of base stations.

A group uplink transmission may refer to a multipoint-to-a point communication in a wireless network. In the group uplink transmission in a wireless network (e.g., cellular network), a group of wireless devices (or one or more wireless devices) may send (e.g., transmit), to a base station, one or more uplink signals for a same purpose, a same application, a same service, a same QoS flow, and/or a same packet flow. The group of wireless devices may share one or more common radio resources (that may be shared in time/frequency/space with the group of wireless devices) to send (e.g., transmit) uplink signal(s) or data packet(s). A base station may send (e.g., transmit), to the group of wireless devices, one or more common RRC configuration parameters. For example, the one or more common RRC configuration parameters may comprise an SDAP configuration parameter. The one or more common RRC configuration parameters may comprise one or more QoS configuration parameters. The one or more wireless device may use the same SDAP configuration parameter. The one or more wireless devices may use the same QoS configuration parameters. The group of wireless devices may share one or more sessions for their packet delivery to a core network (e.g., a core network function device). Based on the group uplink transmission, the core network or the base station may reduce signaling overhead to indicate/configure session/radio resource/QoS parameter configurations.

Figure 20:
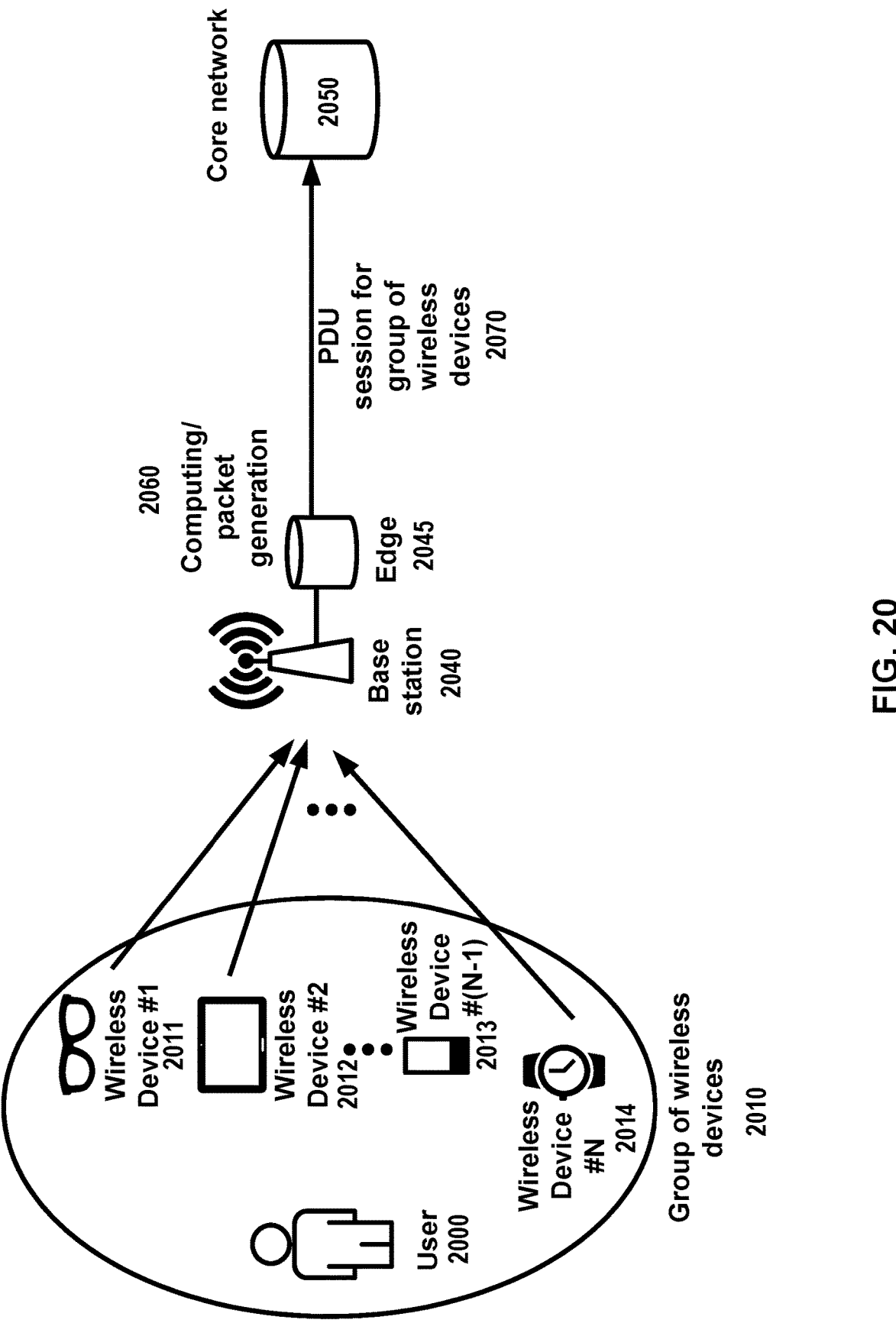
FIG. 20 shows an example of a group uplink transmission.

FIG. 20 shows an example of a group uplink transmission. For example, a user (e.g., user 2000) may be associated with one or more wireless devices (e.g., a group of wireless devices 2010), such as smart glasses (e.g., wireless device #1 2011), computer (e.g., wireless device #2 2012), mobile phone (e.g., wireless device #N−1 2013), smart watch (e.g., wireless device #N 2014), and/or other types of wireless devices. The user's N wearable devices (2010) may not generate much data traffic. A core network 2050 (e.g. core network function device) may not be interested in each device's (2010) individual data traffic. For example, if there is an edge 2045 (server) nearby a base station 2040, the edge 2045 may compute/determine a function and/or generate a packet (e.g., at 2060) based on received signal from the group of wireless devices (2010). The base station 2040 or edge 2045 may send (e.g., transmit), to the core network 2050 (e.g., a core network function device), a PDU session 2070 for the group of wireless devices (2010). In at least some systems, each wireless device (2010) may have individual session management signaling and each wireless device (2010) may maintain a session individually with the core network function 2050. Such separate signaling may cause an increase of signaling overhead and/or management effort. In contrast, as shown in FIG. 20, a PDU session 2070 for the group of wireless devices (2070) may greatly reduce data to be delivered to the core network 2050, for example, by avoiding a requirement of individual session management signaling for each wireless device in the group of wireless devices (2010).

Figure 21:
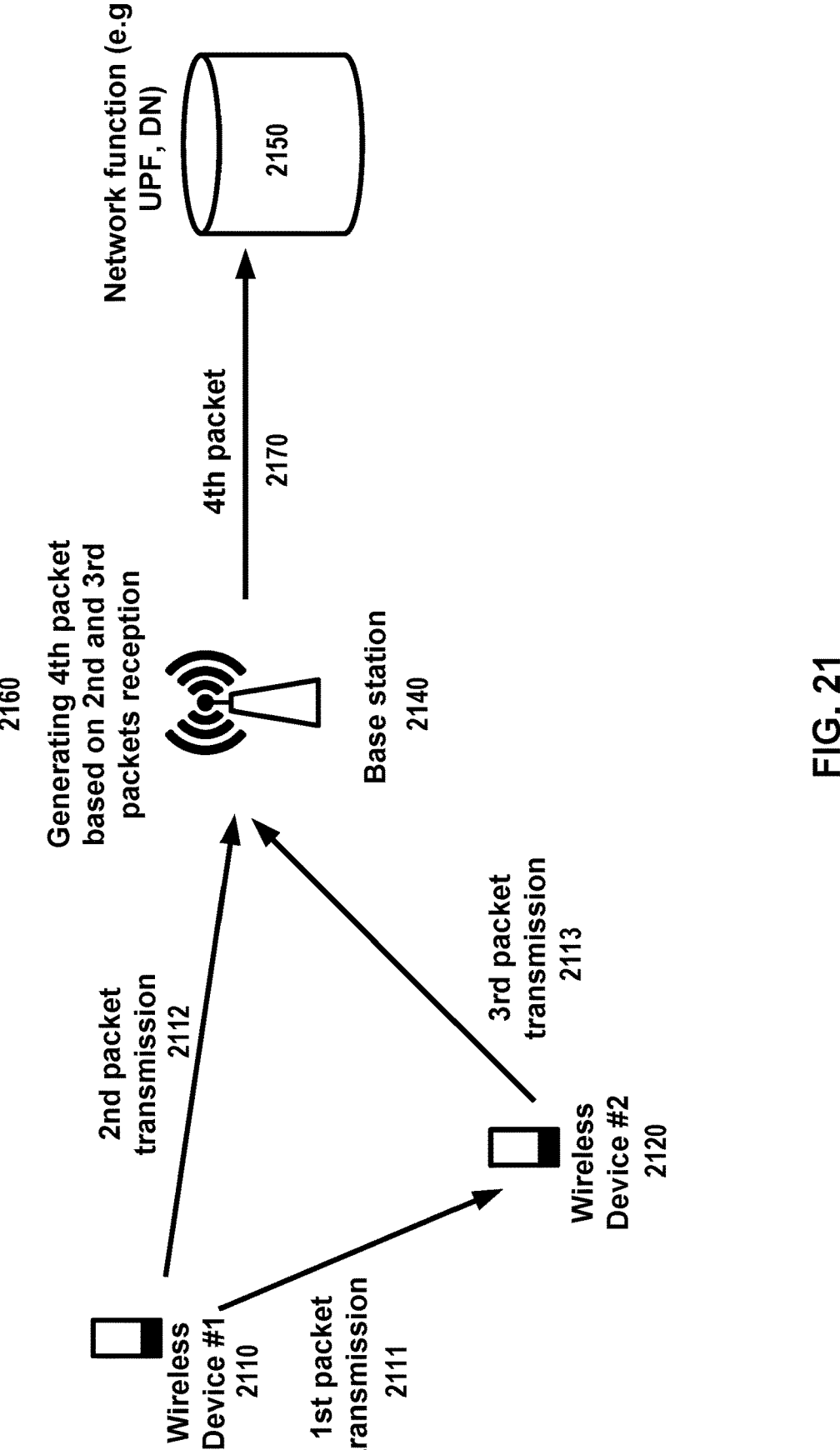
FIG. 21 shows an example of a cooperative communication and/or transmission.

FIG. 21 shows an example of a cooperative communication and/or transmission. A wireless device #1 (2110) may send (e.g., transmit) a first packet 2111 to wireless device #2 (2120). The wireless device #1 (2110) may send (e.g., transmit) a second packet 2112 to a base station 2140. A wireless device #2 (2120) may send (e.g., transmit) a third packet 2113 to the base station 2140 (e.g., at the same time as the second packet 2112). The base station 2140 may generate a fourth packet 2170 based on the second packet 2112 and the third packet 2113 reception (e.g., at 2160). This procedure may be considered as a group uplink transmission. The base station 2140 may not directly forward received packets to a core network (e.g., a core network function device) 2150. The base station 2140 may forward a newly generated packet (e.g., the fourth packet 2170) to the core network (e.g., a core network function device) 2150.

An AirComp transmission may be a type of a group uplink transmission. In the AirComp transmission, one or more wireless devices may send (e.g., transmit) one or more analog signals on a shared resource to a base station. The one or more analog signals may comprise uplink signals such that the AirComp transmission may be regarded as a group uplink transmission. The uplink group communication may be referred to as an uplink transmission for a group of wireless devices, an uplink group communication, a group uplink communication, and/or a group uplink transmission.

A group of wireless devices may be in a network (e.g., a massive IoT network) where a large number of wireless devices (e.g., IoT sensors) may send (e.g., transmit) uplink signals and/or uplink data packets to a base station. The group of wireless devices may send (e.g., transmit) (one or more) uplink signals or (one or more) uplink data packets for a same application, a same service, and/or a same purpose. The group of wireless devices may have a same capability. The group of wireless devices may be a same type of wireless device category. The group of wireless devices may be configured with a same QoS flow. The group of wireless devices may be configured with same QoS parameters. The group of wireless devices may share a same session. The group of wireless devices may be established with the same session. The group of wireless devices may trigger a request of a same session establishment.

A group of wireless devices may be sensor wireless devices. The group of wireless devices may measure environment sensing information such as temperature, humidity, pressure, some event, and/or one or more observations and/or conditions. The group of wireless devices may be wearable wireless devices. The group of wireless devices may generate a same type (or service, application) of packets. The group of wireless devices may share one or more same IP addresses and/or any other address and/or identifier. The group of wireless devices may send (e.g., transmit) uplink signals and/or the uplink data packets via one or more shared resources which may be allocated to the group of wireless devices. The base station may send (e.g., transmit), to the group of wireless devices, a group common DCI to indicate the one or more shared resources. A base station may indicate an RNTI (or one or more RNTIs) to the group of wireless devices for the group common DCI. A group common RRC and/or a SIB may be used to indicate the one or more shared resources. A group common RRC and/or a SIB may be used to indicate the group common DCI. The group uplink transmission may reduce signaling overhead.

A cooperative transmission or communication may be a group uplink transmission. For example, a first wireless device may not have enough coverage or lack of transmit power to achieve enough coverage. A second wireless device nearby the first wireless device may help the first wireless device. The second wireless device may send (e.g., transmit) one or more packets instead of the first wireless device. At the same time (or at a substantially similar time), the first wireless device may send (e.g., transmit) its own packet to the base station. For example, wireless device #1 may be far from a base station. The wireless device #1 may send (e.g., transmit) a first packet transmission to wireless device #2. The wireless device #2 may send (e.g., transmit), based on the first packet, a third packet to the base station. At the same time or different time, wireless device #1 may send (e.g., transmit) a second packet to the base station. The second packet and the third packet may be originated from wireless device #1. Therefore, the base station may decode the second and the third packets. The base station may generate a fourth packet based on the second and the third packets. The base station may send (e.g., transmit) the fourth packet to a core network (e.g., a core network function device).

A QoS flow may be identified by QFI (e.g., QoS flow ID). The QFI may be dynamically assigned to a wireless device or may be equal to the 5QI. The 5QI value may be used as the QFI of the QoS flow, for example, if standardized 5QIs or pre-configured 5QIs may be used and/or if the 5QI is within the range of the QFI (e.g., a value less than 64 or some other quantity). For other cases, the 5QI value may be a standardized, pre-configured or dynamically assigned. The QoS profile and the QFI of a QoS Flow may be provided to the (R)AN over N2 at PDU Session Establishment/Modification and if NG-RAN is used every time the User Plane of the PDU Session is activated.

A QoS flow (e.g., each QoS flow) may have QoS profile. A QoS profile (e.g., each QoS profile) may have QoS parameters. The QoS profile (e.g., each QoS profile) may comprise 5QI (5G QoS Identifier). The QoS profile (e.g., each QoS profile) may comprise allocation and retention priority. The QoS parameters may be different depending on flow type. For example, for non-GBR QoS flow, a reflective QoS attribute parameter (RQA) may be included in the QoS profile. For GBR QoS flow, the QoS profile may comprise guaranteed flow bit rate (GFBR) and maximum flow bit rate (MFBR). For GBR QoS flow, QoS profile may comprise a notification control. An alternative QoS profile may be provided by SMF, for example, if the notification control is enabled. The alternative QoS profile may comprise PDB (packet delay budget), PER (packet error rate), and/or GFBR. 5G QoS characteristics may be associated with 5QI. 5G QoS characteristics may comprise resource type (which indicates non-GBR, GBR, delay-critical GBR, etc.). 5G QoS characteristics may comprise priority level. 5G QoS characteristics may comprise PDB (including core network packet delay budget). 5G QoS characteristics may comprise PER. 5G QoS characteristics may comprise averaging window (for GBR and delay-critical GBR resource type). 5G QoS characteristics may comprise maximum data burst volume (for delay critical GBR resource type).

In at least some wireless communications, a QoS framework may be based on digital packet transmission. For example, QoS parameters (or QoS characteristics) may comprise a packet error rate. The packet error rate may be measured within a time window based on cyclic redundancy checks of received packets. The packet error rate may not be measurable between a wireless device and a base station (e.g., in an analog or an AirComp transmission). For example, if/when the base station receives an analog signal, the base station may not be able to determine whether the analog signal has erroneous reception or not since the analog signal may not have cycle redundancy check bits. Therefore, at least some QoS frameworks may not be applicable for analog transmission and/or for AirComp transmission.

At least some QoS frameworks may not be efficient, for example, in a group uplink transmission. A group of wireless devices may share resource(s) or data packets of each wireless device in the group may not be deliverable to a core network (e.g., a core network function device). At least some QoS frameworks may be used for end-to-end packet quality control, but in the group uplink transmission, the base station may convert and/or transform and/or (re)generate new packets based on received packets. At least some per-user QoS control may not be applicable or efficient to the group uplink transmission.

As described herein, quality management may be used for one or more wireless devices. A core network (e.g., a core network function device) may indicate, to a base station, one or more QoS parameters for one or more uplink transmissions (e.g., an analog transmission and/or an AirComp transmission). The one or more QoS parameters may comprise one or more of: a mean squared error of received (e.g., analog or AirComp) signal(s); a quality of computation error (e.g., for AirComp signal(s)); and/or any other parameter(s). The one or more QoS parameters may be applicable to determine radio link quality and/or received signal quality of the analog and/or the AirComp transmissions. The base station may determine RRC configuration parameters based on the one or more QoS parameters. The base station may control resource size and/or transmit power (and/or any other parameter(s)) based on the one or more QoS parameters. A core network function may indicate, to a base station, one or more QoS parameters for a group uplink transmission. For example, the one or more QoS parameters may comprise a group aggregated maximum bit rate. Based on the QoS parameters, the base station may determine RRC configuration parameters.

As described herein, a base station and/or a wireless device may effectively determine/control/adjust one or more transmission parameters. The one or more transmission parameters may comprise a size of radio resource and/or a transmission power parameter to satisfy a target QoS requirement. The one or more transmission parameters may be effectively determined/controlled/adjusted, for example, even if/when a wireless device sends (e.g., transmits) an analog signal, one or more wireless devices sends (e.g., transmits) AirComp signals and/or group uplink signals, and/or a new transmission scheme of uplink transmission may be used.

A base station may receive, from a core network (e.g., a core network function device), one or more QoS parameters for a new uplink transmission scheme. The new uplink transmission scheme may comprise a group uplink transmission. The new uplink transmission scheme may comprise an AirComp transmission. The new uplink transmission scheme may comprise an analog transmission. For example, the base station may receive, from the core network (e.g., a core network function device), one or more QoS parameters for a group uplink transmission. The one or more QoS parameters may comprise a group aggregated guaranteed bit rate. The one or more QoS parameters may comprise an aggregated maximum packet error rate. The one or more QoS parameters may comprise a group aggregated maximum data burst volume.

The base station may send (e.g., transmit) to one or more wireless devices, one or more RRC configuration parameters. The one or more RRC configuration parameters may comprise/indicate a size of a radio (time and/or frequency) resource. The one or more RRC configuration parameters may comprise/indicate one or more transmission power control parameters such as PO (a minimum power) and/or alpha (a pathloss compensation parameter). The one or more RRC configuration parameters may indicate SDAP configuration parameter. The SDAP configuration determines how to map QoS flows to DRBs. The SDAP configuration parameter may comprise PDU session identity which is an identity of a PDU session whose QoS flows may be mapped to a DRB. The SDAP configuration parameter may comprise a QFI. The SDAP configuration parameter may comprise mapped QoS flow to add. The mapped QoS flow to add may indicate a list of QFIs of UL QoS flows of the PDU session to be additionally mapped to this DRB. A QFI value may be included a maximum quantity of times (e.g., at most one time) in all configured instances of SDAP-Config with the same value of PDU-Session.

The one or more RRC configuration parameters may comprise assignment/modification of semi-persistent scheduling (SPS) configuration or configured grant configuration for DL and/or UL respectively. The one or more RRC configuration parameters may comprise assignment/modification of parameters for UL rate control in the wireless device. For example, allocation of a priority, and/or a prioritized bit rate (PBR) for each RB of wireless device, and/or logical channel priority.

The base station may receive one or more signals based on the one or more RRC configuration parameters. The one or more signals may comprise an analog transmission signal, and/or an AirComp signal, and/or a group uplink transmission signal. The one or more signals may comprise one or more data packets sent (e.g., transmitted) by the one or more wireless devices.

Figure 22:
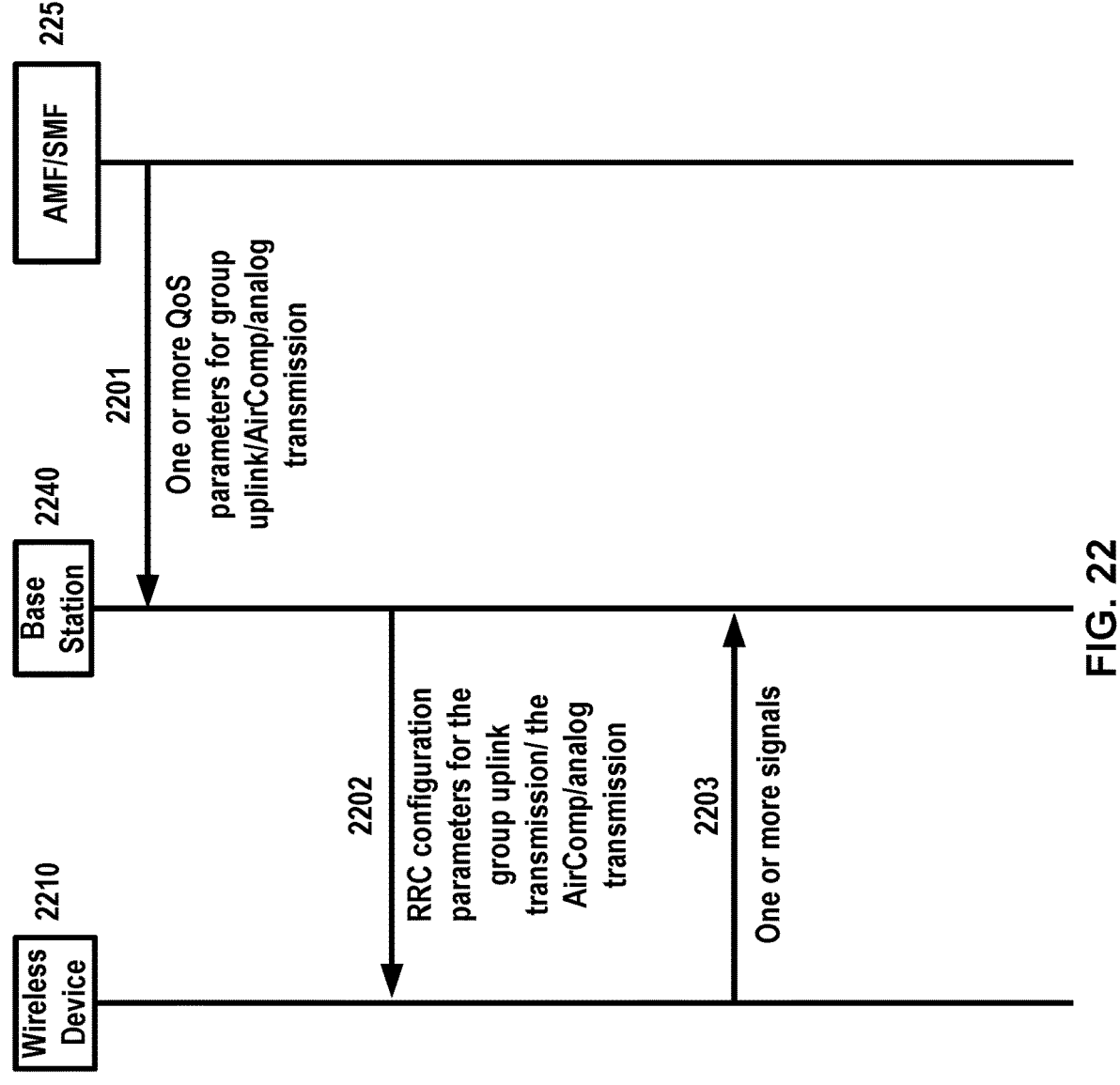
FIG. 22 shows an example signaling flow.

FIG. 22 shows an example signaling flow. A base station 2240 may receive from a core network (e.g., a core network function device) 2250, one or more QoS parameters 2201 for a new transmission scheme. The new transmission scheme may comprise a group uplink transmission. The new transmission scheme may comprise an analog transmission. The new transmission scheme may comprise an AirComp transmission. The base station 2240 may send (e.g., transmit) to one or more wireless devices 2210, RRC configuration parameters 2202 for the new transmission scheme. The new transmission scheme may not be a digital packet transmission, or not a per user packet transmission. The new transmission scheme may require one or more new QoS parameters such as MSE, SNR (signal-to-noise ratio), SINR (signal to interference plus noise ratio), RSRP (reference signal received power), and/or RSRQ (reference signal received quality). At least some wireless communications may use the new QoS parameters for a purpose of measurement, handover, and/or cell (re)selection, but the new transmission scheme may require the new QoS parameters for link quality or QoS control. For example, a core network may have quality guidance on MSE. The new transmission scheme may be an average of the one or more QoS parameters. The new transmission scheme may involve one or more parameters related to power consumption of one or more wireless devices. For example, the one or more parameters may be related to power consumption for IoT devices and/or any other type of device. For example, one parameter may be a maximum power allowed for a group of wireless devices (e.g., IoT devices).

FIG. 23 shows an example of mapping QoS characteristics. The mapping may comprise a standardized 5QI to QoS characteristics mapping table. The table may be used for per user QoS control and/or data packet transmissions. The table may be applicable to an analog transmission, an AirComp transmission, and/or a group uplink transmission.

FIG. 24 shows an example of mapping QoS characteristics. The mapping may comprise a modified 5QI to QoS characteristics mapping table. A new column may be added for MSE. One or more new 5QI values may be used for the new transmission scheme. For example, 5QI value A1 may be used for AirComp transmission. 5QI value B1 may be used for analog transmission. Some existing QoS characteristics may not be applicable to analog or AirComp transmission. For example, PER may be used (e.g., may only be used) for digital packet transmission.

A core network (e.g., a core network function device) may indicate to a base station, a first set of QoS parameters for a first transmission scheme. The first transmission scheme may be a legacy uplink transmission such as per user QoS control, and/or digital packet transmission. The core network (e.g., a core network function device) may indicate, to the base station, a second set of QoS parameter for a second transmission scheme. The second transmission scheme may comprise/indicate one or more uplink transmissions (e.g., an analog transmission and/or an AirComp transmission and/or a group uplink transmission). The base station may send (e.g., transmit) to one or more wireless devices, one or more first RRC configuration parameters. The one or more first RRC configuration parameters may be determined based on the first set of QoS parameters. The base station may send (e.g., transmit) to one or more wireless devices, one or more second RRC configuration parameters. The one or more second RRC configuration parameters may be determined based on the second set of QoS parameters. The base station may receive from the one or more wireless devices and based on the one or more first RRC configuration parameters or the one or more second RRC configuration parameters, one or more signals.

Figure 25C:
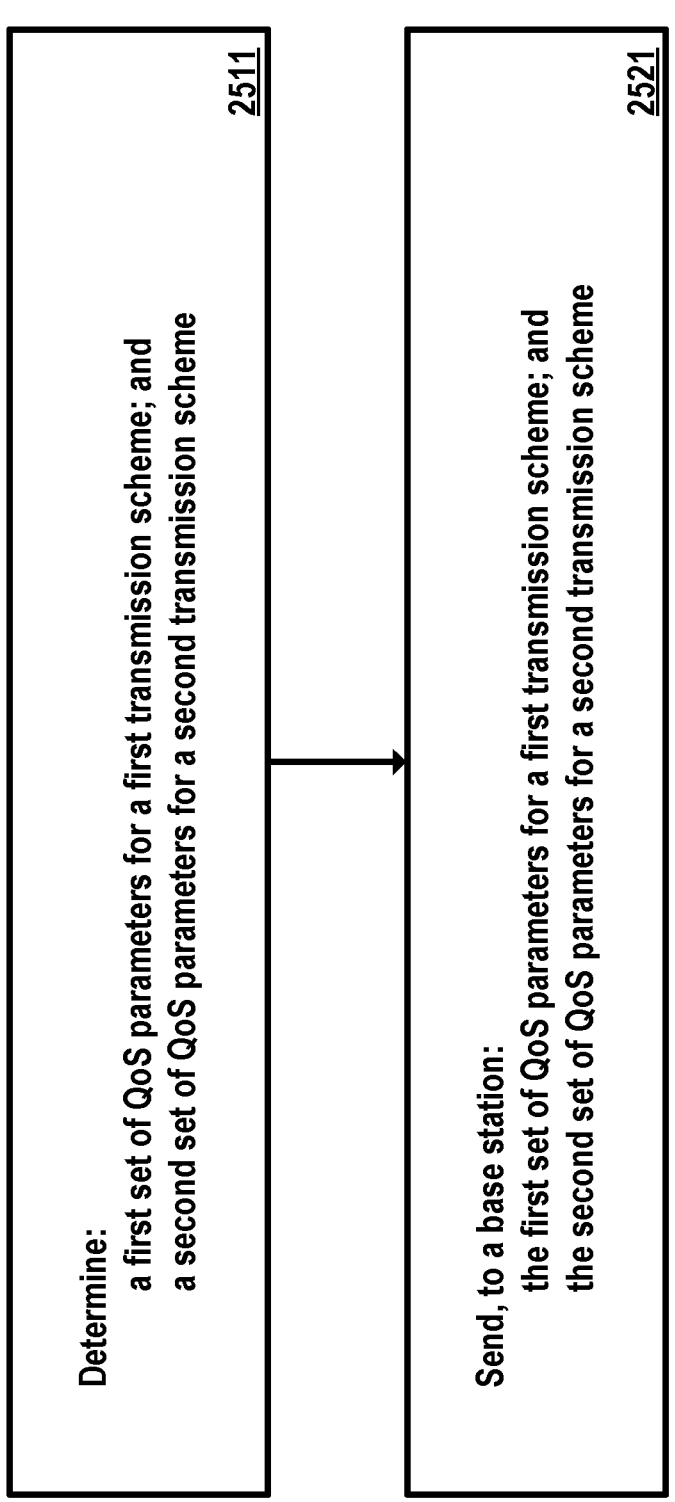
FIG. 25C shows an example method for quality management of wireless communications.

FIG. 25A, FIG. 25B, and FIG. 25C show example methods for quality management of wireless communications. The example method shown in FIG. 25A may be from the perspective of a base station. The example method shown in FIG. 25B may be from the perspective of one or more wireless devices. The example method shown in FIG. 25C may be from the perspective of a core network.

At step 2520, a base station may receive from a core network (e.g., a core network function device), a first set of QoS parameters for a first transmission scheme. The base station may receive from the core network, a second set of QoS parameters for a second transmission scheme. The first set of QoS parameters for the first transmission scheme and/or the second set of QoS parameters for the second transmission scheme may be determined by the core network, for example, at step 2511 in FIG. 25C, and may be sent, to the base station, for example, at step 2521 in FIG. 25C. At step 2530 (in FIG. 25A), the base station may send (e.g., transmit) one or more RRC configuration parameters to one or more wireless devices, for example, if the base station may determine to perform the first transmission scheme. The one or more RRC configuration parameters may be determined based on the first set of QoS parameters. At step 2531 (in FIG. 25B), the one or more wireless devices may receive, from the base station, the one or more first RRC configuration parameters determined based on the first set of QoS parameters. The base station may overwrite/ override/replace the first set of QoS parameters by the second set of QoS parameters, for example, if the base station may determine to perform the second transmission scheme. The first set of QoS parameters may be changed to the second set of QoS parameters. The base station may use the second set of QoS parameters to determine the one or more RRC configuration parameters. The base station may send (e.g., transmit) the one or more RRC configuration parameters to the one or more wireless devices (e.g., at step 2530). The one or more wireless devices may receive, from the base station, the one or more second RRC configuration parameters determined based on the second set of QoS parameters (e.g., at step 2531). The one or more wireless device may perform the second transmission scheme such as an analog transmission, an AirComp transmission, and/or a group uplink transmission. For example, at step 2541 (in FIG. 25B), the one or more wireless devices may send, to the base station, based on the one or more first RRC configuration parameters or the one or more second RRC configuration parameters, one or more signals. At step 2540 (in FIG. 25A), the base station may receive such signals from the one or more wireless devices.

The core network may have core network function such as an AMF and/or an SMF, and/or any core network function responsible for QoS control/management. The core network may determine a first set of QoS parameters for a first transmission scheme, a second set of QoS parameters for a second transmission scheme, and/or any quantity of QoS parameters (e.g., sets of QoS parameters) for any respective quantity of transmission schemes (e.g., at step 2511). The core network may send, to a base station, the first set of QoS parameters for the first transmission scheme, the second set of QoS parameters for the second transmission scheme, and/or any quantity of sets of QoS parameters for any respective quantity of transmission schemes (e.g., at step 2521).

The core network function may indicate a QoS profile for a group session. The QoS profile may be used for the group session, for example, if an uplink session is shared by a group of wireless devices. The core network node may indicate, to the base station, a QoS flow for one or more uplink transmissions (e.g., an analog transmission and/or an AirComp transmission). The core network node may indicate corresponding QoS profile for the QoS flow. A QoS flow index may be dedicated to the QoS flow for one or more uplink transmissions (e.g., an analog transmission and/or an AirComp transmission). The base station may send (e.g., transmit), to one or more wireless devices, based on the one or more QoS parameters, one or more configuration messages indicating one or more configuration parameters for one or more uplink transmissions (e.g., an analog transmission and/or an AirComp transmission). For example, the one or more configuration parameters may comprise the one or more QoS parameters. The one or more configuration parameters may comprise a size of radio resource for the one or more uplink transmissions (e.g., analog transmission and/or the AirComp transmission). The one or more configuration parameters may comprise a transmission power parameter.

A base station may receive from a core network, a first QoS flow configuration. The base station may receive from the core network, a second QoS flow configuration. The first QoS flow configuration may be used to control QoS for a first transmission scheme. The second QoS flow configuration may be used to control QoS for a second transmission scheme. The first transmission scheme may require per user QoS control, and the second transmission scheme may require per (user) group QoS control. For example, the first transmission scheme may be a legacy uplink transmission, and the second transmission scheme may be a group uplink transmission and/or a cooperative transmission. In another example, the first transmission scheme may be a legacy uplink transmission, and the second transmission scheme may be an analog transmission and/or an AirComp transmission. For the second transmission scheme, the second QoS flow configuration may indicate QoS parameters for the analog and/or the AirComp transmission. Each QoS flow configuration may comprise a QoS profile. The QoS profile may comprise one or more QoS parameters. QoS parameters may be replaced by QoS characteristics, and vice versa.

A base station may receive one or more QoS parameters/ QoS flow configuration/QoS profile configuration, for example, during a session establishment procedure or a session activation procedure. A base station may indicate to a core network, which QoS parameter may be fulfilled or which QoS parameter may not be fulfilled. Based on this procedure, the core network may identify the status or update/trigger procedures/parameters.

A base station may receive from a core network, an indication that the core network supports a group session. The base station may send (e.g., transmit) to the core network, a session establishment request for the group session of the over-the-air computation.

A base station may receive from a core network, an indication of a quality of service (QoS) parameter for over-the-air computation. The base station may send (e.g., transmit) to the core network, a session establishment request for a session of an over-the-air-computation, for example, based on (e.g., in response to) the indication. The base station may receive from the core network, a resource setup request for the session. The base station may send (e.g., transmit) to one or more wireless devices, one or more radio resource control (RRC) (re)configuration messages indicating a shared resource for the session. The base station may receive from the one or more wireless devices, one or more signals via the shared resource. The one or more signals sent (e.g., transmitted) by the one or more wireless devices may be superposed in the shared resource.

A base station may receive from a core network an indication of a quality of service (QoS) parameter for over-the-air computation. The base station may determine one or more transmission parameters for the over-the-air computation. For example, resource size, and/or power control parameters may be determined based on the QoS parameter. The base station may send (e.g., transmit) to one or more wireless devices, an RRC (re)configuration message indicating the one or more transmission parameters. The base station may receive one or more signals from the one or more wireless devices, based on the RRC (re)configuration message.

A base station, one or more wireless devices, and/or a core network device may perform a method comprising multiple operations. A base station may receive, from a core network, one or more quality of service (QoS) parameters associated with group uplink transmission (e.g., at least one QoS parameter associated with group uplink transmission). The group uplink transmission may comprise over-the-air computation. The base station may transmit, to one or more wireless devices (e.g., at least one wireless device), one or more configuration parameters for uplink transmission (e.g., at least one configuration parameter for uplink transmission), wherein the one or more configuration parameters are based on the one or more QoS parameters associated with group uplink transmission. The base station may receive, from the one or more wireless devices, one or more signals for a group uplink transmission (e.g., at least one signal for a group uplink transmission). The base station may receive the one or more signals for the group uplink transmission by receiving, via a shared resource, an aggregated signal indicating first data from a first wireless device of the one or more wireless devices and second data from a second wireless device of the one or more wireless devices. The base station may perform the group uplink transmission by determining, based on received power of the aggregated signal, a function corresponding to the first data and the second data. The function may comprise at least one of: an arithmetic mean; a geometric mean; a Euclidean norm; or a linear regression. The first data and the second data may indicate sensor measurement of at least one of: a temperature, a pressure, a position, a force, an acceleration, a vibration, a fluid, a humidity, a gas, or a light. The one or more QoS parameters associated with group uplink transmission comprise at least one of: a mean squared error; a signal-to-noise ratio; or a quality of computation error. The base station may transmit, to the core network, a session establishment request for a session of the group uplink transmission. The base station may receive, from the core network, a resource setup request for the session of the group uplink transmission. The base station may transmit the one or more configuration parameters for uplink transmission by transmitting one or more radio resource control (RRC) configuration messages indicating a shared resource for a session of the group uplink transmission. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A wireless device may receive, from a base station, one or more configuration parameters for uplink transmission (e.g., at least one configuration parameter for uplink transmission). The one or more configuration parameters may be based on one or more QoS parameters associated with group uplink transmission (e.g., at least one QoS parameter associated with group uplink transmission). The group uplink transmission may comprise over-the-air computation. The wireless device may determine, based on the one or more configuration parameters for uplink transmission, one or more signals for a group uplink transmission (e.g., at least one signal for a group uplink transmission). The wireless device may transmit, to the base station, the one or more signals for the group uplink transmission. The one or more signals indicate sensor measurement of at least one of: a temperature, a pressure, a position, a force, an acceleration, a vibration, a fluid, a humidity, a gas, or a light. The one or more QoS parameters associated with group uplink transmission comprise at least one of: a mean squared error; a signal-to-noise ratio; or a quality of computation error. The wireless device may receive the one or more configuration parameters for uplink transmission comprises receiving one or more radio resource control (RRC) configuration messages (e.g., at least one RRC configuration message) indicating a shared resource for a session of the group uplink transmission. The wireless device may determine one or more sensor measurements at a location of the wireless device. The wireless device may transmit the one or more signals for the group uplink transmission by transmitting the one or more signals using a transmission power corresponding to a value of the one or more sensor measurements. The wireless device may comprise one or more processors; and memory storing instructions that, when executed by the one or more processors, cause the wireless device to perform the described method, additional operations, and/or include the additional elements. A system may comprise the wireless device configured to perform the described method, additional operations and/or include the additional elements; a base station configured to communicate with the wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may transmit, to one or more wireless devices (e.g., at least one wireless device, a plurality of wireless devices, etc.), one or more configuration parameters for uplink transmission associated with group uplink transmission (e.g., at least one configuration parameter for uplink transmission associated with group uplink transmission). The group uplink transmission may comprise over-the-air computation. The base station may receive, via a shared resource, an aggregated signal indicating first data from a first wireless device of the one or more wireless devices and second data from a second wireless device of the one or more wireless devices. The base station may perform a group uplink transmission by determining, based on received power of the aggregated signal, a function corresponding to the first data and the second data. The base station may receive, from a core network, one or more quality of service (QoS) parameters associated with group uplink transmission (e.g., at least one QoS parameter associated with group uplink transmission). The one or more configuration parameters may be based on the one or more QoS parameters associated with group uplink transmission. The one or more QoS parameters associated with group uplink transmission may comprise at least one of: a mean squared error; a signal-to-noise ratio; or a quality of computation error. The function may comprise at least one of: an arithmetic mean; a geometric mean; a Euclidean norm; or a linear regression. The first data and/or the second data may indicate sensor measurement of at least one of a temperature, a pressure, a position, a force, an acceleration, a vibration, a fluid, a humidity, a gas, or a light. The base station may transmit, to a core network, a session establishment request for a session of the group uplink transmission. The base station may receive, from the core network, a resource setup request for the session of the group uplink transmission. The base station may transmit the one or more configuration parameters for uplink transmission by transmitting one or more radio resource control (RRC) configuration messages (e.g., at least one RRC configuration message) indicating the shared resource for a session of the group uplink transmission. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless device configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A wireless device may receive an indication of a shared resource for uplink transmission associated with group uplink transmission. The group uplink transmission may comprise over-the-air computation. The wireless device may determine, based on one or more sensor measurements (e.g., at least one sensor measurement), measurement data associated with the wireless device. The wireless device may transmit, via the shared resource, an indication of the measurement data using a first analog signal for aggregation with one or more second analog signals (e.g., at least one second analog signal) in a group uplink transmission. The wireless device may receive the indication of the shared resource for uplink transmission by receiving one or more radio resource control (RRC) configuration messages (e.g., at least one RRC configuration message) indicating the shared resource for a session of the group uplink transmission. The measurement data may indicate sensor measurement of at least one of a temperature, a pressure, a position, a force, an acceleration, a vibration, a fluid, a humidity, a gas, or a light. The measurement data may comprise first measurement data. The wireless device may receive, from one or more second wireless devices (e.g., at least one second wireless device), second measurement data, wherein the one or more second analog signals indicates the second measurement data. The wireless device may transmit the indication of the measurement data using the first analog signal by transmitting the analog signal using a transmission power associated with a function corresponding to the measurement data. The function may comprise at least one of: an arithmetic mean; a geometric mean; a Euclidean norm; or a linear regression. The wireless device may comprise one or more processors; and memory storing instructions that, when executed by the one or more processors, cause the wireless device to perform the described method, additional operations, and/or include the additional elements. A system may comprise the wireless device configured to perform the described method, additional operations and/or include the additional elements; a base station to communicate with the wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function: a first set of QoS (quality of service) parameters for a first transmission scheme; and a second set of QoS parameters for a second transmission scheme. The base station may transmit to one or more wireless devices: one or more first radio resource control (RRC) configuration parameters; and/or one or more second RRC configuration parameters. The one or more first RRC configuration parameters may be determined based on the first set of QoS parameters. The one or more second RRC configuration parameters may be determined based on the second set of QoS parameters. The base station may receive, from the one or more wireless devices and based on the one or more first RRC configuration parameters or the one or more second RRC configuration parameters, one or more signals. The first transmission scheme may comprise a digital transmission. The second transmission scheme may comprise an analog transmission. A transmission parameter of a wireless signal in the analog transmission may be determined based on transmission data. The second transmission scheme may comprise an AirComp transmission. A transmission parameter of a wireless signal in the AirComp transmission may be determined based on transmission data. One or more wireless devices in the AirComp transmission may perform transmissions on one or more shared resources. One or more wireless signals transmitted by the one or more wireless devices may be superposed on the one or more shared resources. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, a first set of QoS parameters for a first transmission scheme. The base station may receive, from the core network function, a second set of QoS parameters for a second transmission scheme. The base station may determine to perform a second transmission scheme. The base station may (e.g., based on determining to perform the second transmission scheme) override the first set of QoS parameters by the second set of QoS parameters. The base station may transmit, to one or more wireless devices, based on the first set of QoS parameters, one or more RRC configuration parameters. The base station may receive, from the one or more wireless devices, based on the one or more RRC configuration parameters, one or more signals. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, one or more QoS parameters for a group uplink transmission. The base station may transmit, to one or more wireless devices, based on the one or more QoS parameters, one or more RRC configuration parameters for the group uplink transmission. The base station may receive, from the one or more wireless devices and based on the one or more RRC configuration parameters, one or more signals. The one or more wireless devices may share one or more sessions indicated by the core network function in the group uplink transmission. The one or more RRC configuration parameters may indicate one or more of: a size of a radio (time and/or frequency) resource; a transmission power parameter; a configuration of a reference signal; and/or SDAP configuration parameters. The reference signal may comprise an AirComp signal. A transmission parameter of the AirComp signal may be determined based on data and/or information. The core network function may comprise one or more of: a session management function; an access and mobility management function; and/or a user plane function. The one or more QoS parameters may comprise one or more of: a mean squared error; a signal to noise ratio; and/or a quality of computation error. The one or more RRC configuration parameters may be indicated by one or more of: a system information block; an RRC message; DCI (e.g., a DCI message). The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, one or more quality of service (QoS) profiles for an over-the-air computation. The QoS profile may comprise one or more QoS parameters for the over-the-air computation. The base station may transmit, to a user plane function, a packet via the group session of the over-the-air computation based on the QoS profile. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, a quality of service (QoS) profile for a group session. The QoS profile may comprise one or more QoS parameters for the group session. The group session may be shared by a plurality of wireless devices. The base station may transmit, to a user plane function, a packet via the group session based on the QoS profile. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, an indication that the core network function supports a group session of over-the-air computation. The base station may transmit, to the core network function, a session establishment request for the group session of the over-the-air computation. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, an indication of a quality of service (QoS) parameter for over-the-air computation. The base station may (e.g., based on and/or in response to the indication) transmit, to the core network function, a session establishment request for a session of an over-the-air-computation. The base station may receive, from the core network function, a resource setup request for the session. The base station may transmit, to one or more wireless devices, one or more radio resource control (RRC) (re)configuration messages indicating a shared resource for the session. The base station may receive, from the one or more wireless devices, one or more signals via the shared resource. The one or more signals transmitted by the one or more wireless devices may be superposed in the shared resource. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive, from a core network function, an indication of a quality of service (QoS) parameter for over-the-air computation. The base station may determine one or more transmission parameters for the over-the-air computation. The base station may transmit, to one or more wireless devices, a radio resource control (re)configuration message indicating the one or more transmission parameters. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured communicate with the base station; and/or a core network device configured to communicate with the base station. A computer-readable medium may store instructions that, when executed, cause performance of the described method, additional operations, and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. Various examples may be used, for example, if the one or more criteria are met. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a base station and from a core network, at least one quality of service (QoS) parameter associated with group uplink transmission;

transmitting, to at least one wireless device, at least one configuration parameter for uplink transmission, wherein the at least one configuration parameter is based on the at least one QoS parameter associated with group uplink transmission; and receiving, from the at least one wireless device, at least one signal for a group uplink transmission.

2. The method of claim 1, wherein the receiving the at least one signal for the group uplink transmission comprises: receiving, via a shared resource, an aggregated signal indicating first data from a first wireless device of the at least one wireless device and second data from a second wireless device of the at least one wireless device; and wherein the method further comprises performing an over-the-air computation by determining, based on received power of the aggregated signal, a function corresponding to the first data and the second data.

3. The method of claim 2, wherein the function comprises at least one of:

an arithmetic mean;

a geometric mean;

a Euclidean norm; or a linear regression.

4. The method of claim 2, wherein the first data and the second data indicate sensor measurement of at least one of: a temperature, a pressure, a position, a force, an acceleration, a vibration, a fluid, a humidity, a gas, or a light.

5. The method of claim 1, wherein the at least one QoS parameter associated with group uplink transmission comprises at least one of:

a mean squared error;

a signal-to-noise ratio; or a quality of computation error.

6. The method of claim 1, further comprising:

transmitting, to the core network, a session establishment request for a session of the group uplink transmission; and receiving, from the core network, a resource setup request for the session of the group uplink transmission.

7. The method of claim 1, wherein the transmitting the at least one configuration parameter for uplink transmission comprises transmitting at least one radio resource control (RRC) configuration message indicating a shared resource for a session of the group uplink transmission.

8. A method comprising:

transmitting, by a base station and to a plurality of wireless devices, at least one configuration parameter that is based on at least one quality of service (QoS) parameter for group uplink transmission; and receiving, via a shared resource, an aggregated signal indicating first data from a first wireless device of the plurality of wireless devices and second data from a second wireless device of the plurality of wireless devices.

9. The method of claim 8, further comprising:

receiving, from a core network, the at least one QoS parameter.

10. The method of claim 9, wherein the at least one QoS parameter associated with group uplink transmission comprise at least one of:

a mean squared error;

a signal-to-noise ratio; or a quality of computation error.

11. The method of claim 8, further comprising:

processing the aggregated signal by performing an over-the-air computation using a function, and wherein the function comprises at least one of:

an arithmetic mean;

a geometric mean;

a Euclidean norm; or a linear regression.

12. The method of claim 8, wherein the first data and the second data indicate sensor measurement of at least one of: a temperature, a pressure, a position, a force, an acceleration, a vibration, a fluid, a humidity, a gas, or a light.

13. The method of claim 8, further comprising:

transmitting, to a core network, a session establishment request for a session of the group uplink transmission; and receiving, from the core network, a resource setup request for the session of the group uplink transmission.

14. The method of claim 8, wherein the transmitting the at least one configuration parameter for uplink transmission comprises transmitting at least one radio resource control (RRC) configuration message indicating the shared resource for a session of the group uplink transmission.

15. A method comprising:

receiving, by a wireless device, an indication of a shared resource that is based on at least one quality of service (QoS) for group uplink transmission;

determining, based on at least one sensor measurement, measurement data associated with the wireless device; and transmitting, via the shared resource, an indication of the measurement data using a first analog signal for aggregation with at least one second analog signal in a group uplink transmission.

16. The method of claim 15, wherein the receiving the indication of the shared resource for uplink transmission comprises receiving at least one radio resource control (RRC) configuration message indicating the shared resource for a session of the group uplink transmission.

17. The method of claim 15, wherein the measurement data indicates sensor measurement of at least one of: a temperature, a pressure, a position, a force, an acceleration, a vibration, a fluid, a humidity, a gas, or a light.

18. The method of claim 15, wherein the measurement data comprises first measurement data, and wherein the method further comprises:

receiving, from at least one second wireless devices, second measurement data, wherein the at least one second analog signal indicates the second measurement data.

19. The method of claim 15, wherein the transmitting the indication of the measurement data using the first analog signal comprises transmitting the analog signal using a transmission power associated with a function corresponding to the measurement data.

20. The method of claim 19, wherein the function comprises at least one of:

an arithmetic mean;

a geometric mean;

a Euclidean norm; or a linear regression.

* * * * *